United States Patent
Shaw et al.

(10) Patent No.: US 7,408,134 B1
(45) Date of Patent: Aug. 5, 2008

(54) PROGRAMMABLE SWITCH

(75) Inventors: Joel Shaw, Kent, WA (US); Clifford Slaughterbeck, Lynnwood, WA (US)

(73) Assignee: Index Industries, Inc., Stanwood, WA (US)

( * ) Notice: Subject to any disclaimer, the term of this patent is extended or adjusted under 35 U.S.C. 154(b) by 444 days.

(21) Appl. No.: 10/990,362

(22) Filed: Nov. 16, 2004

Related U.S. Application Data

(63) Continuation of application No. 10/988,854, filed on Nov. 15, 2004, now abandoned.

(60) Provisional application No. 60/520,178, filed on Nov. 14, 2003.

(51) Int. Cl.
*H05B 1/02* (2006.01)

(52) U.S. Cl. .................. 219/501; 219/492; 219/507; 219/497; 307/117

(58) Field of Classification Search .......... 219/492, 219/481, 490, 494, 497, 499, 501, 505, 507, 219/508, 511; 307/38–41, 117
See application file for complete search history.

(56) References Cited

U.S. PATENT DOCUMENTS

| | | | | |
|---|---|---|---|---|
| 5,345,223 A | * | 9/1994 | Rutkiewicz | 340/581 |
| 5,763,858 A | * | 6/1998 | Jones | 219/506 |
| 6,418,359 B1 | * | 7/2002 | Wolf et al. | 700/299 |
| 7,114,554 B2 | * | 10/2006 | Bergman et al. | 165/238 |

* cited by examiner

*Primary Examiner*—Mark Paschall
(74) *Attorney, Agent, or Firm*—Christensen O'Connor Johnson Kindness PLLC

(57) ABSTRACT

A sensor circuit provides a signal to a microcontroller to indicate parameters of an environmental condition to which the sensor circuit is exposed, such as temperature. The sensor circuit and microcontroller are mounted in a common housing, with an output lead indicating an on/off output based on predetermined parameters of the environmental condition. By access through the output lead, the microcontroller can be reprogrammed to change the predetermined parameters controlling the output state of the switch.

8 Claims, 29 Drawing Sheets

PROGRAMMABLE SWITCH

CROSS-REFERENCE TO RELATED APPLICATIONS

This application is a continuation of U.S. patent application Ser. No. 10/988,854, filed Nov. 15, 2004, now abandoned which claims the benefit of U.S. Provisional Application No. 60/520,178, filed Nov. 14, 2003, both of which are expressly incorporated by reference herein in their entirety.

FIELD OF THE INVENTION

The present invention relates to an electronic switch providing an output (e.g., open/closed and/or alternating open-closed) based on an environmental condition detected by a sensor incorporated in the switch.

BACKGROUND OF THE INVENTION

Sensors have been provided to detect or measure environmental conditions including, but not limited to, temperature, humidity, light intensity, proximity to other components, pressure, and so on. Such sensors can provide an output indicative of the condition sensed, possibly coupled with a switch which opens and closes based on particular parameters of the condition sensed. Known sensors are designed and manufactured to meet particular specifications. Changes to the specifications can require a redesign, and accuracy versus cost almost always is a consideration.

SUMMARY OF THE INVENTION

The present invention provides an electronic switch having a sensor circuit used to provide a signal to a microcontroller incorporated in the switch. The signal can vary in accordance with the environmental condition detected: increasing and decreasing pressure, humidity, light intensity, or temperature; or proximity to another component as measured magnetically (such as by a Hall effect sensor), electronically, or by another method; or any other variable environmental condition measured by use of the sensor circuit. The microcontroller provides one or more outputs indicating whether or not the environmental condition meets predetermined parameters. For example, from a normally open condition, a temperature sensor in accordance with the present invention can be programmed to switch closed ("on") if the ambient temperature rises above a predetermined temperature (the "set" temperature) and stays above the set temperature for a predetermined period, and to open (turn "off") if the temperature falls below a predetermined temperature (the "reset" temperature) and stays below the reset temperature for a predetermined period. Additional timing functions can be programmed, including minimum and maximum on time and state-of-change delays. Using the principles of the present invention, a plurality of independently programmed outputs can be provided.

To remote components, such as a vehicle electronic control unit (ECU) or a component, such as a fan, controlled by the switch output, the switch output can emulate the outputs of existing switches, but with greater accuracy and control over such functions as timing. In addition, programming of the switch parameters can be accomplished through an output lead. In the preferred embodiment, this is achieved by applying an abnormal signal at startup, signaling the switch microcontroller to enter a "communications mode" for reception of programming instructions and/or for download of historical data. The easy programmability of the switch in accordance with the present invention also allows accurate calibration at the time of manufacture, and enables identical hardware to be used in different highly specialized applications, including custom applications where no more than a few switches with specialized parameters are desired.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The invention is described in detail below with reference to a particular application to which it is suited, namely, a temperature sensor and switch used in vehicles, particularly heavy-duty trucks or large off-highway vehicles such as earth moving and agricultural machines.

Universal Temperature Switch (UTS) Overview

Figure 1:
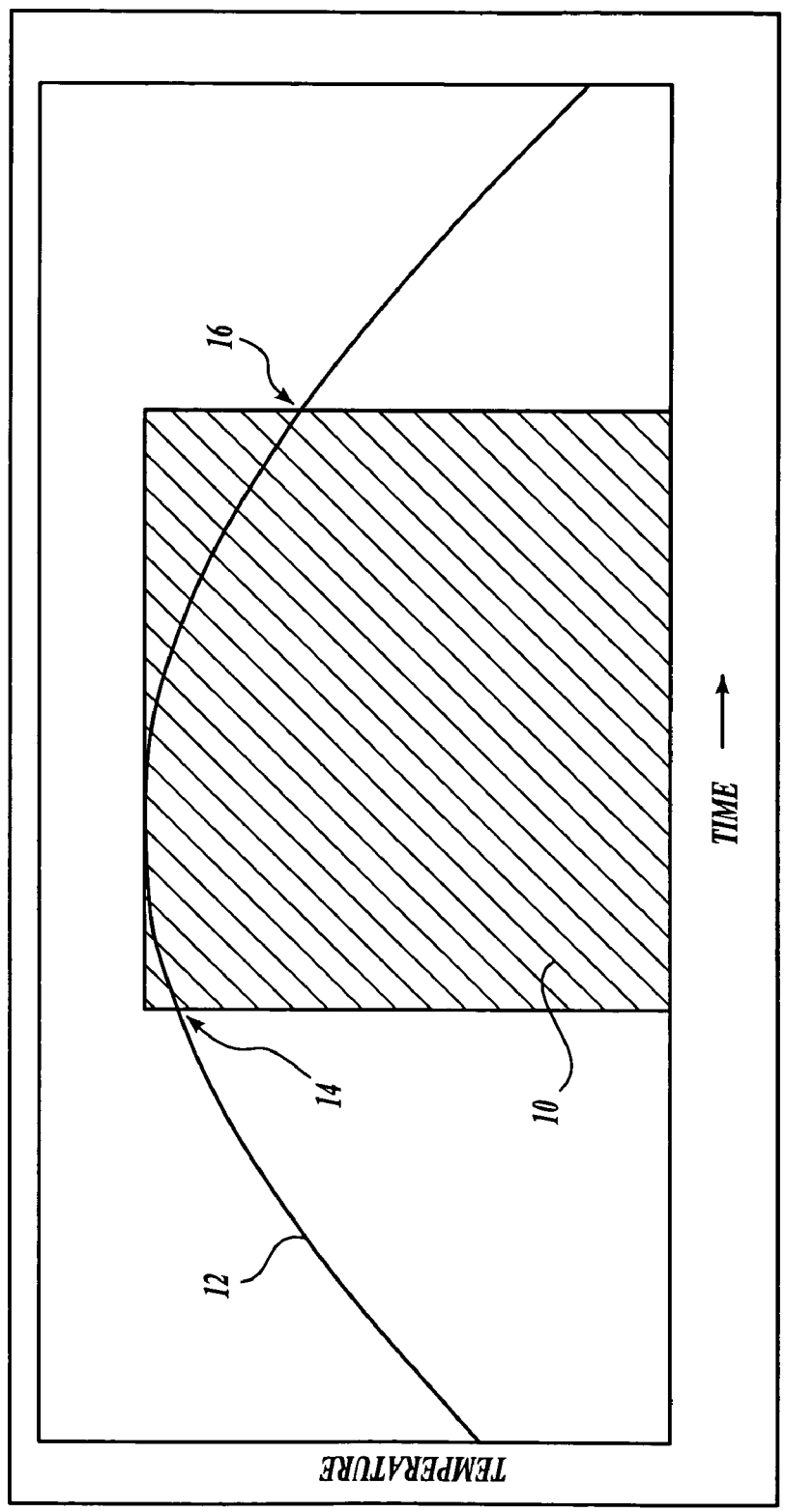
FIG. 1 is a graph illustrating operation of a temperature switch.

Automotive applications have a long history of being major consumers of temperature switches. Temperature switches have two characteristic temperatures, one called the "set" point and another called the "reset" point. As shown in the graph of FIG. 1, the switch is in one state (either on or off) in the shaded area 10 where temperature represented by line 12 climbs above the set point 14, and in the opposite state when the temperature falls below the reset point 16. The intermediate temperature range between the set and reset point is called the "hysteresis" or "differential", i.e., the difference between the set and reset temperatures.

Temperature switches are often used for controlling the function of cooling systems in engines, including fan controls, HVAC, and overtemperature warning lights. In addition to these high temperature applications, temperature switches are often used to control functionality of systems at cold temperatures as well. A/C systems use temperature switches to prevent freeze-up of the evaporator core, for example. The myriad of applications for automotive temperature switches have led to numerous specialized design concepts to resolve the various application issues.

Figure 2:
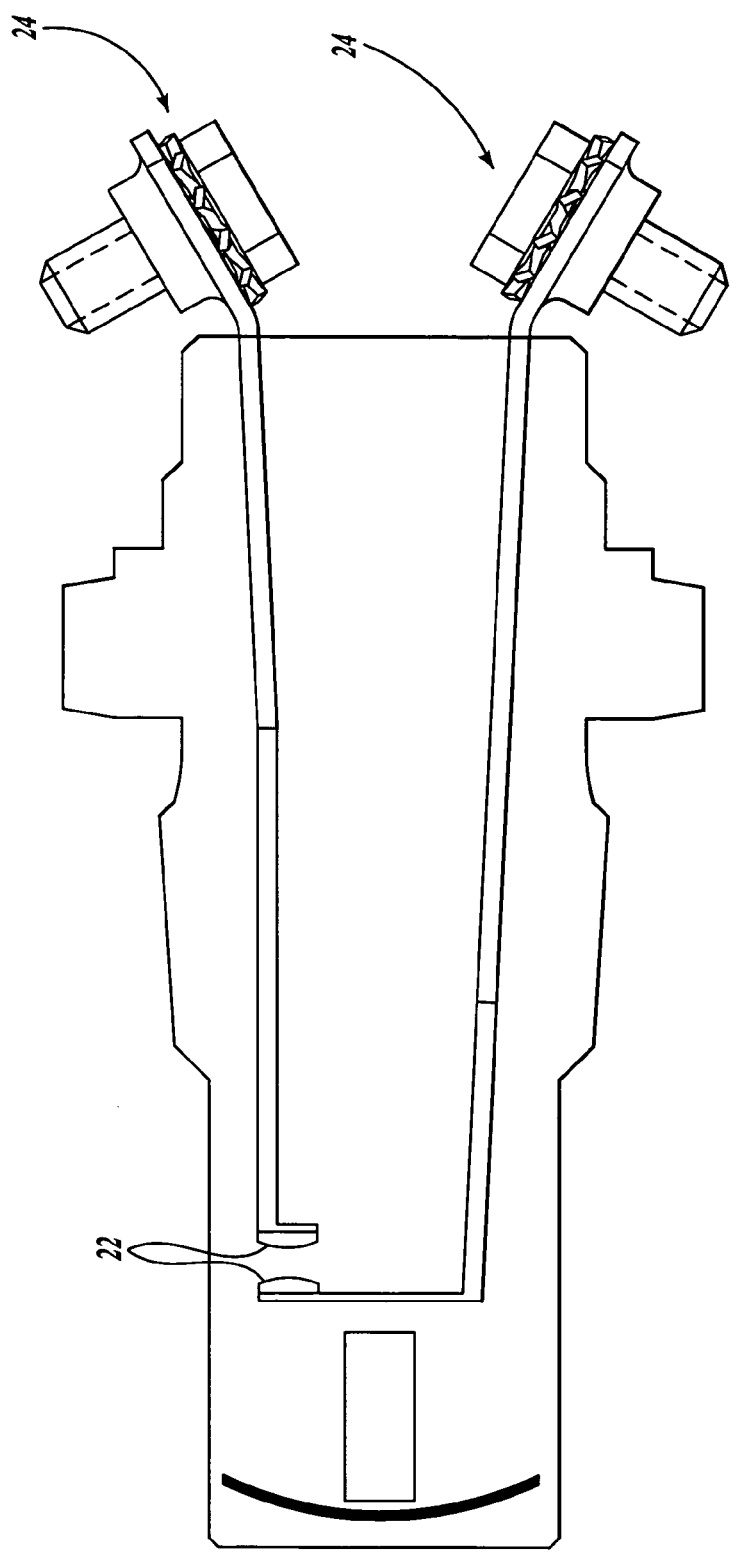
FIG. 2 (prior art) is a diagrammatic side elevation of a mechanical temperature switch.

As represented diagrammatically in FIG. 2, one known approach to temperature switching uses thin bimetallic discs 22 with a slightly cupped shape. As the temperature of the disc changes past the set point, the disc snaps from one side to the other, and snaps back when the temperature falls below the reset point. The snap action actuates an electrical contact set 24 and allows the switch to conduct electricity.

The snap-action mechanical temperature switch works well in many applications. Its simplicity, however, gives rise to certain limits in application. The exact snap point of any given disc depends not just on the thermal properties of the bimetal disc, but also on variables in the forming and heat treating processes. The forming process is not exact, and so each disc has to be carefully processed and individually tested in order to make sure that the discs will meet the tolerances of the switch they are built into. Achieving tight tolerances requires sorting and testing of individual units, and therefore has cost implications.

Many applications need to drive two loads at different temperatures (e.g., fan and over-temperature warning light). This is difficult to do with a mechanical design, and so two switches are often used. This adds substantial cost to the application. In addition, the difference between the set and reset points of the switch is not easy to change using this technique. Applications that require either very large separations or very small separations between set and reset points cannot be met using the formed metal disc design approach.

In addition to the constraints related to the mechanical design topology, there are limits with the electrical switching characteristics as well. Mechanical switches in high vibration environments, like those found in heavy-duty truck and bus applications, can briefly open when subjected to harmonic mechanical vibration. Because the contacts are made mechanically, they are subject to arcing when used with inductive loads, which shortens the switch life. In modern electronically controlled engines, the mechanical contact set may have a hard time driving the high impedance input circuit of an electronic control module (ECM) because of dry contact resistance unless more expensive gold contacts are used.

Figure 3:
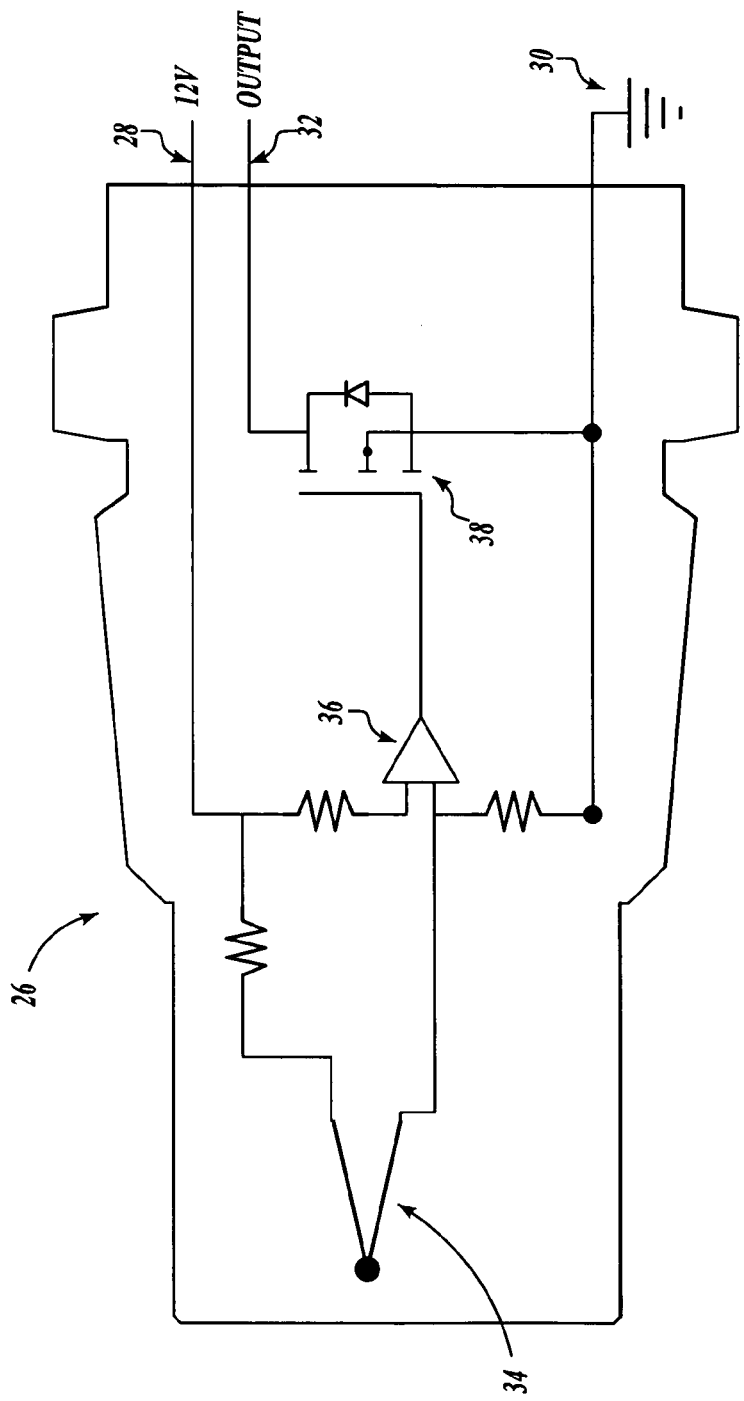
FIG. 3 (prior art) is a circuit diagram of an electronic temperature switch.

Mechanical switches are excellent solutions for some applications, but these limitations led to the advent of the electronic temperature switch, an example of which is shown in FIG. 3. Unlike the mechanical switch that only requires two wires to be connected to the harness, the electronic switch 26 requires three: power 28, ground 30, and the switch output 32.

Like their mechanical brethren, electronic switches can be built as either normally open (switch does not conduct current at room temperature) or normally closed (switch conducts current at room temperature). The switch output either provides power (called a sourcing switch) or ground (called a sinking switch) when engaged, i.e., a binary output based on whether or not the desired temperature condition is detected. Electronic switches utilize high power MOSFETs, and are not prone to vibration and contact resistance issues associated with mechanical switch designs (in some applications).

While the electronic temperature switch (such as 26—FIG. 3) resolves some of the compromises associated with mechanical temperature switches, it does have its own set of issues. For example, in order to achieve high accuracy with applications that require it, conventional electronic temperature switches utilize high precision thermistors 34 that add to the cost of the switch. In general, the resistance of the thermistor 34 changes as a function of temperature, controlling inputs to a comparator 36 which provides the gate signal to a MOSFET 38.

The electronic package of a temperature switch may also be more vulnerable to electromagnetic compatibility (EMC) issues than mechanical temperature switches are. The harsh underhood environment of the heavy-duty truck or bus presents other challenges. Designers of electronic temperature switches need to engineer and test their switches against the stringent standards of SAE J1455 (Joint SAE/TMC Recommended Environmental Practices for Electronic Equipment Design (Heavy-Duty Trucks); Society of Automotive Engineers International, 400 Commonwealth Drive, Warrendale, Pa.) and SAE J1113 (Electromagnetic Compatibility Measurement Procedure for Vehicle Components. Society of Automotive Engineers International, 400 Commonwealth Drive, Warrendale, Pa.) to ensure the product withstands this harsh environment.

In addition, with respect to timing, some applications for temperature switches would benefit from the ability to ignore transients generated by startup conditions or temporary (but still normal) operating conditions. The present invention recognizes that these applications would benefit from a startup delay or delay time hysteresis requirement in either the on-state or off-state as the temperature changes. Also, simple mechanical or electronic switches are incapable of performing functions such as blinking to call attention to an overtemperature warning light on the dash. With respect to cost, a complicated electronic switch of custom design may be possible.

But the design of this type of switch tends to be very application specific. In heavy vehicle markets where usage quantities range from a few hundred per year to tens of thousands per year, the design cost and effort to build a custom control switch often outweighs the potential benefits to the application.

Figure 4:
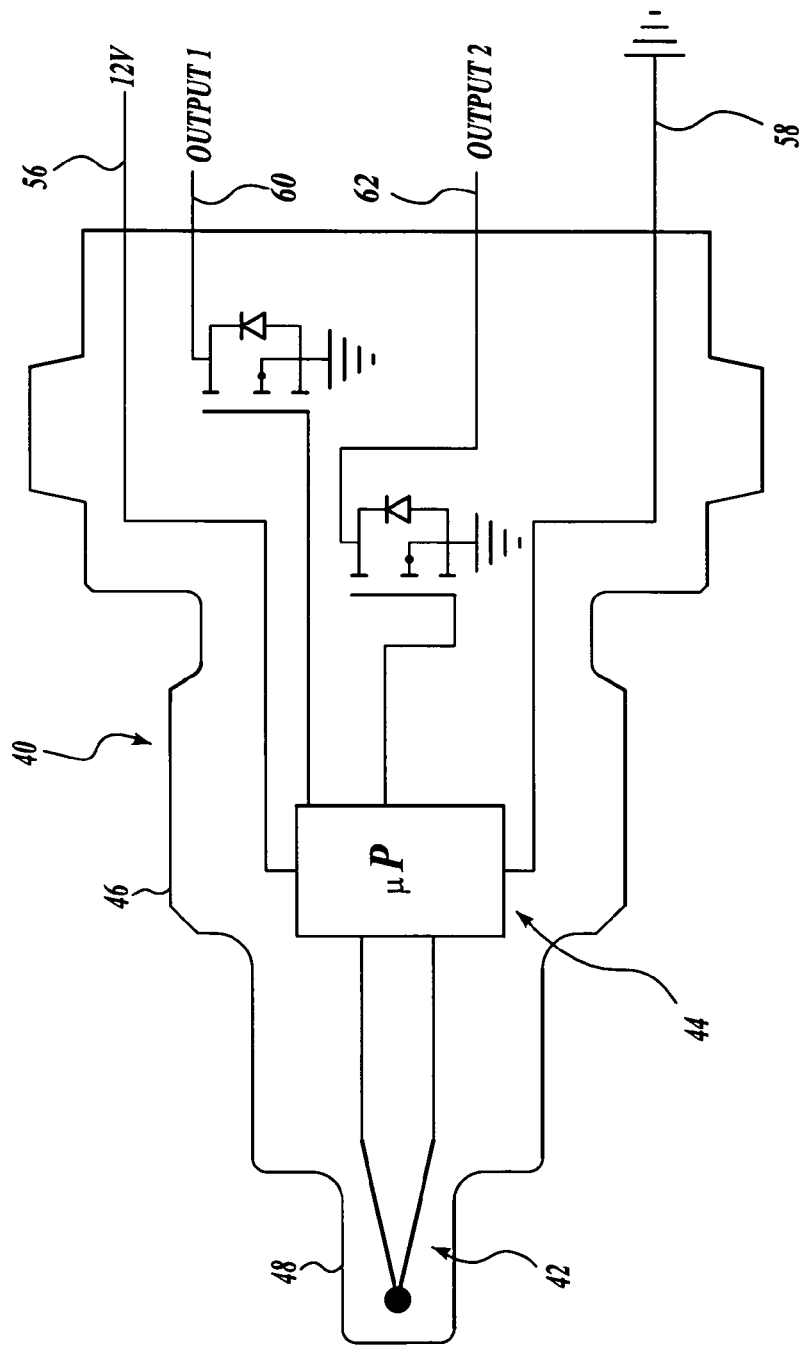
FIG. 4 is a diagram of an electronic temperature switch in accordance with the present invention.

With reference to FIG. 4, the universal temperature switch (UTS) 40 of the present invention is a programmable electronic temperature switch that utilizes a thermistor 42 and integrated 8-bit microcontroller 44 to sense the temperature and control the switch outputs. UTS versions are available for both single and dual functions, and in either sinking or sourcing configurations. Because the switch is programmable, there is no need to create separate switch designs for the myriad of possible set points, reset points, or open/closed switch states. With the flexible configurations, complexity and costs in manufacturing and inventory management are reduced thereby allowing favorable pricing to customers.

The microcontroller-based UTS design offers several important benefits when compared to conventional switch design that meet or exceed the design criteria listed above.

Functionality—The UTS can be configured with either single or dual outputs. The switch can be configured (independently for each function) as either normally open, normally closed, or as a blinking output (alternating open and closed) to signal a warning. In addition, the basic switch design provides flexibility for a custom temperature control based solely on a software change without the expense of qualifying a new hardware design.

Accuracy—The switch set can have its set and reset points programmed after the switch has been manufactured. The switch set and reset points can be programmed into the switch to set or reset at the temperature at that moment. The set and reset temperatures are accurate to within the tolerance of calibration bath temperature (typically +/−0.5° C.), even if there are variations in response characteristics of thermistors of different switches. This process can be repeated for each set and reset point, making the switch extraordinarily accurate even if the parameters for set and reset points (or second function set and reset points) are far apart. The firmware is designed so that the switch can not be reprogrammed by accident.

Development Tool—The programmability provides an added benefit to the systems design engineer. Using a UTS, the design engineer no longer has to guess what the proper switch point of the temperature switch needs to be. While designing a product that needs a temperature switch as part of the application, the engineer can utilize a reprogramming interface box to adjust the temperature set and reset points as necessary. If the system architecture changes so that the switch now needs to be normally closed instead of normally open, the reprogramming interface box can easily make the change as the system design evolves. The flexibility and versatility of the UTS allows for a tighter system design with shorter system design cycles.

Field Adjustable—The reprogrammability feature has significant benefits to the warranty and repair side of the business operation as well. Some applications need field adjustment to the set or reset points of a switch over time as a vehicle system ages, is updated, or retrofitted. The reprogramming interface box can handle that task in the field with no parts returned for warranty or repair.

Durability—The UTS can be designed to operate in the underhood heavy-duty truck, bus, and off-road/agricultural engine environment.

Loads—As an electronic switch, the UTS can effectively drive both low-current loads like an ECM and high-current inductive loads like an electromagnetic fan clutch. The switch design includes a built in short-circuit protection device that shuts off the output if the current level exceeds a predetermined threshold, such as five amps. Once the short-circuit is removed, the switch automatically will resume normal operation.

Design Cycle Time—One of the most important benefits of the UTS design is that it was designed for custom configuration in small-volume markets like those in heavy-duty truck and bus or off-road applications. Design engineers can use a UTS and reprogramming interface box to customize the temperature switch points to fit the application. When the switch parameters are finalized, production volume switches can be achieved quickly without any further need to redesign the switch.

Timing Functions—The UTS utilizes its on-board microcontroller to provide custom timing features, including startup state and startup timing, state-of-change delays to avoid nuisance transients. The UTS also includes minimum on-times to provide minimum response effort for control signals, and maximum on-times to allow systems to avoid being over-driven. These timing functions can be completely configurable to be customized for any application. Furthermore, the ability to add timing parameters does not add to the cost of the switch because there is no additional hardware required to implement them. This flexibility allows the UTS to become a custom-configured temperature control instead of just a preset and limited switch.

Cost—The UTS is cost-competitive with current conventional temperature switches and costs considerably less than a custom designed switch.

UTS Product Specification

This section provides a more detailed overview of the UTS functionality including software, electrical, mechanical, environmental performance, and reliability requirements for this switch.

Figure 5:
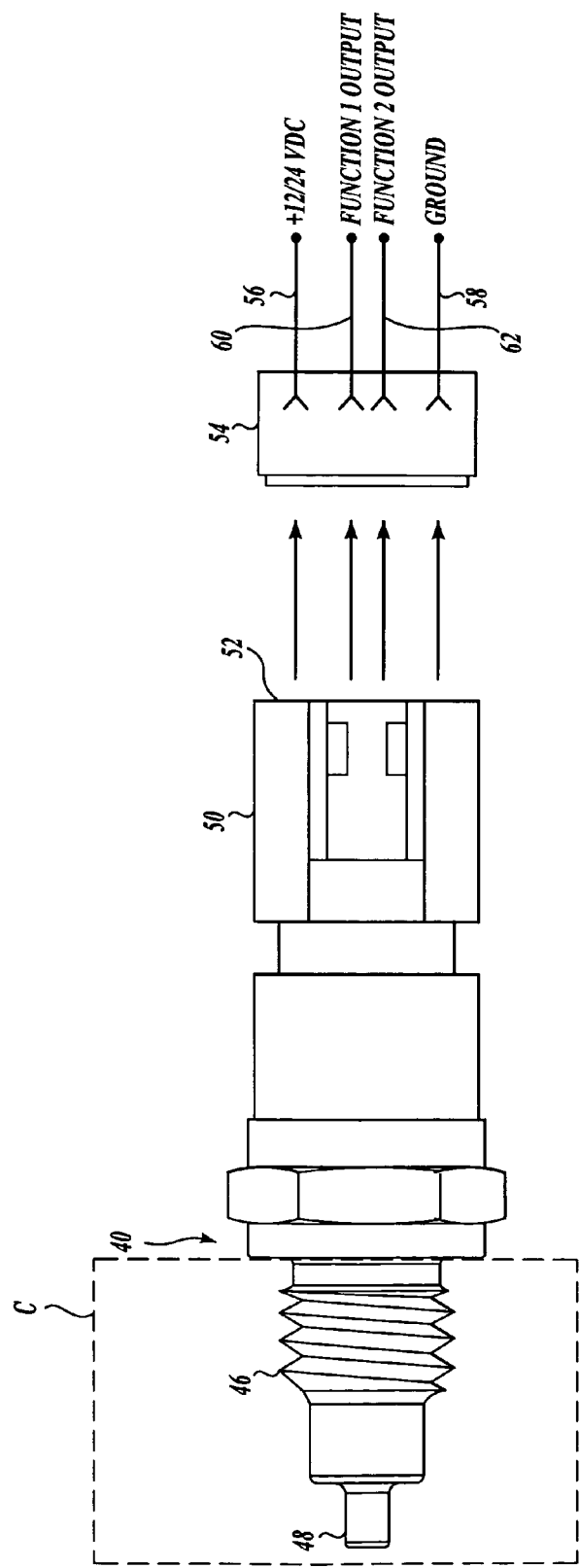
FIG. 5 is a side elevation of the exterior of an electronic temperature switch in accordance with the present invention including separable connector components.

With reference to FIG. 4 and FIG. 5 the UTS is an electronic, solid-state temperature switch 40 that is housed in a threaded brass housing 46. The housing may have any number of thread types, but are all designed to screw into some type of temperature sensing port to sense the ambient temperature inside some type of container C. An example is vehicle coolant with the housing 46 screwed into a threaded port and the sensing tip 48 exposed to the coolant. Models for sensing air temperature and fluid temperature are both part of the UTS family.

The switch will change its output(s) according to the temperature the sensing element (in the tip 48 of the switch) is exposed to. Since the UTS is a microcontroller based design, some models have extra logic built in such as start up timers, minimum-on times, or holdoff times.

The UTS can be designed to use an integral header 50, such as a 3-pin or 4-pin Deutch-style connector 52, 54. For customers who want to use a different connector, the switch may also be built using lead wires to any other type of connector, such as wires 60 shown in FIG. 6 leading to connector component 52. The switch preferably has either 3 or 4 conductors, depending on whether the switch is a single function model or a dual function model. With reference to FIGS. 4 and 5, the signals required are power 56, ground 58, and one or two outputs 60, 62 (also referred to herein as "functions").

Switch output states are generally set according to the following factors:
 Current temperature
 Recent temperature history
 Preprogrammed state timing The switch will generally turn on or off as the temperature increases (or decreases) past a set point (or reset point). In between the set and reset points is a hysteresis region where the output state of the switch is determined by its past temperature history. Finally, the UTS has the ability to use internal timers to provide such options as time-delayed switching, minimum on-times, or different power-up behavior.

In addition to this temperature-related behavior, the UTS will shut off an output if the current draw through that output rises above a cutout threshold. Each output of dual-output switch operates completely independently with regard to over-current cutout.

Software Specifications—General

Unlike many types of temperature switches that use mechanical disks or electrical circuit elements to determine the switch point, the UTS uses software algorithms to determine the temperature and operate the field effect transistors that turn on a given switch output. The software operates on an 8-bit flash microcontroller using a high level programming language.

Temperature Measurement: The temperature is measured by a thermistor. Because the switch can be calibrated at each SET and RESET point, a measurement accuracy of +/−0.5° C. can be achieved at the time of manufacture, i.e., the accuracy is limited by the accuracy of a calibration bath.

Serial Communication: One UTS output is connected to the serial I/O port of the microcontroller. The software can communicate to the remote world via the serial port to provide access to data variables, and set and retrieve operational parameters, and only under abnormal conditions, i.e., only when deliberately accessed for reprogramming/download. Serial communication is only possible for a brief moment following power-up of the switch. Serial communication is not possible during normal operation.

EEPROM Parameter Storage: The microcontroller includes an integrated flash EEPROM that is used to store operational parameters, including the following:
 State temperatures
 State functionality (e.g., open, closed, blink, etc.)
 State change holdoff times
 Minimum on-times
 Maximum on-times
 Maximum-reset times (a maximum-reset time is the minimum amount of time the output will spend in the "other" state once a maximum-time for a given state has been exceeded)
 Startup state and startup delay Note that the above parameters are independently programmable for both the set and reset states and independently programmable for either function. (There is only one startup delay time that can be programmed into the UTS. Note, however, that the two functions can be independently configured to use the startup timer. If they both use the startup timer, the startup must be the same for both outputs.)

Electrical Specifications—General

The UTS has been designed to meet the stringent electrical requirements of the SAE J1455 and SAE J1113 specifications.

For electrical tests, the UTS is considered a class "C" product (SAE J1113-01, Appendix A, Section A.3.2), which may operate "Any function that is essential to the operation or control of the vehicle (e.g., braking, engine management)." The actual classification that is required for any given application depends, naturally, on the application. Because class "C" standards are the most stringent standards in SAE J1113-1, the UTS may be used in a class A, class B, or class C application.

Output Specifications: The outputs are designed to accommodate up to a 5 A load over the temperature range of −40° C. to 125° C. The outputs are protected against short circuits by means of software monitoring and shutting the output off. During initial power-up of the UTS and during any other condition that forces the microcontroller into a reset condition, the outputs are off.

The UTS family can be either a current sourcing or a current sinking configuration and a single or dual-function switch.

Supply Voltage: The switches are designed to operate over a voltage span of 9-36 VDC. This means that a UTS will operate on both standard 12 VDC and 24 VDC platforms. The switches consume a maximum quiescent current of 15 mA. (The quiescent current is the amount of current that the switch consumes with the output off, or the current the switch consumes above the current flowing through the output(s) when on.)

Electromagnetic Compatibility: The UTS is designed to comply with the recommended practices in SAE J1113-1, when used as either a +12 VDC or +24 VDC component as part of an automotive transportation system.

Radiated Immunity: The switch operates within specification (region of performance I) when exposed to radiated electromagnetic fields of 100 V/m from 10 kHz to 18 GHz, as per SAE J1113-21.

Power Supply Noise—Conducted Immunity: The switch will operate within specification with a 30 Hz to 500 MHz conducted RF noise on the power supply. The UTS complies with tests specified in SAE J1113-2, SAE J1113-3, and SAE J1113-4.

Radiated and Conducted Emissions: Radiated and conducted emissions are less than acceptable limits specified in SAE J1113-41 for class 3 devices.

Electrostatic Discharge Sensitivity: The UTS is rated as no worse than "Slightly Sensitive" during handling according SAE J1113-13. Because the UTS should not be exposed to ESD after it has been installed, there are no requirements for ESD sensitivity during normal operation.

Mechanical Specifications—General

Mechanical Design Compliance: The switch is designed to provide excellent thermal response characteristics and to be mechanically rugged for survival in the underhood heavy-duty commercial vehicle environment.

Dimensions: Switch dimensions can vary according to housing design.

Housing Material: The standard switch housing is manufactured from C360 Half Hard Brass. Other materials may be specified as required.

Header Material: The switch header is manufactured from a glass filled nylon.

Connectors and Wires: The switch is designed to have either an integrated header with connector or an inline connector. Versions of the switch that do not use the integrated header utilize 18 AWG wire with SXL insulation conforming to SAE J1128 (June 88). Customer specific connectors with the lead wires may be specified.

Part Marking: A part mark can be supplied including a customer or Index part number, set temperature, mode (normally open or normally closed) and a date code traceable to manufacturing lot and date.

Installation Torque: Installation torque will vary depending on housing threads.

Speed of Response: Thermal speed of response is dependent on the switch-housing configuration. Typical speed of response is less than nine seconds in water.

Environmental Specifications—General

The switch is designed to withstand and survive the common mechanical stimuli found under standard operating conditions in the underhood heavy-duty commercial vehicle environment as defined in SAE J1455 (August 94).

Salt Spray: The switch will survive and demonstrate functionality after exposure to a fine salt spray of 5% salt, 95% water (by weight).

Mechanical Vibration and Shock: The switch will survive and demonstrate functionality during exposure to mechanical vibration to 12 g's RMS and it will survive and demonstrate functionality after exposure to a mechanical shock of 100 g's.

Pressure Wash Immunity: The switch is environmentally sealed to withstand and demonstrate functionality after exposure to an 1100 psi stream of water at a distance of 4 inches when mounted in its normal operating position (mating connector installed, housing threaded in a manifold).

Drop Shock and Installation Harness Shock: The switch is capable of surviving a 1-meter drop onto a concrete floor without compromising switch functionality. The switch wire harness is capable of withstanding a 1-meter drop, while holding the harness from a rigid support, without compromising switch functionality.

Operational and Exposure Temperature and Humidity Range: The operational and exposure temperature and humidity range of the switch are −40° C. to 125° C. and 0 to 100% RH. Within this temperature and humidity range the switch will function as described in the product specification and the associated specification drawing. Although the switch will operate to −40° C., the switch's set and reset points can be no lower than −10° C.

Inorganic Dust Exposure and Gravel Bombardment: The switch is environmentally sealed to withstand and demonstrate functionality after exposure to dust and gravel bombardment as defined in SAE J1455-(August 94) while mounted in its normal operating position (mating connector installed, housing threaded in a manifold).

Acid Exposure: The switch will be resistant to impaired function and/or the onset of detrimental corrosion after exposure to spray or splash of a diluted solution of battery acid (10% acid, 90% water at room temperature (20° C.)) as described in SAE J1455 (August 94).

Automotive Chemical Exposure: The switch will be resistant to impaired function and/or the onset of detrimental corrosion after momentary immersion into the standard automotive chemicals at room temperature (20° C.) as described in SAE J1455 (August 94). Standard automotive chemicals include:

Antifreeze/Water solution
Power steering fluid
Hydraulic oil
Diesel fuel
Pag oil
Kerosene
Transmission fluid
Engine oil
Gasoline
Brake fluid
Degreaser Mechanical Requirements This section covers the mechanical design requirements of the UTS.

GLOSSARY OF TERMS

Speed of Response—the thermal response characteristics of the switch. The speed of response is specified in terms of a time constant, $\tau$, that can be used in calculating how the temperature of the thermistor will change with changes to the external temperature of the switch. The thermal time constant, and thus the speed of response, is a physical property, and is largely dependant on the media surrounding the tip (e.g., air, water, oil, anti-freeze, etc).

UTS—Universal Temperature Switch

PCA—Printed Circuit Assembly

Figure 6:
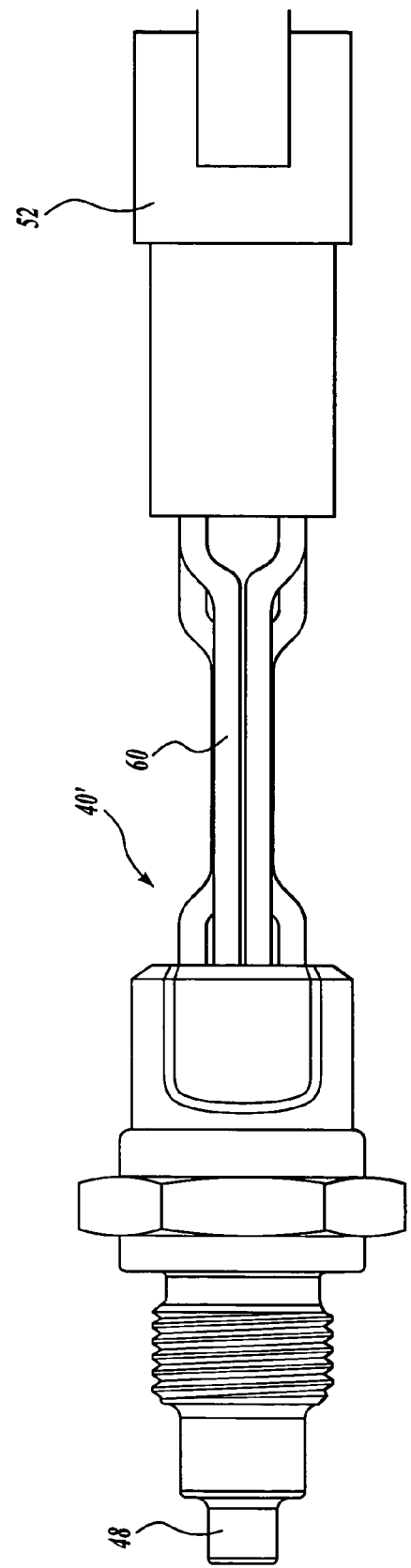
FIG. 6 is a side elevation of another embodiment of a temperature switch in accordance with the present invention having flexible wire leads.

Thermistor—A passive electronic component that changes resistance with temperature Switch Construction Basic Dimensions: With reference to FIG. 5 and FIG. 6, the UTS is designed to be compact for installation in the enclosed spaces within an engine compartment or on the body of a heavy truck or off-road vehicle. The body integrated connector version of the UTS 40 (FIG. 5) will fit within a diameter of 1¼" and be no longer than 3⅛" in its shortest configuration. As seen in FIG. 6, alternatively the UTS 40 can be provided with lead wires 60 extending from the integrated header 50 to the separate connector component 52. In each case power, ground, and one or two output connections are supplied. As seen in FIG. 6, the general package size of the lead wire version of the UTS is somewhat longer than the version shown in FIG. 5. Longer configurations are possible based upon specific applications.

PCA: The UTS is an electronically based temperature switch utilizing a printed circuit assembly (described below) having a thermistor at its distal end or tip. The PCA is mounted in the switch housing and is held in place by a header and potting compound.

Housing: The UTS housing serves three purposes:
1. Protect the PCA from the operating environment.
2. Transmit thermal energy from the working media to the PCA and thermistor.
3. Provide a method of installation for the product.

The housing design is intended for installation into threaded ports such that the housing tip is immersed into the working media (i.e., the media whose temperature is to be sensed). Standard housing threads are M14×1.5, M16×1.5, ⅜-18 NPT and ½-14 NPT. The recommended housing material is C360 Half Hard brass.

Header/Connector: The standard configuration of the UTS will implement an integrated header with connector. The header is designed to environmentally protect an internal printed circuit assembly (PCA) from the underhood environment and provides an external electrical interface with the PCA. An optional variation of the integrated header is a header with wire harness. This option provides the customer with a variety of connector styles. The function of the header with lead wires is the same as the integrated header.

Environmental seal: The environmental seal of the UTS is designed to provide an environmental barrier between the header and housing. This barrier protects the PCA and internal cavity of the UTS from harmful fluids and debris present in the operating environment of the switch. The seal must withstand and maintain the barrier over the exposure temperature and operational humidity range as described below.

Potting compound: The header of the UTS is filled with a potting compound to serve as an environmental seal between the header and the external connection to the PCA for lead wire versions. The potting compound also acts as a path for heat flow and aids in removing heat buildup from PCA components to the housing in both the integral and lead wire header versions.

Thermally conductive grease: Thermally conductive grease or epoxy (or other thermally conductive material) is used inside the heat sensing tip of the housing to increase the thermal conductivity between the thermistor mounted on the PCA and the tip of the housing. The grease is required to have physical properties that minimize material flow during vibration and thermal stress.

Speed of Response: The speed of response of the UTS has a time constant of better than 9 seconds in water. Speed of response will change based on the heat transfer characteristics of the fluid used during testing.

Installation Torque: The UTS is designed to withstand the mechanical torque associated with switch installation. A recommended installation torque is prescribed for each of the standard thread options. Refer to TABLE A for the standard thread sizes and installation torque values.

TABLE A

UTS RECOMMENDED INSTALLATION TORQUE

| Thread | Torque | |
|---|---|---|
| M14 × 1.5 | 15 ft lb | 20 N m |
| M16 × 1.5 | 15 ft lb | 20 N m |
| ⅜-18 NPT | 25 ft lb | 34 N m |
| ½-14 NPT | 25 ft lb | 34 N m |

Axial and Non-Axial Wire/Connector Strain: The UTS is designed to withstand strain applied to the integrated header connector or the wire harness in both the axial direction along the UTS body or the non-axial direction perpendicular to the axis of the UTS body. Wire harness strain can be encountered during installation of the sensor and routing of the wire harness. The UTS is not designed as a supporting device. Axially the wire harness and integrated header is capable of supporting a load of 101*b* and 31*b* in the non-axial direction.

Vibration and Mechanical Shock: The mechanical components and assembly of the UTS are designed to survive the vibration and mechanical shock that is commonly encountered in the heavy truck and off road vehicle environment. The UTS is also designed to withstand in-transit drop shock that can occur during shipping and handling of the device. The UTS will function without degradation of the operating parameters when exposed to these stimuli. (SAE J1455 4.9, 4.10)

Spray Wash The mechanical packaging of the UTS is designed to withstand exposure to high pressure spray wash commonly used for washing vehicles. The UTS will remain sealed and physically intact with no degradation of the operational parameters. (SAE J1455 4.5)

Drop Shock The UTS is designed to survive a fall during handling and installation without degradation of the operational parameters of the device. (SAE J1455 4.10.3.1)

Environmental Requirements

Chemical Exposure: The UTS is designed to withstand exposure to common automotive chemicals present in the underhood environment without degradation of operating parameters. (SAE J1455 4.4)

Salt Spray Resistance: The UTS is designed to withstand exposure to a solution of water and salt that can commonly be encountered in coastal regions or in colder climates where road salt is used. Salt exposure will not degrade the operating parameters of the UTS (SAE J1455 4.3).

Temperature and Humidity Exposure: The UTS is designed to withstand the temperature and humidity extremes encountered in the underhood environment. The UTS is capable of surviving exposure to temperatures between 40 and 125° C. and a relative humidity between 0 and 100%. (SAE J1455 4.1, 4.2)

Gravel Bombardment and Dust Ingress: Dust and gravel are common particles found in the operating environment of heavy truck and off-road vehicles. The UTS is designed to withstand exposure to these particles without degradation of the operating parameters of the device. (SAE J1455 4.7)

PCB/PCA Design

This section explains the details of the electrical hardware (PCB/PCA) design for the "sinking" versions of the UTS.

GLOSSARY OF TERMS

FET—Field Effect Transistor. A solid-state device that switches the current flow on or off.

PCB—Printed Circuit Board. Bare circuit board prior to mounting components.

PCA—Printed Circuit Assembly. The PCB with all the components mounted, or assembled.

Physical Envelope

Figure 7:
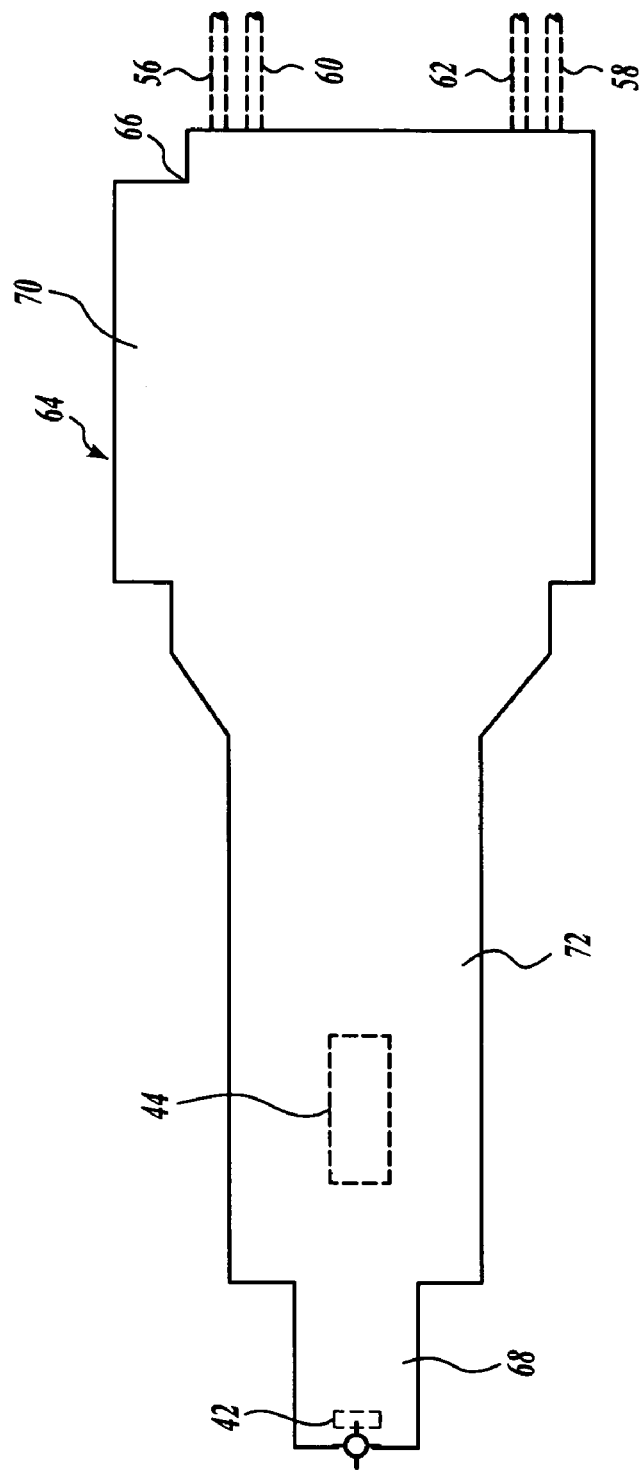
FIG. 7 is a top plan of a printed circuit board usable in an embodiment of an electronic temperature switch in accordance with the present invention.

With reference to FIG. 7, the UTS uses a 0.062-inch thick six-layer PCB 64. The board outline is fairly complex in order to match up with the housing and header. The PCB is designed to mate with either an integrated header, or with a wire-lead header. The notch 66 in the upper right corner of the board provides clocking for the integrated header design.

The small tip 68 is designed to provide good thermal transfer from the tip of the housing to the thermistor 42 that is mounted on the tip. The thermal transfer is aided by having thermal grease or epoxy injected into the tip of the housing before the UTS printed circuit assembly (PCA) is inserted into the housing. The tip of the board is designed to be wide enough so that the board will hit the housing before the thermistor can come into contact with the housing.

With reference to FIG. 7, the right end portion 70 of the PCB 64 is designed to fit inside a plastic header, while the central portion 72 and distal tip 68 of the PCB is designed to fit inside the brass housing. The switch is designed to have the header filled with epoxy, while the remainder of the PCB is left unfilled.

Thermal Isolation and Response

The UTS is designed to sense the temperature at the tip of the switch adjacent to the thermistor. The small tip at the end of the PCA is designed to thermally couple the thermistor to the thermal environment at the outside of the tip, while the neck down area provides some thermal isolation from the remainder of the body of the switch. The printed circuit board has as little copper as possible on the tip of the PCB to enhance the thermal isolation of the thermistor from the rest of the circuitry.

Thermal response time of a switch is a very important factor of a temperature switch. In essence, this is a measure of how well the switch measures the desired temperature. The thermal response for a step change in temperature can be characterized mathematically with EQUATION 1. The temperature of the switch, (thermistor) as a function of time, is dependent on the starting and ending temperatures, and the physical makeup of the system. The thermal makeup of the system is summarized by the variable $\tau$, called the thermal response time constant. Each physical system (including external medium) will have a specific thermal response time. A method of measuring $\tau$ is described below:

Equation 1 Temperature Change as a Function of Time and Characteristic Thermal Time Constant. $T_1$ is the Initial Temperature, $T_F$ is the Final Temperature, T is the Time Since the Change Occurred $$T(t) = T_f - (T_f - T_i) * e^{\frac{-t}{\tau}}$$

The UTS performs very well in water (and like fluids). The UTS has a harder time with air/gaseous type media, since the thermal transfer characteristics between the brass housing and air are affected much more by the thermal migration from the body of the switch to the tip. In water, the thermal response time is approximately 5-7 seconds. For media such as air, the time is significantly higher.

Determining Thermal Response Time Constant

The thermal response time is unique to any physical setup. Water is a universal liquid that is very appropriate for determining the characteristic thermal response time for a switch. With water, results can be compared over time and between locations. Using more exotic materials such as glycerin or glycol, while completely valid, are hard to replicate over time and between locales, especially if the liquids are diluted or polluted.

The theory behind determining the thermal response time is based on EQUATION 1. The equation describes the temperature change of an object as a function of time, starting at an initial temperature, being introduced into a different temperature environment in a step change fashion.

To determine $\tau$, the temperature must be known at a certain point in time. Since we are dealing with a switch, we can easily determine two temperatures: the set and reset points. At these two temperatures, the switch responds by changing the output (as long as the switch is currently in the other state). As a result of this limitation, we have to use either the set point or the reset point to determine $\tau$. To do this, we must set the switch up to ramp through the temperature of the set point, and measure the time that it takes to switch. We can then use the initial temperature, final temperature, the known switch point temperature and the time the switch takes to change state, to solve EQUATION 2 for $\tau$.

Equation 2 Solving for the Characteristic Time Constant $$\frac{T_f - T(t)}{(T_f - T_i)} = e^{\frac{-t}{\tau}}$$

In order to simplify the calculations, it would be nice if EQUATION 2 resolved to a simple solution. If the quotient on the left of the equation equals $e^{-1}$, or 0.368, the result of taking the natural log of both sides results in −1 on the left, and $-t/\tau$ on the other. This results in the time we measure with this setup equaling the characteristic time constant r.

Figure 8:
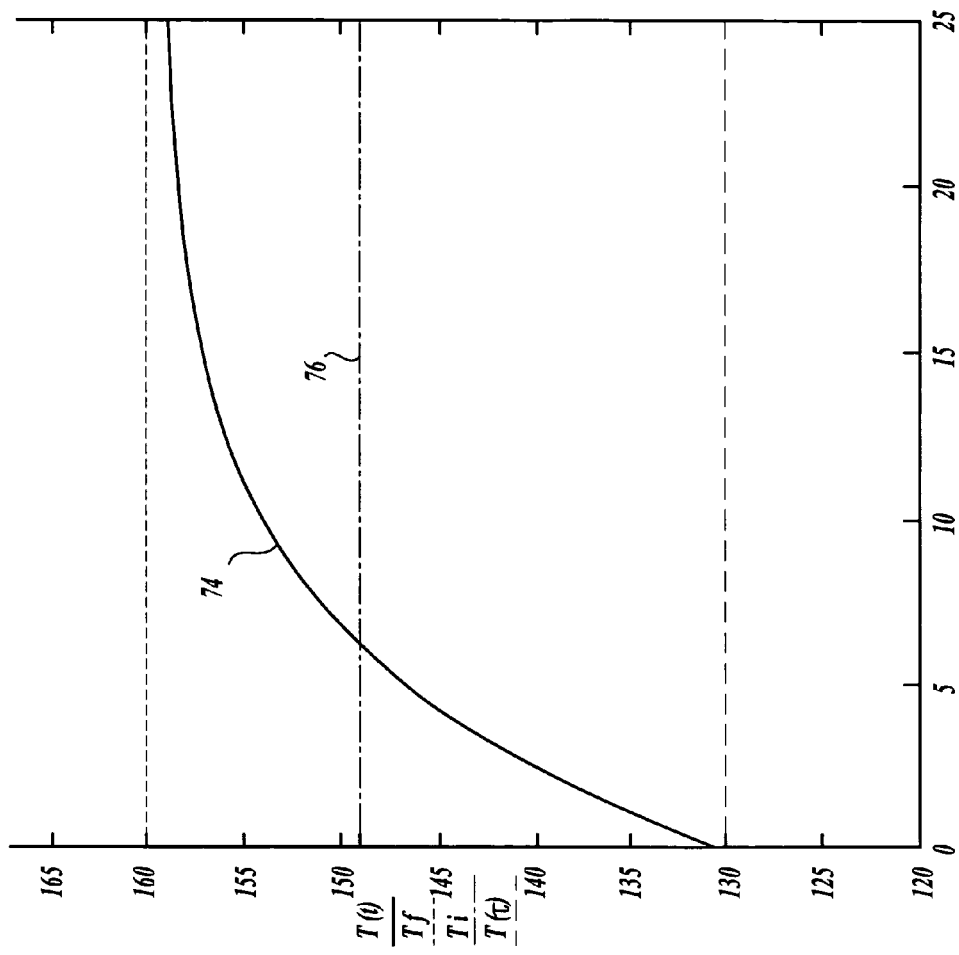
FIG. 8 is a graph illustrating calculation of the time constant of an electronic temperature switch in accordance with the present invention.

In order to get the left quotient of EQUATION 2 to equal 0.368, we want the switch point temperature to be 63.2% of the way from the initial temperature to the final temperature, as shown in FIG. 8 (temperature versus time graph; time is in seconds, temperature in degrees F.; the middle horizontal line represents 63.2% of the way from the initial to the final temperature; this graph represents a value of $\tau$ of 6 seconds). As seen in the figure, the 63.2% line 76 intersects the temperature line 74 at the value of $\tau$. EQUATION 3 shows the solution in long form, and can be used for other temperature combinations.

Equation 3

Solution for the Characteristic Time Constant $$\tau = -\frac{t}{\ln\left(\frac{T_f - T(t)}{(T_f - T_i)}\right)}$$

Once $\tau$ is known, we can use that value to more generically predict how the switch will behave with changing temperatures.

Electrical Requirements

This section covers the electrical hardware design requirements and electrical performance requirements of the UTS.

GLOSSARY OF TERMS

Sinking—indicates that a switch sinks current to ground when it is closed. This means that the switch should be connected between the load and ground in the target circuit. (The power line should be connected to the other side of the load.)

Sourcing—indicates that a switches sources current when it is closed. This means that the switch should be connected between power and the load in the target circuit. (Ground should be connected to the other side of the load.)

Quiescent current—the amount of current that the switch circuitry consumes. This is the amount of current consumed by the switch in addition to the load current, or the amount of current consumed by the switch with the output off.

Normally Open (NO)—indicates that a switch will be open at temperatures below its set and reset point.

Normally Closed (NC)—indicates that a switch will be closed at temperatures below its set and reset point.

Speed of Response—the thermal response characteristics of the switch. The speed of response is specified in terms of a time constant, τ, that can be used in calculating how the temperature of the thermistor will change with changes to the external temperature of the switch. The thermal time constant, and thus the speed of response, is a physical property, and is largely dependent on the media surrounding the tip (e.g., air, water, oil, anti-freeze, etc.).

FET—field effect transistor. A solid state switching device commonly used in DC switching applications.

Operational Parameters Requirements

This subsection covers the operating characteristics, parameters, and requirements of the UTS.

Operational Input Voltage Range: The UTS is designed to operate on an input voltage of 9-36 VDC. This input voltage covers both 12V and 24V systems. Within this voltage range, the switch will have switch points that are within the specified tolerance, and will maintain short circuit protection.

Temperature Sensing: Temperature sensing is accomplished using a surface mounted thermistor that is mounted on the end of a PCB. The tip of the PCB is just wide enough to accommodate the thermistor and clearance around it. The design is intended to thermally connect the thermistor to the desired media around the tip of the switch, and thermally isolate the thermistor from heat variations coming from either the field effect transistor (FET) or the external environment through the header and mounting threads. Some variation is inevitable, but the intent of the design is to minimize the effect to be less than the switch tolerance.

Microcontroller: The UTS is designed to use an 8-bit flash microcontroller in the Microchip PIC16F648A family. In addition to digital I/O, this family has analog comparators that can be used in the over-current measurement scheme. The micro controller uses an internal RC oscillator to generate clock cycles. No external components for the clock circuit are required.

Temperature Measurement: The UTS measures the temperature by comparing two RC time constants. The first time constant is measured through a reference resistor, and the second through the thermistor, and the times compared. The ratio of the two measured times is equal to the ratio of the known resistance and unknown resistances. Additional details are given below.

Speed of Response: Although the speed of response of a temperature switch is largely dictated by the mechanical design of the switch, the electronics are designed to have a speed of response that is no more than 1 second. This means that the speed of response of the completed switch will be based almost entirely on the physics of the mechanical design.

Function Outputs: The UTS may either have one or two outputs. The UTS family consists of two output types that can either be single or dual function and that require different circuitry. One output type is sinking, in which the switch will connect ground to the output pin, and will allow current to flow (conventional current flow) from the output pin to the ground pin. The second output type is sourcing, in which the switch will connect power to the output pin, and will allow current to flow from the power pin to the output pin. The outputs are configured to be in the open state for a microcontroller that is not working or not connected properly to the FET. As such, the microcontroller must actively shut the output off. Each output is rated at 5 A resistive or inductive (the switch is rated for 0.2 H inductance maximum) over the entire rated temperature span of −40 to 125° C.

Switch Over-current Protection: The UTS will disengage the output if an over-current condition is detected. The exact level that the switch will shut off depends on the voltage reference set up on the PCA. At minimum, unless a particular switch is set to limit the current at a lower threshold, the switch is capable of 5.0 amps (from −40° C. to 125° C.) Depending on the temperature, the actual shut off point may be more than 5.0 amps, but the switch will not be damaged. This threshold may be changed for specific applications that need a lower current cutout. Since the over-current protection algorithm is implemented by the microcontroller, the output will automatically recover after the short circuit is removed. See below for details.

Communication Through Outputs: The UTS is set up to communicate serially through the output wires. Electrically, the outputs are fed back to the microcontroller through a filter and protection circuit. Since the communication is performed through the output wires, communication is not possible while the outputs are engaged. Details on communicating to the switch are given below.

In Circuit Serial Programming (ICSP): The UTS is set up for in circuit serial programming. This allows the microcontroller to be reprogrammed while still soldered onto the switch printed circuit assembly. Details on ICSP can be found in general from Microchip (see Microchip's In Circuit Serial Programming Guide).

Timing Accuracy: The timing accuracy for the UTS is dependent on the RC oscillator built into the microcontroller, which is accurate to within 5% over the operating temperature and voltage range. As a result, all timing parameters used in the UTS cannot be guaranteed to be better than ±5%.

Connectors—Switch Interface: The UTS can have two different styles of connection, either an integrated header, or wires terminated with a connector. An integrated header (a header that has a connector built into it), can solder directly to the printed circuit assembly (PCA) of the UTS. For a wire terminated switch, wires can be soldered to the PCA that pass through a header and that are terminated with an in-line connector.

Electrical Environment Requirements

This section covers the various electrical tests that the UTS must survive.

Steady State Power Supply Requirements: The UTS family operates on both +12 VDC and +24 VDC electrical systems. The switches are designed to operate over a wide range of input voltages from 9 VDC to 36 VDC without degradation of the current carrying capability, or the switch point accuracy. The switches consume a maximum of 10 mA of current (quiescent current), in addition to the output current, over the entire rated voltage range. These requirements are met over the entire temperature range of −40° C. to 125° C. (SAE J1455, 4.11.1.)

Wiring Errors and Supply Voltage Extremes: The UTS is designed to withstand several forms of wiring errors and voltage extremes. The switch meets all these requirements from −40 to 125° C.

Reverse Polarity: The switch withstands a wiring error where power and ground are interchanged, with nominal operating voltage applied. The switch will not operate (output will be off) during reverse polarity, but the switch will withstand this fault without permanent damage, and without degradation of the operating parameters once the wiring error is corrected. (SAE J1455, 4.11.1.)

Short Circuit: The UTS is designed to withstand a short circuit on any conductor to ground or power without permanent damage or degradation of the operating parameters once the short circuit is removed.

Battery Electrolyte Boil-Off/Over Voltage: The UTS withstands an over-voltage condition of 80 VDC for 2 minutes. The switch is not required to operate correctly for this duration, but must return to normal operation after the over-voltage condition is removed, without degradation of operating parameters. (SAE J1455, 4.11.1.)

Under Voltage: The UTS withstands exposure to an under-voltage condition of 5 VDC for 2 minutes. The switch is not required to operate correctly for this duration, but must return to normal operation after the under-voltage condition is removed, without degradation of operating parameters. (SAE J1455, 4.11.1.)

Electrical Transient, Noise and Electrostatic Immunity Requirements: The UTS lives in a harsh electrical environment found in the under hood environment. The UTS meets or exceeds the following electrical environment tests, as defined in SAE specification J1455, 4.11.1 (revision August 94).

Load Dump: The UTS withstands a load dump (SAE J1455, 4.11.2.2.1) for both 12V and 24V systems, at 125° C., on the main power lines with a waveform described by the following formulas. The source impedance is 0.4Ω (12V system) or 0.8Ω (24V system), and the rise time is approximately 100 μS. The test fixture is designed to deliver a maximum energy of 70 J per pulse. The switch withstands a minimum of 5 pulses at 10-second intervals.

$$\text{For + 12VDC systems:} V(t) = 14 + 86 \times e^{\left(\frac{-t}{0.4}\right)}$$

$$\text{For + 24VDC systems:} V(t) = 28 + 122 \times e^{\left(\frac{-t}{0.4}\right)}$$

Inductive Switching: The UTS withstands an inductive switching transient (SAE J1455, 4.2.2.2) for both 12V and 24V systems, at 125° C., on all lines with a waveform described by the following formulas. The source impedance is 20Ω, and the rise time is approximately 1 μS. The test fixture is designed to deliver a maximum energy of 5 J per pulse. The switch withstands a minimum of 10 pulses at 1-second intervals.

$$\text{For + 12VDC systems:} V(t) = 14 \pm 600 \times e^{\left(\frac{-t}{0.001}\right)}$$

$$\text{For + 24VDC systems:} V(t) = 28 \pm 600 \times e^{\left(\frac{-t}{0.001}\right)}$$

Mutual Coupling: The UTS withstands mutual coupling (SAE J1455, 4.11.2.2.3) for both 12V and 24V systems, at 25° C., on all lines with a waveform described by the following formulas. The source impedance is 50 n, and the rise time is approximately 1 μS. The test fixture is designed to deliver a maximum energy of 0.045 J per pulse. The switch withstands a minimum of 10 pulses at 1-second intervals.

$$\text{For + 12VDC systems: } V(t) = 14 \pm 300 \times e^{\left(\frac{-t}{15\mu s}\right)}$$

$$\text{For + 24VDC systems: } V(t) = 28 \pm 300 \times e^{\left(\frac{-t}{15\mu s}\right)}$$

Chattering Relay The UTS is designed to withstand capacitively coupled noise that would be generated by a chattering relay at 25° C. The switch is able to withstand level 4 severity, as described in SAE J1113/12.

Electrostatic Discharge: The UTS is designed to withstand handling ESD events, and is classified as no worse than "slightly sensitive," as defined in SAE J1113/13. See SAE J1113/13 for a description of the testing and procedures.

RF Electromagnetic Field Immunity: When tested per SAE J1113/21, the UTS switch withstands L6 severity (100V/m) from 10 kHz to 1 GHz without degradation in performance, and without permanent damage.

Radiated and Conducted Emissions: When tested per SAE J1113/41, the UTS switch has conducted and radiated emissions below the level required for class 3 components. (See SAE J1113/41 for a description of the levels associated with class 3.)

Electrical Detail Design

This section explains the details of the electrical hardware (PCB/PCA) design for the UTS is arranged by electrical sub-circuits. Each subsection describes what the sub-circuit is intended to do, and how the design is implemented.

GLOSSARY OF TERMS

ICSP—In-Circuit Serial Programming. A method of programming the microcontroller while it is mounted on the target PCA (in circuit).

CCP—Capture and Compare Port. This is a pin on the microcontroller that will generate an internal interrupt when the voltage changes state.

Physical Envelope

The UTS uses a 0.062-inch thick six-layer PCB 64. The board outline shown in FIG. 7 is fairly complex in order to match up with the housing and header. The PCB is designed to mate with either an integrated header, or with a wire-lead header. The notch 66 in the upper right corner of the board provides clocking for the integrated header design.

The small tip 68 is designed to provide good thermal transfer from the tip of the housing to the thermistor that is mounted on the tip. The tip of the board is designed to be wide enough so that the board will hit the housing before the thermistor can come into contact with the housing.

Microcontroller

The UTS uses a Microchip PIC16F648A series microcontroller as the basis of the electronics measurement and algorithm control. The microcontroller is a 20-pin part that has the following notable features used in this design:

Digital I/O

Two built in analog voltage comparators

USART communication port

Capture and Compare Port (CCP)

RC oscillator

Flash program memory and In-Circuit Serial Programming (ICSP) capability

Brown out detection (low voltage shutdown/reset)

Watchdog (resets the microcontroller in the event of an infinite loop in the software code.)

The microcontroller includes other features that are not used in this design. See the Microchip 16F648A datasheet (www.microchip.com) for further information. The features mentioned in this section are discussed in further detail in the applicable sections below.

Microcontroller Clock—Time Keeping

The UTS has several timers in its operational algorithms. The internal RC clock of the microcontroller controls the timing for these algorithms. The clock operates at a nominal frequency of 4.0 MHz. The tolerance of this clock is approximately 5%, and varies somewhat with time and temperature. Experiments have shown that the clock varies much more from part to part than it does with time and temperature (i.e., the clock is fairly stable for any given unit over the operational temperature range).

Thermal Isolation and Response

The UTS is designed to sense the temperature of an external fluid at the tip of the switch. The small tip at the end of the PCA is designed to thermally couple the thermistor to the thermal environment at the outside of the tip, while the neck down (small protrusion at the end of the PCB) area provides some thermal isolation from the remainder of the body of the switch. The printed circuit board has as little copper as possible on the tip of the PCB to enhance the thermal isolation of the thermistor from the rest of the circuitry.

Temperature Measurement

Figure 9:
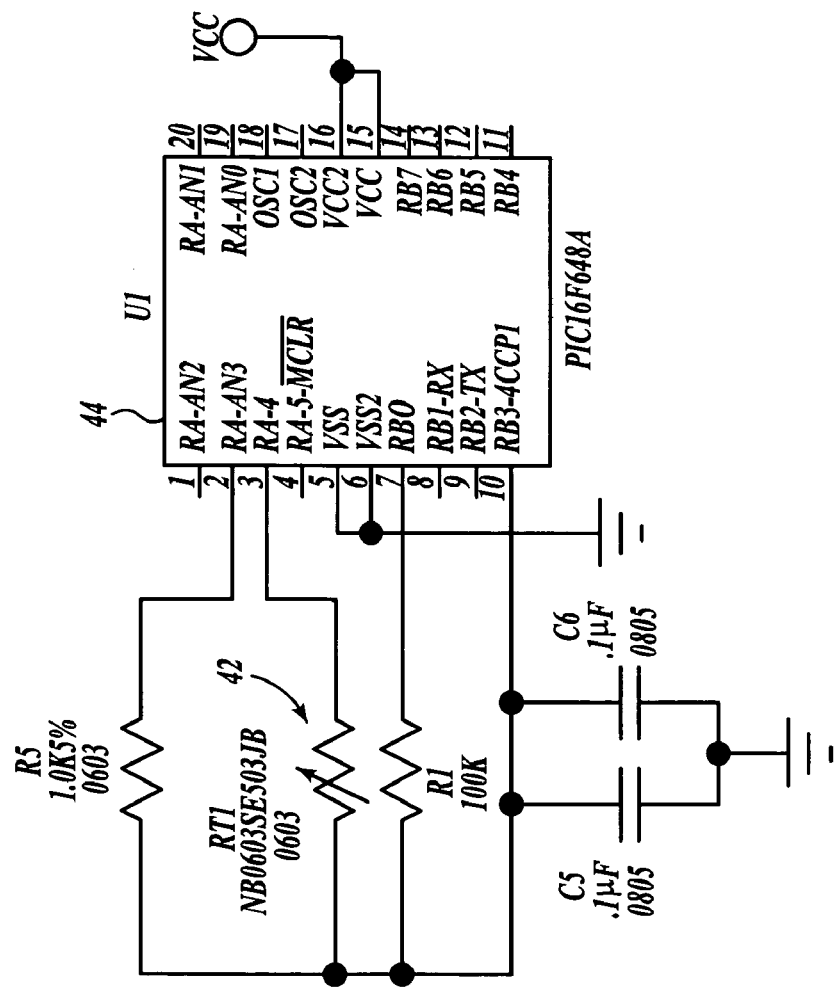
FIG. 9 is a circuit diagram illustrating one aspect of an electronic temperature switch in accordance with the present invention, namely, aspects of the temperature measurement circuitry.

The temperature is measured with a surface mount thermistor mounted on the tip of the PCA. The thermistor resistance changes with temperature. Because the microcontroller used in the UTS design does not have an analog to digital converter (ADC) built in, the measurement must be done using a digital method. The measurement algorithm programmed in the microcontroller 44 measures resistance of the thermistor 42 by comparing the discharge time of a capacitor and a known resistor with the discharge time of the same capacitor with the unknown resistance of the thermistor 42 as shown in FIG. 9.

C5 and C6 in parallel make up the capacitor element in both RC discharge time measurements. Two capacitors are used to increase the robustness of the design (using two capacitors lowers the capacitance density of the part) while maintaining a higher capacitance to help with longer discharge times. The method of calculating the unknown resistance using two RC time constants makes the actual capacitance value irrelevant (within a range that will allow the microcontroller to measure the discharge times—note: the software is set up to allow a maximum of 65 mS time for the discharge of the capacitor). The capacitance is chosen to make the discharge time max out at approximately 65 mS for a resistance of approximately 200 kΩ, which corresponds to a temperature that is below freezing. Longer discharge times mean better resolution, but lower maximum resistance readings. R1 in FIG. 9 is the known resistor used in the measurement circuit, and RT1 is the thermistor 42. Pin 10 (RB3-CCP1) is the capture and compare pin (CCP) of the microcontroller 44. R5 is the charge resistor that is used to charge the capacitors quickly.

Switch Power Supply

Figure 10:
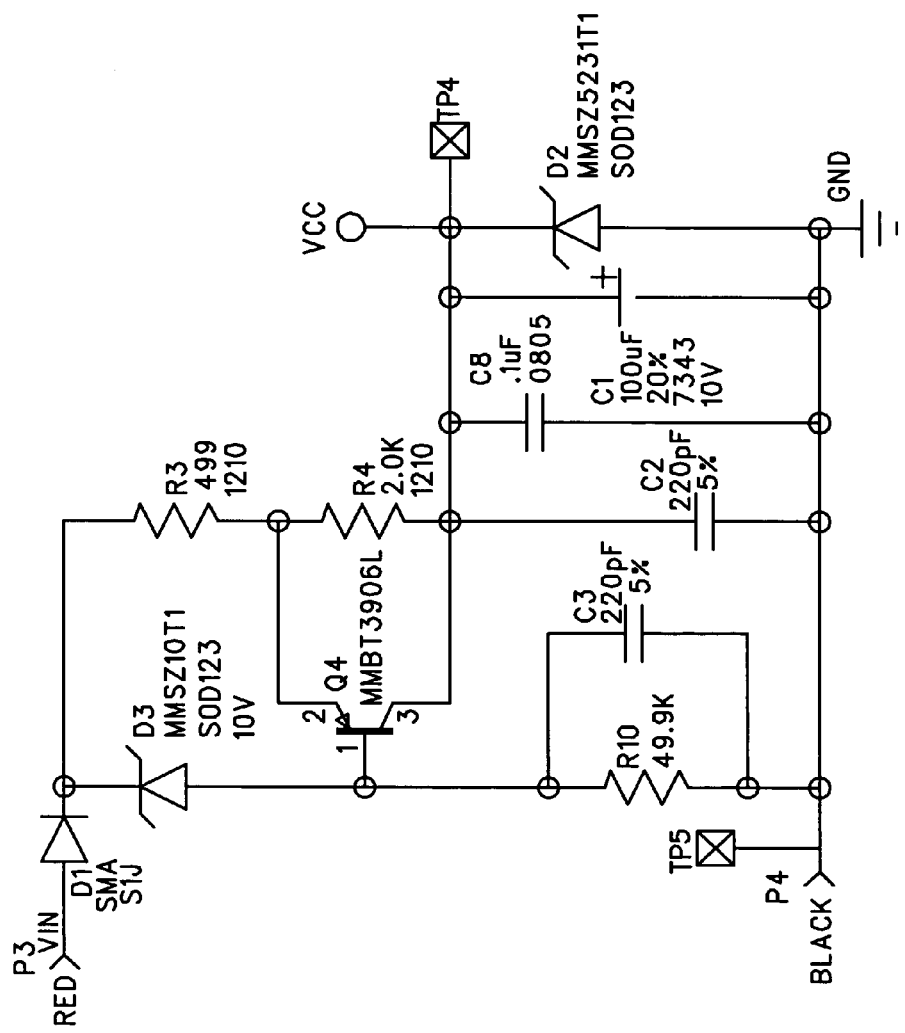
FIG. 10 is a circuit diagram illustrating another aspect of an electronic temperature switch in accordance with the present invention, namely, the power supply circuit.

The UTS is designed to operate on both 12 VDC and 24 VDC electrical systems, or from 9 to 36 VDC. In addition, the UTS must survive exposure to 80 VDC for two minutes (SAE J1455 electrolytic boil-off test). As a result, special circuitry is required to achieve this goal. FIG. 10 shows the power supply circuit for the UTS.

The series diode D1 offers reverse polarity protection for the microcontroller. Voltage regulation for the microcontroller is performed by the zener diode D2. Several values of filter capacitors (C1, C2 and C8) are used to eliminate noise over a broad range of frequencies. The remaining circuitry is used to control the amount of potential current that is delivered to the main supply point (labeled VCC in the schematic).

At low voltages, D3 does not conduct, so the base of Q4 is biased on, essentially shorting out R4. In this case, the supply circuit acts like a series resistor/zener diode configuration. At 9 VDC, there is approximately 3 VDC dropping across R3, or approximately 6 mA available current before the supply voltage begins to drop.

As the supply voltage increases, D3 will begin to conduct, limiting the voltage drop across R3 to approximately 9.7 VDC, or approximately 19 mA available current. In the range of normal operation between 16 VDC and 36 VDC, this configuration acts like a constant current source to the power supply.

When the voltage rises above approximately 40 VDC, the voltage drop across R4 increases enough to raise the total amount of current through the circuit. At 80 VDC, approximately 30 mA are flowing through the supply, dividing across R3 and R4 as a standard voltage divider. The design is able to withstand the 80 VDC over voltage test for the required two minutes at room temperature (SAE J1455). The key challenge to elevated voltage is the amount of power being dissipated in the power supply circuit. At 80 VDC, approximately 2.4 W are being dissipated in the switch. This is not a condition that should continue indefinitely, but is acceptable for shorter periods of time. At 40 VDC, the switch is only dissipating approximately 0.8 W, which is acceptable for an indefinite period of time.

As the input voltage falls low enough, the power supply becomes unregulated. This point depends on the current drawn by VCC, but will typically occur at approximately 8 VDC. At this point, the zener regulating diode D2 stops conducting current (the VCC voltage falls below the zener voltage, approximately 4.7 VDC) and all the current goes to the electronics. When the voltage on VCC falls to approximately 4.2 VDC, the brownout detection inside the microcontroller holds the microcontroller in reset until the voltage returns. When the microcontroller enters reset, the microcontroller output lines go to a high-impedance state, and the output of the switch will go to its default state.

R10 allows a bias current conduction path through the base of Q4. C3 provides filtering for EMC concerns.

Switch Output

The output of the UTS is an open-drain sinking type switch. (See FIG. 11 for typical system installation, and FIG. 12 and FIG. 12A for diagrams of the switch output drive circuitry.) When the switch is in the open state, only leakage current will flow through the output pin 60, 62 (from pin 9 of the microcontroller for Function 1 and pin 12 for Function 2).

Figure 11A:
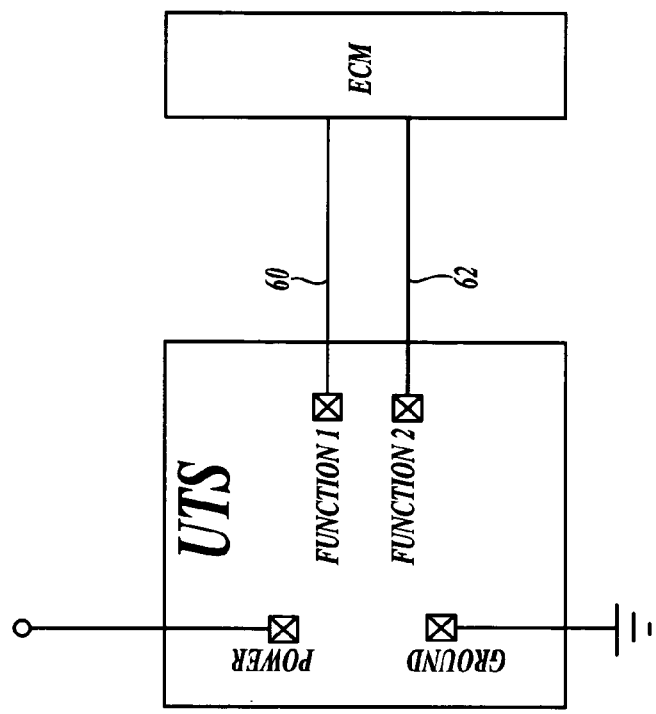
FIG. 11 and FIG. 11A are simplified diagrams showing an electronic temperature switch in accordance with the present invention connected for specific uses, namely, controlling operation of an indicator light and a solenoid.
Figure 11:
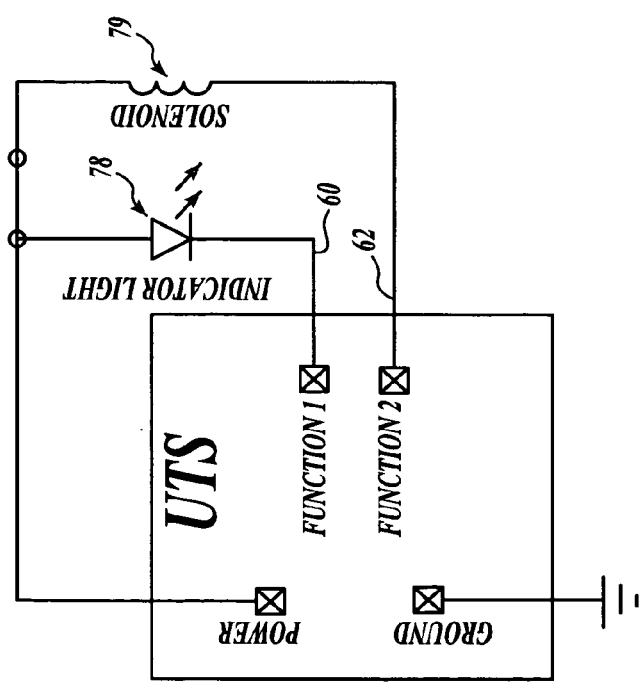

The voltage on the output pin 60, 62 while in the open condition depends on the system and load configuration. For instance, if the UTS output is connected to an indicator light 78 from a 24 VDC source, the voltage on the output will be 24 VDC while the UTS is in the open state. If the output of the UTS is disconnected while the UTS is in the open state, the voltage on the output will be near ground. When the switch changes to the closed condition, the UTS will conduct current from the output pin 60, 62 to a ground pin of the switch. The UTS uses a solid-state logic level Field Effect Transistor (FET) as the switching device. FIG. 11 shows a two function UTS controlling a solenoid 79 separately from the indicator light 62. As shown in FIG. 11A, one or more of the outputs can be transmitted to a vehicle electronic control module (ECM).

Figure 12:
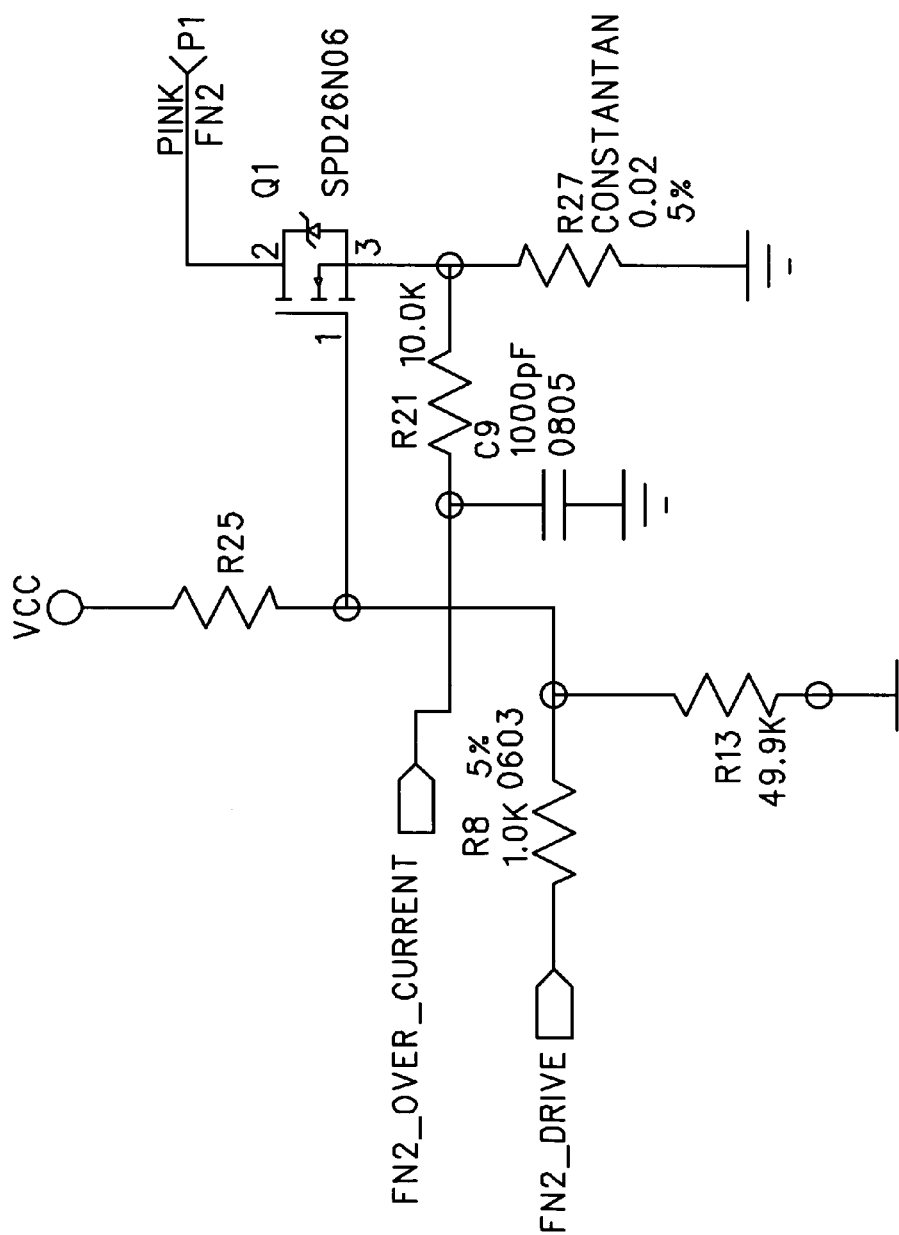
FIG. 12 and FIG. 12A are diagrams of other aspects of the circuit of an electronic temperature switch in accordance with the present invention, namely switch output and over current circuitry.
Figure 12A:
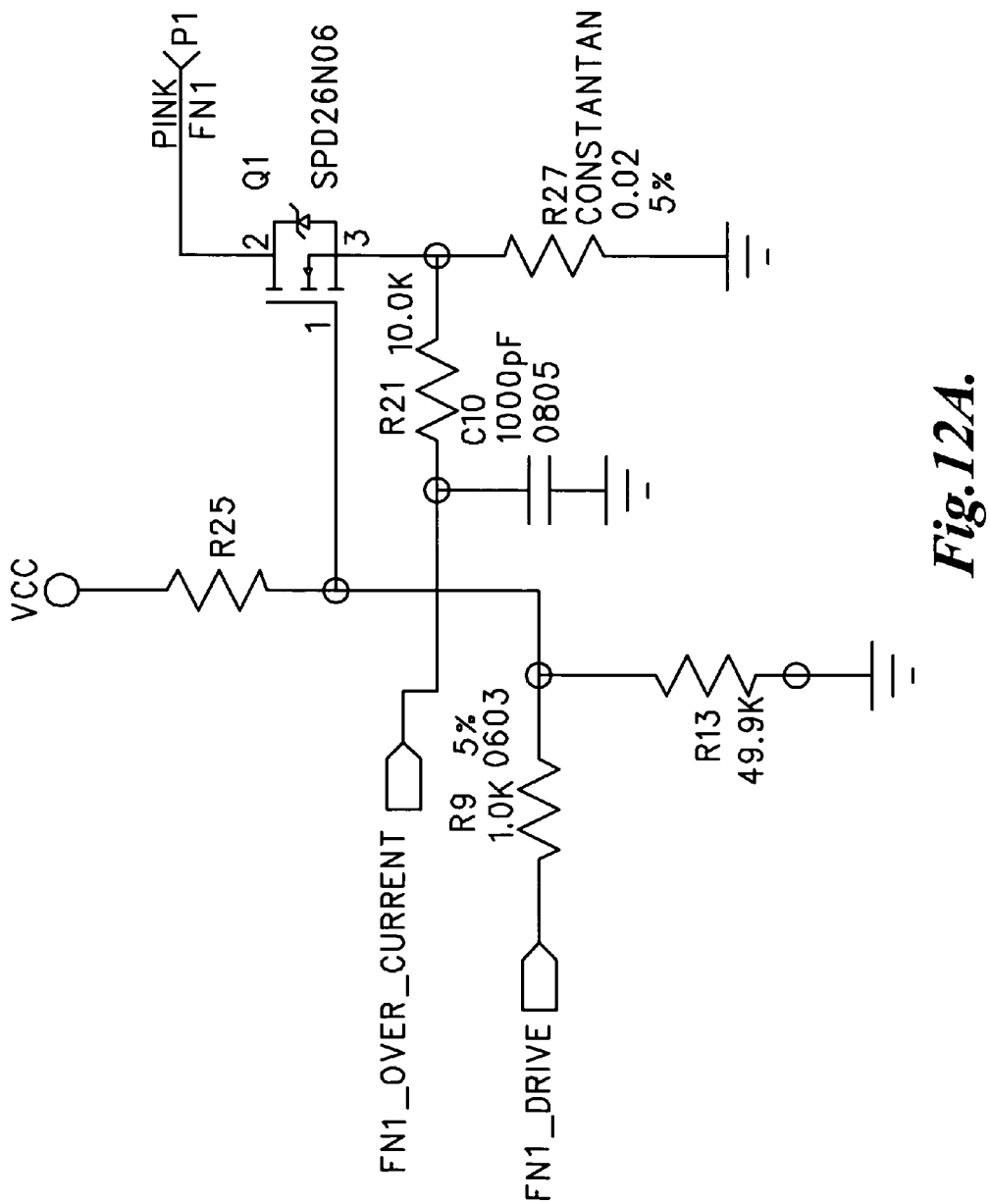

In FIG. 12, the FET is Q1. The gate of the FET is connected to the microcontroller (pin 12) through a 1.0 kΩ resistor, R8. Since the FET has a logic level gate trigger, there is no other requirement for any further gating circuitry. The gate also has a 49.9 kΩ pull-down resistor (R13). Provisions are also made for a pull-up resistor on the gate of the FET (R25). A filter capacitor can be added for noise and/or EMC issues. The pull-down/pull-up resistors are to determine what state the FET will switch to in the event of a micro-controller failure, or at low enough voltages to cause the micro-controller to enter brown-out reset. For the pull-down resistor configuration, the FET will be off in the case of a micro-controller failure in which the output drive pin of the micro-controller changes to a high impedance state.

The UTS is either a single-function or a dual-function switch. For a dual-function switch, a separate output FET has identical circuitry to that described here (see FIG. 12A where the switching device is Q2).

Over Current Cutout

The UTS has an over-current cutout to prevent damage to the switch or other system components. The output current path of the UTS has a series "sense" resistor (R27 in FIG. 12) to generate a small voltage that is proportional to the current flow. The resistor chosen for this task is actually a resistive wire that is approximately 20 mΩ. The wire is made of Constantan, which is a copper/nickel alloy typically used in creating thermocouples. The resistance of the wire is dependent on the length of the wire. The wire is designed to solder to surface mount pads in a lap-solder joint configuration. This installation method gives a fairly tight control on the length of wire, and thus the overall resistance of the current sense resistor. Constantan wire was chosen as the sense resistor since the conventional sense resistor is very large and expensive. This solution, however, is fairly compact, and quite inexpensive.

Figure 13:
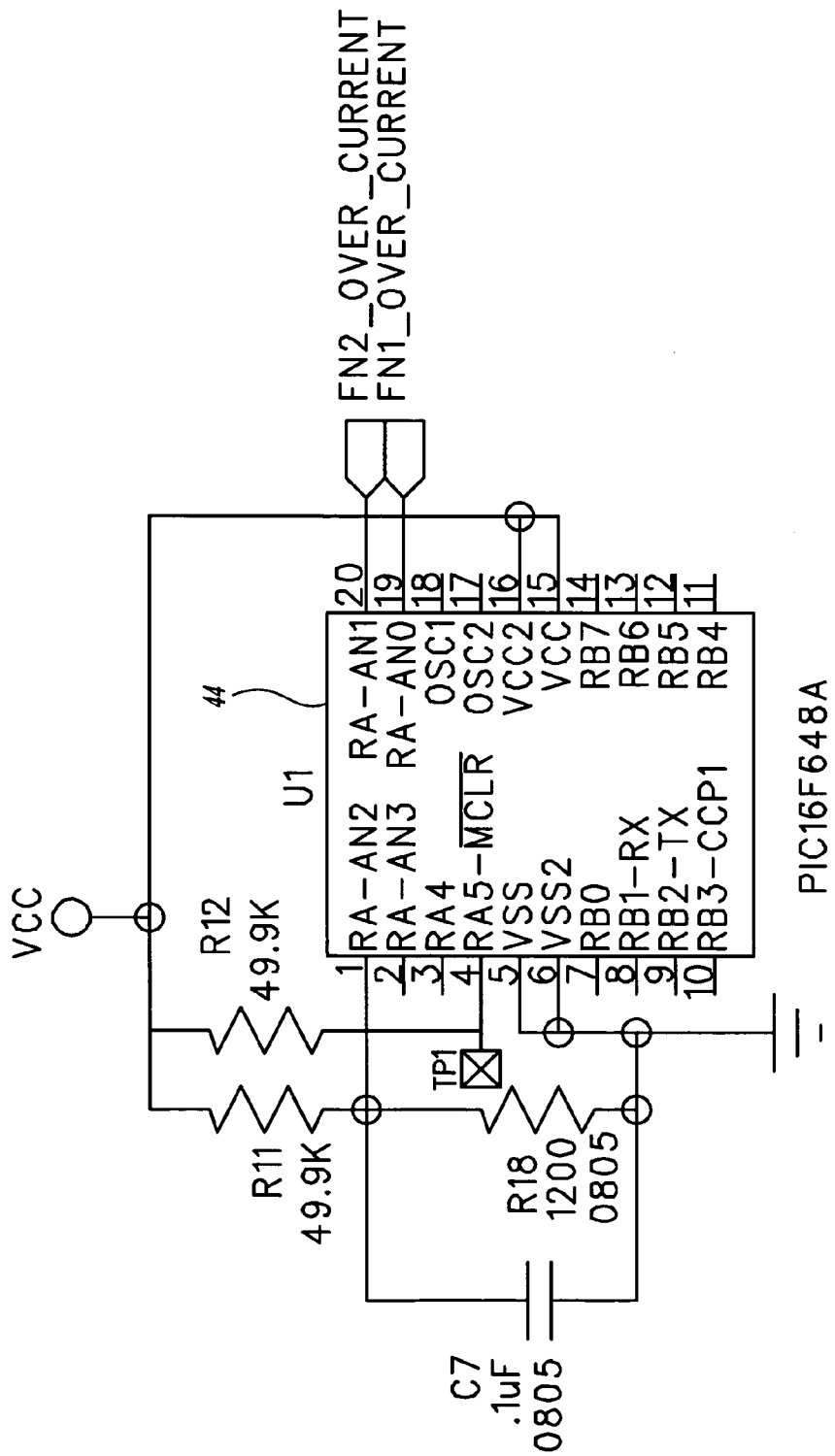
FIG. 13 is a diagram of another aspect of the circuit of the electronic temperature switch in accordance with the present invention.

The voltage generated by current passing through the sense resistor is filtered by a 10.0 kΩ resistor and 1000 pF capacitor (R21 and C9 in FIG. 12). This RC pair forms a low-pass filter with a 3 dB point of 15.9 kHz. This frequency was chosen as a compromise between high frequency filtering of the input signal, and speed of response of the over-current detection. The generated voltage is routed into one leg of a voltage comparator that is built into the microcontroller. A resistor divider from VCC (R11 and R18 as shown in FIG. 13) generates the voltage for the other leg of the voltage comparator. (The resistor divider has filter capacitor C7 that forms a low-pass filter with a 3 dB point of 32 Hz to filter the reference signal from any high frequency noise.)

When the comparator senses that the voltage of the current sense is above the threshold, the microcontroller can take the appropriate action, such as shutting off the output of the switch. This configuration means that the current level of the over-current detection is hardware determined, and not software configurable. This was required to be hardware determined since the voltage of the threshold is approximately 55 mV, and the threshold will change at 1 A per 20 mV change, and the resolution of the internal voltage reference of the microcontroller only has a 10 mV resolution.

The current threshold can be calculated by comparing the induced voltage in the sense resistor with the voltage reference of the comparator. The voltage of the comparator is calculated as a simple resistor divider of VCC, or 49.9 kΩ/549 Ω*VCC. For VCC=5 VDC, the reference is 55 mV. This will fluctuate proportionately with the voltage supply, and so the tolerance of the current threshold is no better than the tolerance of the voltage supply. The voltage induced in the sense resistor is the current times the resistance, or approximately 10 mV/A. Dividing 55 mV by 10 mV/A gives a nominal current threshold of 5.5 A. Adjusting either the sense resistor or the reference voltage divider changes this threshold.

The second function of a dual function switch also has a sense resistor in series with the output line. This voltage is also routed to an analog comparator pin as shown in FIG. 13. The voltage reference, however, is shared for the two comparators. The microcontroller has the ability to tie both internal comparators to the same input reference voltage.

Communications

One of the features of the UTS is the ability to calibrate the switch set and reset points when the switch is in its final assembled configuration. This requires the switch to be able to communicate to the outside world, preferably without any additional wires (see FIG. 14). The communication scheme for the UTS communicates via the function 1 output wire 60. In order to communicate on one wire, the UTS uses a half-duplex communication stream that is compatible in packet structure and time with RS-232 serial communications of a PC. FIG. 15 depicts the communication scheme (communication timing details), along with communications initialization and signal levels depicts a typical communication interchange. The lines depicted in FIG. 15 are the RX pin on the microcontroller, FN1 output pin and TX pin on the microcontroller, and the TX_INHIBIT line inside the UTS.

Communications Signals

Figure 14:
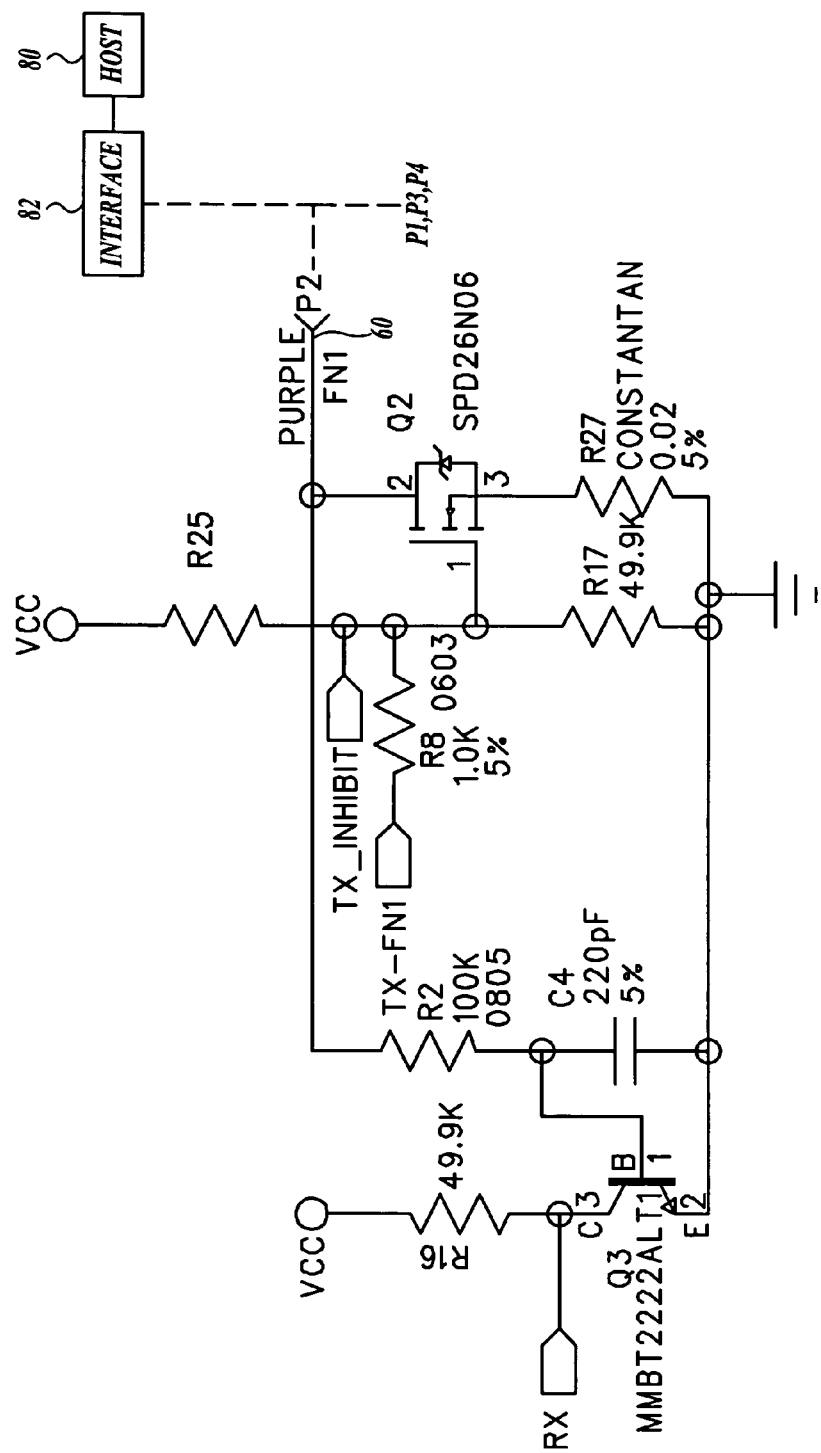
FIG. 14 is a diagram illustrating another aspect of an electronic temperature switch in accordance with the present invention, namely communication circuitry.
Figure 15:
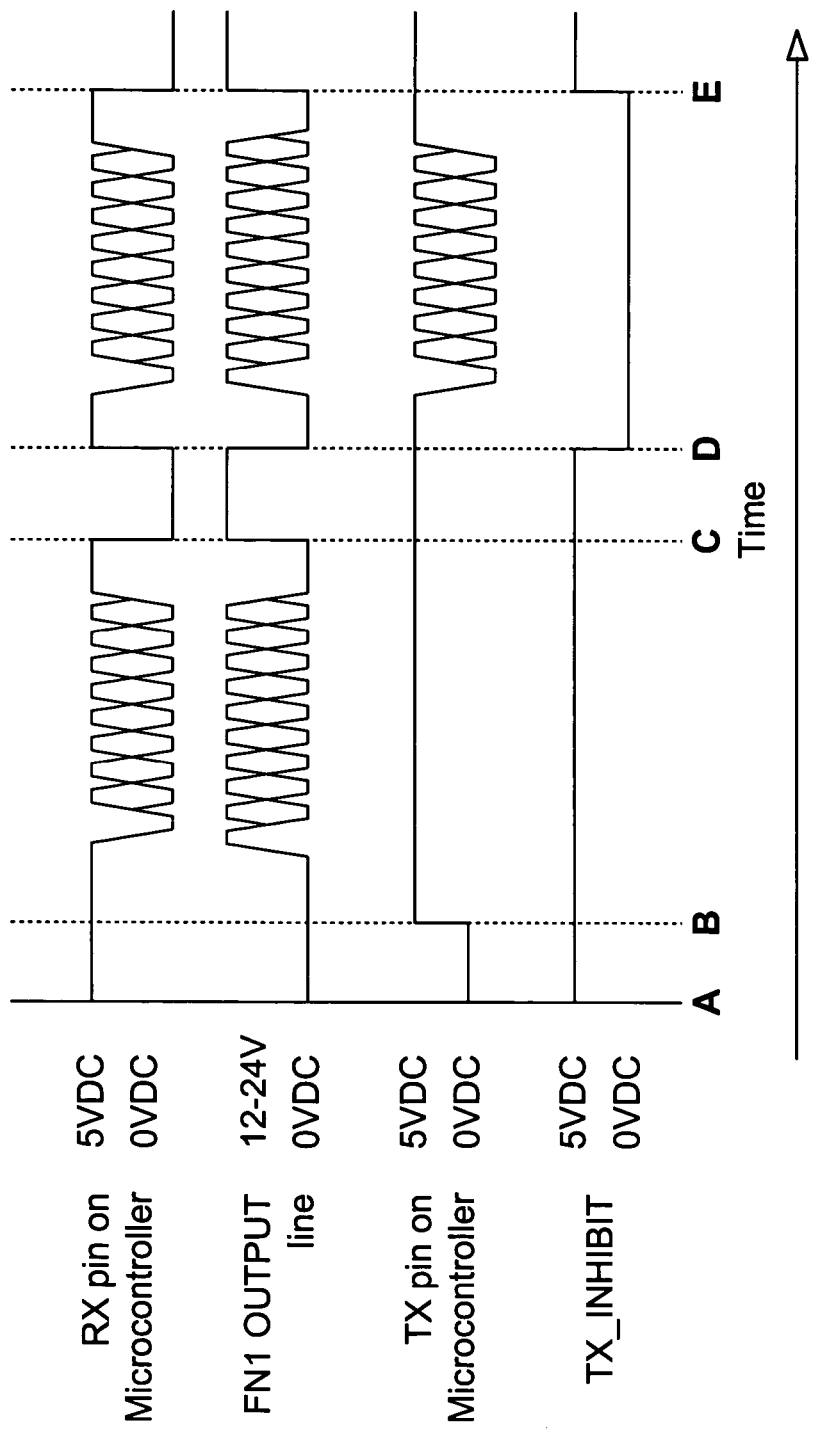
FIG. 15 is a graph illustrating communication signals used to program an electronic temperature switch in accordance with the present invention.

The communication circuitry is shown in FIG. 14 along with function 1 output circuitry. The RX line connects to RB1 of the microcontroller, and is the incoming receive line of the Universal Synchronous Asynchronous Receive Transmit (USART) serial communication port. The TX-FN1 line is attached to RB2 of the microcontroller, and is the transmit line of the USART.

In order for the UTS to use the function one output as the communication line, communications mode must be initialized. Because this output line's main purpose is to mode is not entered into inadvertently, and that the switch does not get stuck in communications mode if it accidentally enters communications mode.

A software algorithm controls whether the switch enters into communications or not (additional details are given below). At power up, (point A in FIG. 15) the output line 60 is held low by a computer 80 and communications interface 82 which can mate with the connector component 52. The UTS recognizes this as a request for communications, and enters communications mode (the TX-FN1 line goes high) at point B in FIG. 15. The software can configure the USART to either be active, or inactive. When communications mode is entered, the software configures the USART to be active, and the function of the RX and TX lines are driven by the USART hardware of the microcontroller. The software algorithm only allows communication right at start up, and only for a short period of time. After the communication period is over, or if communications mode is not initiated, the USART is disabled, and these two pins return to normal I/O pins.

Communications Levels

The idle state of the USART is logic high. This means that once the USART is active, the TX-FN1 line will go high. This also implies that the RX line must start a communications packet (byte) from the high state. A transistor (Q3 in FIG. 14) is used to get the proper signal polarity and voltage on the RX line. A high on the output wire results in a low on the RX line, and vice versa. An incoming communications packet is shown in FIG. 15 between point B and C. At point C, the communications interface 82 releases the FN1 output line 60 so that the UTS microcontroller can transmit a response packet.

On the transmit side, a high on the TX-FN1 line results in the FET turning on, and the output line being low. Because the idle state of the TX line of the USART is high, the idle state of the output line is low, which prevents a communications packet from coming into the switch. To allow communication packets to come into the switch, the FET must be held off. To prevent the TX line from driving the FET on, TX_INHIBIT line overrides the gate of the FET by holding the gate low until a communication packet is ready to be sent out. Point D in FIG. 15 shows the TX_INHIBIT line changing to a high impedance line, allowing the UTS to transmit the packet out. The TX line at this point will toggle high and low to transmit the correct bit pattern.

After the packet is transmitted, the TX_INHIBIT line again holds the line low (point E in FIG. 15) until the next communication packet is ready to be sent out. While the TX_INHIBIT line is low, a communication packet is able to propagate from the output pin to the RX communication pin.

Communications Interface

The microcontroller of the UTS uses 5 VDC logic. The host computer 80 communicates using RS-232 levels (12 VDC). The power and output lines of the UTS use 0-36 VDC. As a result, a communications interface 82 is required to negotiate communications between the host computer and the UTS device. At minimum, the interface must perform the following tasks:

Receive the communications packet from the host computer;

Initialize the UTS into communications mode with a power cycle (unless the UTS is already in communications mode, and will not time out before the communications transaction will be completed);

Send a communication packet to the UTS;

Receive a return communication packet from the UTS;

Transmit the communications packet back to the host computer.

The most straightforward way to accomplish this interface is to use an interface module that uses a microcontroller with two USART ports. The first port communicates to the computer, and the second port communicates to the UTS after initializing communications mode.

In-Circuit Serial Programming (ICSP)

The UTS has the ability to be re-programmed, even after the microcontroller has been soldered onto the PCA. The ability to do this is called in-circuit serial programming, or ICSP. To program the microcontroller's flash memory, several conditions must be met. First, the ICSP points must be accessible on the target. Second, an adapter must be made to connect the target PCA to the device programmer. Lastly, the device programmer must be properly installed and running with Windows software on a host computer. For complete details on ICSP, see Microchip's application note DS30277, "ICSP Guide."

Figure 16:
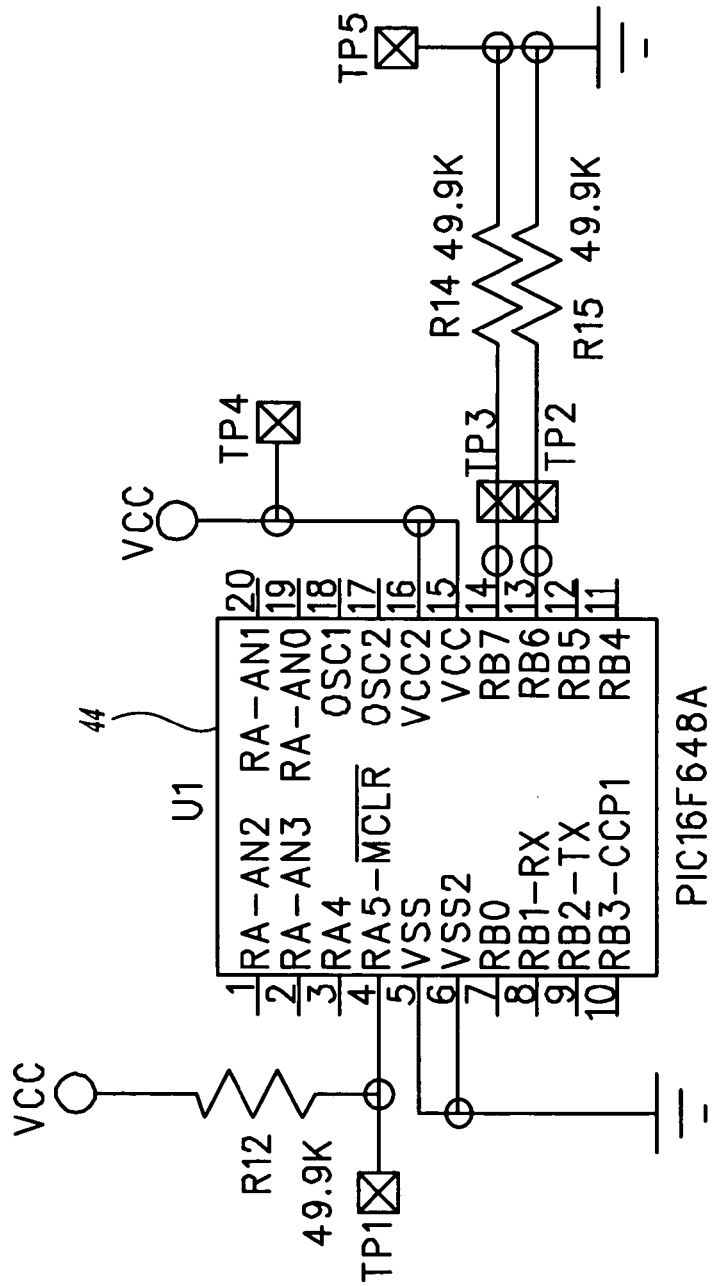
FIG. 16 is a diagram illustrating another aspect of the circuit of an electronic temperature switch in accordance with the present invention, namely, programming circuitry.

FIG. 16 shows the required ICSP connections for the UTS, each labeled with a test point. TP1 provides access to the MCLR line, which must be taken to approximately 13 VDC to initiate programming mode. In normal operation, R12 keeps MCLR high to prevent the microcontroller from entering a master clear reset. TP2 attaches to RB6 to give access to the programming clock signal. R15 is a pull-down resistor to hold this line normally low. TP3 is attached to RB7 to give access to the programming data signal. R14 is a pull-down resistor to hold this line normally low. TP4 is attached to VCC to give access to the microcontroller power line. The last signal required for ICSP is the ground, which can be accessed either through the lead wire or through TP5.

Electrostatic Discharge Compliance

The UTS is designed to withstand an electrostatic discharge (ESD) up to ±25 kV in the handling configuration. The most problematic ESD path in this configuration is from the wires through the circuitry to the housing. The UTS includes an ESD shunt path from each wire to the housing. The path consists of a 200 VDC 220 pF capacitor attached to each wire and an edge-plated portion of the circuit board. This edge-plated portion of the circuit board is designed to make contact with the brass housing. An ESD will travel through the wires, cross over the capacitor, and dissipate to the housing.

Figure 17:
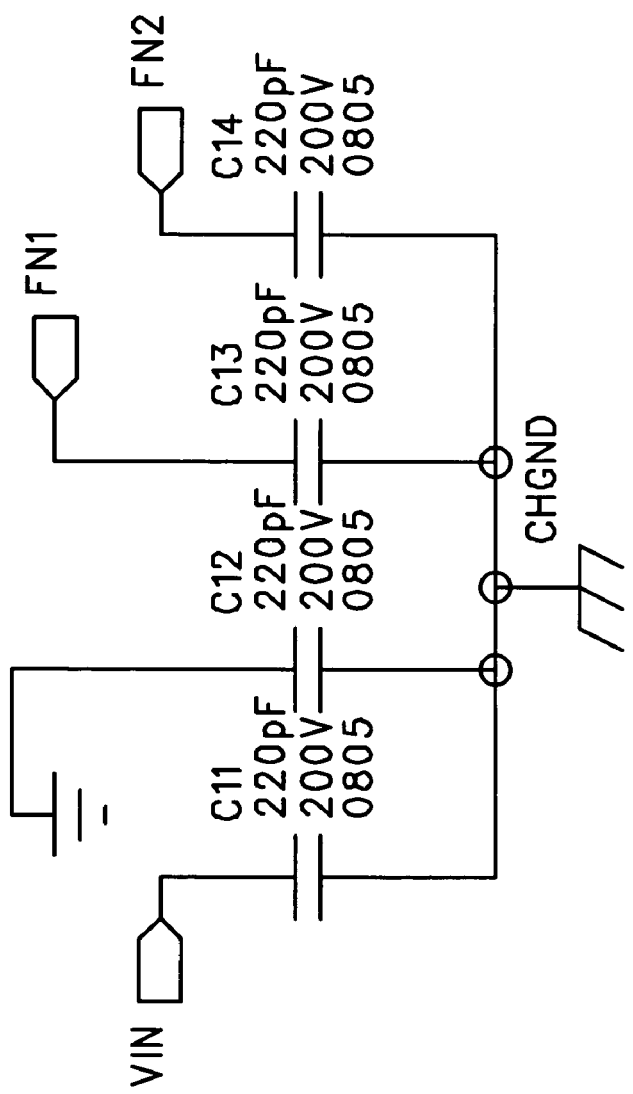
FIG. 17 is a diagram illustrating another aspect of the circuit of an electronic temperature switch in accordance with the present invention, namely, a schematic representation of electrostatic discharge circuitry.

Without this ESD path, the ESD will travel through the circuitry (particularly the microcontroller) and then jump to the housing, potentially damaging the microcontroller or other sensitive components. See FIG. 17 for a schematic representation of this circuitry.

SUMMARY OF MICROCONTROLLER PIN ASSIGNMENTS

TABLE B

MICROCONTROLLER PIN-OUT

| Pin | Name | Description |
|---|---|---|
| 1 | AN2 | Input voltage reference for comparators used to detect voltage reference |
| 2 | RA3 | Output used to charge reference capacitor |
| 3 | RA4 | Output used to discharge reference capacitor through thermistor |
| 4 | RA5 | Master Clear - used in flash programming using ICSP |
| 5 | VSS | Ground |
| 6 | VSS2 | Ground |
| 7 | RB0 | Output used to discharge reference capacitor through fixed reference resistor |
| 8 | RX | USART receive input |
| 9 | TX | Function 1 output drive, also USART transmit output when in communications mode |
| 10 | CCP1 | Capture pin for measuring thermistor/resistor discharge times |
| 11 | RB4 | Transmit inhibit output signal, overrides the drive signal given by pin 9 and allows 1-wire signals to be listened to on pin 8 |
| 12 | RB5 | Function 2 output drive |
| 13 | RB6 | ICSP clock input |
| 14 | RB7 | ICSP data I/O |
| 15 | VCC | +5V power |
| 16 | VCC2 | +5V power |
| 17 | OSC2 | Oscillator input (not used) |
| 18 | OSC1 | Oscillator input (not used) |
| 19 | AN0 | Over-current sense input for function 1 |
| 20 | AN1 | Over-current sense input for function 2 |

Software Requirements

This section describes the generic software requirements of the UTS. This UTS is designed to be extremely accurate as well as providing programmable setpoints for both set and reset functions and programmable holdoff times. Because of the flexible nature of the design, the same hardware platform can be used as a temperature control module for applications that require more logic than a simple temperature switch.

GLOSSARY

USART—Universal Synchronous Asynchronous Receiver Transmitter. This is the electronic component used to interface with a standard RS-232 serial port.

I/O—Input/Output.

EEPROM—Electrical Erasable Programmable Read Only Memory. This type of memory will retain its contents even when power is removed from the device.

CRC—Cyclic Redundancy Check. A standard method for verifying the accuracy of a data packet sent over a communications link.

ASCII—American Standard Code for Information Interchange. A standard method for encoding alphanumeric characters into one byte characters.

N-channel—A version of a FET that is used to sink currents to ground when switched on.

P-channel—A version of a FET that is used to source currents from power when switched on.

Overview

The software operates on a Microchip PIC16F648A-series microcontroller, a 20-pin (in SSOP package) microcontroller with two analog comparator inputs, a USART module, a capture and compare module, and several general-purpose bi-directional I/O pins. The software is written in C and compiled into machine language for the microcontroller.

The switch senses the resistance of a thermistor built into the switch and sets the output of the switch based on that resistance (and hence, temperature). General specifications regarding the performance of this switch are found in preceding sections.

Requirements

This subsection of the document states the specific software requirements that the switch must meet.

Versions of the Software

Four basic varieties of the software exist:

Single function sourcing current (switches in power supply voltage when "on");

Single function sinking current (switches in ground when "on");

Dual function sourcing current (switches in power supply voltage when "on");

Dual function sinking current (switches in ground when "on").

The software for each version is contained in the same source code modules and is controlled using compiler switches to compile separate versions for each type of switch.

Measurement of Temperature

The temperature setpoints are accurate within 0.5° C. of any calibrated point in the range from −10 to +125° C. at the time of manufacture.

EEPROM Data Parameters

Operational parameters for each switch are stored in the onboard EEPROM. The following parameters are stored in the EEPROM for each output function of the switch:

1. SET and RESET resistance measurement (e.g., temperature) points. The data for each point is stored as a scaled 16-bit value that specifies the ratio of the discharge capture times for the fixed resistor and the thermistor (see Microchip application note AN-512).
2. Functionality for the SET and RESET states. Possible values for the functionality include 0 (open), 1 (closed), or 2 (blinking) when the switch is in the SET or RESET state.
3. Holdoff time before beginning the SET state or RESET states. This parameter is a 16-bit number that specifies the number of 65 ms timer interrupts that must occur after a temperature state change is detected before the output of the switch actually changes state. If the temperature drops below (rises above) the SET (RESET) threshold before the timer expires, the timer is cleared and the output state does not change state. This allows for an operational delay following a temperature state change.
4. Minimum on-time for switches in either the SET or RESET state. This parameter is a 16-bit number that specifies the number of 65 ms timer interrupts that must occur after an output state change is initiated before the output of the switch is allowed to change state again. This allows for the system the UTS is installed in to provide a minimum stimulus in response to a temperature state change.
5. Maximum on-time for switches in either the SET or RESET state.

This parameter is a 16-bit number that specifies the maximum number of 65 ms timer interrupts that may occur after an output state change is initiated before the output of the switch is forced to change state again. When this timer expires, the output will be forced into the other state for the period of the maximum-expired-reset-time. This allows for the system the UTS is installed in to provide a maximum stimulus in response to a temperature state change.

6. Maximum-expired-reset-time for switches that make use of parameter in either the SET or RESET state. This parameter is a 16-bit number that specifies the number of 65 ms timer interrupts that must occur after an output state change is initiated by the maximum on-time timer (see item 5 above) before the output of the switch is allowed to revert to the "normal" output state defined by the current temperature. This allows for the system the UTS is installed in to provide a minimum time of rest to the system.
7. Startup delay used for function 1 above, function 2 above, or both functions. The value is an 8-bit number that specifies the number of 65 ms timer interrupts that must expire before beginning operation as a switch. During this time, the switch output will initially be in the startup state (see item 8 below).
8. Startup state for function 1 or function 2 (either SET state or RESET state). The possible values for this parameter are 0 (RESET) or 1 (SET).

The EEPROM memory is doubled buffered with checksum calculations to recognize and correct errors in the EEPROM due to a single cell failure in the EEPROM.

Startup State

At power-up, the software looks for the switch outputs to be driven in parallel by the external system in which the switch is installed (e.g., driven to ground for a sinking switch or driven to the power supply by a sourcing switch). If the software detects this condition, it enters communications mode for a period of no more than five seconds. In communications mode, the switch will listen for and respond to serial communications on its function 1 output line. During the time that the UTS is listening for communications, it will not act as a switch. Following the initial five-second window for communications, the UTS will resume normal switch operation.

If the software does not sense that the inputs are being driven in parallel by the system, then it will immediately begin normal operation as a switch.

When powered on in the hysteresis region (the temperature between set and reset points), the switch will (after checking for communications mode) power up in the state specified by the startup state parameter stored in the EEPROM. If a startup delay is specified in the EEPROM, then the UTS will hold the output in this state until the startup delay timer expires.

Serial Communications

As mentioned above, the UTS can only communicate via serial communication if the inputs are being driven in parallel by the system during startup. Even then, the UTS can only communicate for five seconds maximum before reverting to normal switch operation. As additional security, the packet format and CRC must be accurate for the switch to accept the serial communication.

The switch is designed to accept serial communications at a nominal rate of 9600 baud. Because the internal timing of the baud rate is dependent on the microcontroller's clock rate, the actual rate may vary from 9600 baud by up to 10%. The switch has no internal mechanism to adjust its baud rate and is dependent on external devices to adjust their clock rate if serial communications can not be established at 9600 baud.

Serial Communications Protocol

Serial communication uses an 8-byte packet of information consisting of the following bytes:
  Address byte (ignored by the switch software)
  Command byte (see below for details)
  Data Byte 0
  Data Byte 1
  Data Byte 2
  Data Byte 3
  CRC (Cyclic Redundancy Check) Low Byte
  CRC High Byte When the message is received by the UTS, it will respond to the message by returning the message (possibly with different data bytes and a new CRC). All packets are initialized with an ASCII STX character (not counted as part of the eight bytes above).

Serial Communications Command List

TABLE C lists the serial commands implemented as part of the software for the UTS. Note that some commands to the UTS require data bytes and some do not. Some commands to the UTS return data bytes and some do not. By default, the UTS software echoes back the data bytes in the packet that were sent to it. If, for example, a command requires that DB0 and DB1 be changed to respond to a command, then only those two bytes will be changed in the response packet. Data bytes DB2 and DB3 will not change, but will be echoed back as part of the response packet.

TABLE C

SERIAL COMMUNICATIONS COMMANDS

| Serial Command | Command Number | Data Bytes (to UTS) | Data Bytes (from UTS) | Notes |
| --- | --- | --- | --- | --- |
| GET_VERSION | 1 | None | DB0 - Hardware version<br>DB1 - Software version | Used to determine which version of the hardware and software the switch was built with |
| CLEAR_EEPROM_DATA | 2 | None | None | Used to clear the entire EEPROM memory to zero (useful during switch initialization and EEPROM programming) |
| GET_DATA_ELEMENT | 3 | DB0 - Data element to return<br>DB1 - Number of bytes to return (1 or 2) | DB0 - Value of data stored in data array location specified by DB0<br>DB1 - (optional) or Value of next byte if requested by DB1 | Operational parameters from the EEPROM are stored in this data array. This is useful to see what operational values are being used. |
| SET_DATA_ELEMENT | 4 | DB0 - Data element to set<br>DB1 - Number of bytes to set (1 or 2)<br>DB2 - Value of byte that is to be set<br>DB3 (optional) - Value of second byte to be set (if DB1 = 2) | None | Used to set operational parameters in the EEPROM. Note that this function will update both EEPROM banks and the checksum. |
| GET_EEPROM_DATA | 5 | DB0 - Address of the first byte in EEPROM memory to return | DB0 - 3 Value of the data byte specified by DB0 and the next three data bytes | This function returns data directly from the EEPROM |

TABLE C-continued

SERIAL COMMUNICATIONS COMMANDS

| Serial Command | Command Number | Data Bytes (to UTS) | Data Bytes (from UTS) | Notes |
|---|---|---|---|---|
| SET_EEPROM_DATA | 6 | DB0 - Address of the byte in the EEPROM memory to set<br>DB1 - Value to set it to | None | This function sets individual EEPROM memory cells |
| GET_CURRENT_READING | 7 | None | DB0 - Low byte of the current ratio of thermistor resistance divided by the reference resistor resistance<br>DB1 - High byte of the current ratio of thermistor resistance divided by the reference resistor resistance | The ratio is scaled by 10000. (For example, if the ratio is actually 0.1234, then the reported number will be 1234, or DB0 = 0xD2 and DB1 = 0x04) |
| SET_CURRENT_READING | 8 | DB0 - Location to store current reading | None | 1- Store as set point for function 1<br>2 - Store as set point for function 2<br>3 - Store as reset point for function 1<br>4 - Store as reset point for function 2 |

The SET_EEPROM_DATA function does not update the checksum or bank select cells used to recognize and correct single cell EEPROM failures. This function is intended to be used to validate the routines used to recognize and correct single cell EEPROM failures. Operational parameters should be written using the SET_DATA_ELEMENT function.

Generating Outputs

The outputs for the switch are driven by logic-level N-channel field effect transistors (FETs) for sinking-type switches and logic-level P-channel FETs for sourcing-type switches. The outputs of the switch are engaged on (allows current to flow) by the microcontroller through a series resistor.

Switch States

Switches are often referred to as either "Normally Open" or "Normally Closed" (NO or NC). This language comes from the language of mechanically activated switches where the "normal" mode of the switch is the RESET state. Thus, an NO switch would be open in the RESET state and closed in the SET state, whereas an NC switch would be closed in the RESET state and open in the SET state. The UTS, on the other hand, has three different possible states for each of its outputs: open, closed, and blinking. Each switch output is individually programmable in both SET and RESET modes.

In the open state, the switch output does not allow current to flow.

In the closed state, the switch output allows current to flow, subject to the over-current limitations of the switch.

In the blink state, the switch output alternates between the open and closed states. The nominal time in each state is approximately 325 ms before switching.

Timing Accuracy

Depending on the operational parameters programmed into the switch, when the software measures a temperature change that indicates that the output state of one of the outputs should change, some timing constraints may also need to be met. These include holdoff times between the first measurement that indicates a new state and the time when the state is actually output by the device and minimum times in a given output state. Timing accuracy must be maintained across all temperature and voltage levels within the product specification. All measurement times are dependent upon the hardware requirements. The UTS uses the Microchip 16F648A-series microcontroller's internal RC clock which is accurate to +/−5%.

Note that the update rate of measurements is approximately 0.325 seconds and the software includes built in digital filtering routines that average new temperature measurements with old measurements. This will tend to eliminate spurious noise at the expense of slowing the switch's response time slightly in sudden temperature shock situations.

As described in more detail below, when multiple timers are programmed into a unit, they should operate independently. The following order of importance determines what state the output will be in:

Startup timer
Max-expired reset timer

Maximum timer
Minimum timer
Holdoff timer
Current temperature state

Over-Current Detection

The UTS is designed to protect itself in the event that the output is shorted to ground (power) for sinking (sourcing) outputs. It detects over-current conditions by monitoring the voltage drop across a sense resistor. If the voltage drop rises above (drops below) the threshold for sinking (sourcing) outputs, then the microcontroller will shut that output off. The shutoff is handled by an interrupt on the microcontroller and the worst-case response time is less than 1000 instruction cycles. Each instruction cycle takes approximately 1 μs using the internal 4 MHz oscillator, so 1000 instructions is approximately 1 ms. For dual function switches, each output is monitored independently, but both outputs use the same cut-off limit. The limit is determined by an external resistor divider.

Assuming the temperature has not changed enough to force an output state change, the software will attempt to engage the output again following the next temperature measurement cycle. Measurements cycles happen approximately every 0.325 seconds. If the over-current condition persists, the switch will shut off the output again and the cycle repeats. The effect of a continuous over-current condition will be that the outputs will effectively pulse briefly (<1 ms) at a rate of ~3 Hz.

Software Detail Design

This section describes the software design of the UTS. While there are multiple executable (*.hex) files associated with this invention, all of them are based on the same basic source code. This document discusses the detail design of the software for all of the basic versions, including single and dual function versions of both sinking and sourcing variants.

Additional information about the requirements, design, and performance of the module is found in the preceding sections and the following documents (and references therein):

Microchip Application Note AN512, Implementing an Ohmmeter/Temperature Sensor (available at http://www.microchip.com)

Microchip 16F648A Data Sheet (available at http://www.microchip.com)

GLOSSARY

CPU—Central Processing Unit. The core processing hardware of a microcontroller or microcontroller.
EEPROM—Electrically Erasable Programmable Read Only Memory. This type of memory is nonvolatile memory and will save its contents in the event of a power outage.
ISR—Interrupt Service Routine. A type of subroutine that is called asynchronously by the microcontroller, based upon a hardware interrupt (e.g., timer expiring, comparator state changing, etc.)
ICSP—In Circuit Serial Programming. This technique allows the PIC microcontroller to be programmed even after it has been soldered onto a circuit board.
RESET—the transition point for a switch to change its output state when the temperature is decreasing.
RTOS—Real Time Operating System, an executive layer of software that controls the operation sequence of various processing tasks on a microcontroller.
SET—the transition point for a switch to change its output state when the temperature is increasing.
SSOP—Small Shrink Outline Package. This is one possible form factor for an integrated circuit designed to be mounted as a surface-mount component.
TMR—Timer. This is Microchip's abbreviation for the timer hardware resource inside a PIC microcontroller.
USART—Universal Synchronous/Asynchronous Receiver Transmitter—a part of an integrated circuit that is used to communicate with an external device using a serial communications protocol (e.g., RS-232 or RS-485).

Overview

In addition to SET and RESET temperatures, the UTS software includes algorithms to allow timing parameters programmed into the microcontroller's flash EEPROM. The available timing and delay parameters that can be programmed into the switch are summarized in TABLE D.

TABLE D

TIMING AND DELAY PARAMETERS OF THE UTS. ALL DELAYS AND TIMERS CAN BE SET AT ANY VALUE FROM 00:00:00 TO THE MAXIMUM VALUE FOR THE TIMER IN INCREMENTS OF 0.32768 SECONDS. WITH THE EXCEPTION OF THE STARTUP TIMER, ALL OF THESE TIMERS, HOLDOFFS, AND DELAYS ARE INDIVIDUALLY CONFIGURABLE FOR BOTH SET ANT) RESET VALUES AND INDIVIDUALLY CONFIGURABLE FOR BOTH FUNCTION 1 AND FUNCTION 2 (ON DUAL-FUNCTION SWITCHES).

| PARAMETER | EXPLANATION | MAXIMUM VALUE (HH:MM:SS) |
|---|---|---|
| Startup Timer | The UTS output(s) will hold their initial pre-programmed startup state for this amount of time. | 00:01:23.6 |
| Holdoff | The amount of time that must pass once the temperature passes above (below) the SET (RESET) point for the given function before the output is switched to the other output state. | 05:57:54.5 |
| Minimum On Time | This is the minimum amount of time that the switch must maintain a given SET (RESET) output, regardless of what the temperature does. | 05:57:54.5 |

TABLE D-continued

TIMING AND DELAY PARAMETERS OF THE UTS. ALL DELAYS
AND TIMERS CAN BE SET AT ANY VALUE FROM 00:00:00 TO THE MAXIMUM
VALUE FOR THE TIMER IN INCREMENTS OF 0.32768 SECONDS. WITH THE
EXCEPTION OF THE STARTUP TIMER, ALL OF THESE TIMERS, HOLDOFFS,
AND DELAYS ARE INDIVIDUALLY CONFIGURABLE FOR BOTH SET ANT)
RESET VALUES AND INDIVIDUALLY CONFIGURABLE FOR BOTH
FUNCTION 1 AND FUNCTION 2 (ON DUAL-FUNCTION SWITCHES).

| PARAMETER | EXPLANATION | MAXIMUM VALUE (HH:MM:SS) |
|---|---|---|
| Maximum On Time | This is the maximum amount of time that the switch will be allowed to maintain a given output state, even if the temperature does not rise above (fall below) the SET (RESET) point. | 05:57:54.5 |
| Max-Expired Reset Time | If a MAXIMUM ON TIMER is used and the timer expires, this is the minimum amount of time that the switch must spend in the other state. Note that when this timer expires, the switch may or may not switch back to the initial state depending on whether or not the temperature has changed during this time. | 05:57:54.5 |

Time values are calculated using a value of 4.000 MHz for the internal RC oscillator in the PIC microcontroller. Actual values for any given unit may vary based upon part-to-part variations in the actual RC oscillator for a given microcontroller as well as effects of temperature.

Major Program Elements

The program software is written in C and compiled for the Microchip PIC16F648A microcontroller. This subsection provides a high level picture of how the code is organized and operates.

The UTS can operate in two basic modes, normal switch mode and communications mode. Under almost all circumstances, the UTS will operate in normal switch mode and will operate as a temperature switch. The only time when the UTS can operate in communications mode is for a brief period just after power is applied to the switch.

Basic Software Architecture

The UTS uses a simple software architecture common to many micro-controller software designs. The software does not use an RTOS, but uses an infinite run-time loop (FIG. 18) that cycles through various processing tasks in a round-robin procedure. Because processing overhead is not of concern in this application, each task is given a full time quantum of 65.536 ms to complete. While not giving up excess CPU cycles to the next task is not computationally efficient, it does simplify keeping track of elapsed time; a task which is more important in this application than CPU usage efficiency.

In the software flowcharts, the following graphics represent a high-level picture of how the firmware is organized. A few notes are in order about conventions used for documentation styles for the flowcharts:

Decision items are in diamond shapes
Action items are in rectangular boxes
Subroutines that are detailed on other flowcharts are in boxes with double lines on the edges
Starting and finishing points for a given flowchart are in ovals
External interrupts, which may happen asynchronously at any time are shown only on the main flowchart. They are shown as a parallelogram identifier inserted into the main loop with a triangular input. When a hardware interrupt happens, the ISR will immediately be called and the ISR associated with that interrupt will execute. Upon completion, the code execution will resume at the place where it was when the interrupt occurred.

Figure 18:
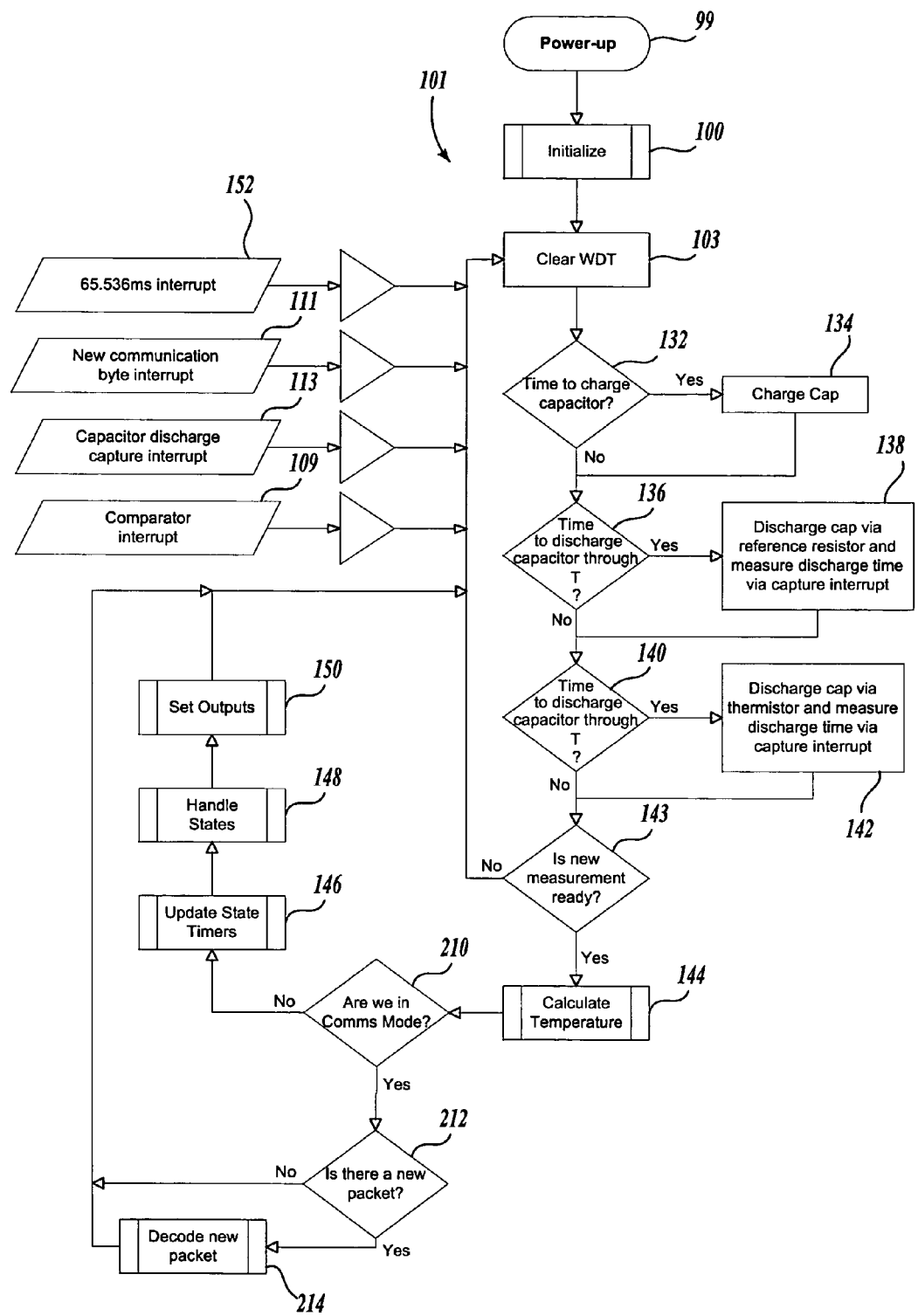
FIG. 18 is a flow chart of the main loop software algorithm usable in a switch in accordance with the present invention.

With reference to FIG. 18, following power up (99) and initialization (100), the main software processing loop 101 of the UTS simply cycles resetting the watchdog timer (WDT) at 103 and checking for flags until it detects that a flag has been set by an interrupt service routine (ISR) to request processing. There are four types of processing performed in the main loop, although one of them (charging the capacitor) must be performed twice. During normal switch operating mode, processing tasks are performed in a round-robin loop based upon flags that are set sequentially by the 65 ms timer interrupt (152). With five processing tasks each taking approximately 65 ms to complete, a complete cycle of temperature measurement, state analysis, and output updates is performed approximately every 328 ms.

Data Structures

The UTS software has two main data structures of interest, the bData EEPROM mirror and the SWITCHOUTPUT structure that is used to store variables about the temperature measurement and output state of the switch.

EEPROM Data Mirror

In order to access operational information quickly, the EEPROM contents are read into an array during initialization. The array is global in scope so that it can be accessed by program elements from any of the many different processing functions of the UTS software. The array elements are listed in TABLE E along with a brief explanation of how they are used.

By using an EEPROM mirror, data access from the EEPROM is much quicker than if data was retrieved from the EEPROM every time it was required, improving the response time of the switch software to changes in temperature or software timing events. The global access to the table significantly reduces the code space requirements for the microcontroller software, which outweighs any disadvantages of protecting the data by compartmentalizing the data array.

TABLE E

BDATA ARRAY. THE BDATA ARRAY IS A BYTE ELEMENT TABLE THAT MIRRORS THE SWITCH'S OPERATIONAL PARAMETERS THAT ARE STORED IN THE EEPROM. NOTE THAT ALL 2-BYTE ELEMENTS ARE STORED IN A LOW-BYTE/HIGH-BYTE FORMAT.

| bData Array Name | Array Element | Notes |
| --- | --- | --- |
| STARTUP_STATE | 0 | Bit 0 - Startup output of FN1 (1 = SET, 0 = RESET)<br>Bit 1 - Startup output of FN2 (1 = SET, 0 = RESET)<br>Bit 2 - FN1 uses startup delay (1 = yes, 0 = no)<br>Bit 3 - FN2 uses startup delay (1 = yes, 0 = no) |
| STARTUP_DELAY | 1 | In units of main loop cycles (approximately 328 ms). |
| VOLTAGE_REFERENCE | 2 | No longer used. |
| SET_1 | 3 & 4 | Ratio of discharge time through thermistor divided by discharge time through resistor. Scaled up by a factor of 10,000 in order to maintain resolution across operational temperature range. |
| SET_1_FUNCTION | 5 | 0 = Switch is open in this state<br>1 = Switch is closed in this state<br>2 = Switch blinks in this state |
| RESET_1_HOLDOFF | 6 & 7 | In units of main loop cycles (approximately 328 ms). |
| SET_1_MIN_ON_TIME | 8 & 9 | In units of main loop cycles (approximately 328 ms). |
| SET_1_MAX_ON_TIME | 10 & 11 | In units of main loop cycles (approximately 328 ms). |
| SET_1_MAX_EXPIRED_RESET_TIME | 12 & 13 | In units of main loop cycles (approximately 328 ms). |
| RESET_1 | 14 & 15 | Ratio of discharge time through thermistor divided by discharge time through resistor. Scaled up by a factor of 10,000 in order to maintain resolution across operational temperature range. |
| RESET_1_FUNCTION | 16 | 0 = Switch is open in this state<br>1 = Switch is closed in this state<br>2 = Switch blinks in this state |
| SET_1_HOLD OFF | 17 & 18 | In units of main loop cycles (approximately 328 ms). |
| RESET_1_MIN_ON_TIME | 19 & 20 | In units of main loop cycles (approximately 328 ms). |
| RESET_1_MAX_ON_TIME | 21 & 22 | In units of main loop cycles (approximately 328 ms). |
| RESET_1_MAX_EXPIRED_RESET_TIME | 23 & 24 | In units of main loop cycles (approximately 328 ms). |
| SET_2 | 25 & 26 | Ratio of discharge time through thermistor divided by discharge time through resistor. Scaled up by a factor of 10,000 in order to maintain resolution across operational temperature range. |
| SET_2_FUNCTION | 27 | 0 = Switch is open in this state<br>1 = Switch is closed in this state<br>2 = Switch blinks in this state |
| RESET_2_HOLDOFF | 28 & 29 | In units of main loop cycles (approximately 328 ms). |
| SET_2_MIN_ON_TIME | 30 & 31 | In units of main loop cycles (approximately 328 ms). |
| SET_2_MAX_ON_TIME | 32 & 33 | In units of main loop cycles (approximately 328 ms). |
| SET_2_MAX_EXPIRED_RESET_TIME | 34 & 35 | In units of main loop cycles (approximately 328 ms). |
| RESET_2 | 36 & 37 | Ratio of discharge time through thermistor divided by discharge time through resistor. Scaled up by a factor of 10,000 in order to maintain resolution across operational temperature range. |
| RESET_2_FUNCTION | 38 | 0 = Switch is open in this state<br>1 = Switch is closed in this state<br>2 = Switch blinks in this state |

TABLE E-continued

BDATA ARRAY. THE BDATA ARRAY IS A BYTE ELEMENT TABLE
THAT MIRRORS THE SWITCH'S OPERATIONAL PARAMETERS THAT ARE
STORED IN THE EEPROM. NOTE THAT ALL 2-BYTE ELEMENTS ARE STORED
IN A LOW-BYTE/HIGH-BYTE FORMAT.

| bData Array Name | Array Element | Notes |
| --- | --- | --- |
| SET_2_HOLDOFF | 39 & 40 | In units of main loop cycles (approximately 328 ms). |
| RESET_2_MIN_ON_TIME | 41 & 42 | In units of main loop cycles (approximately 328 ms). |
| RESET_2_MAX_ON_TIME | 43 & 44 | In units of main loop cycles (approximately 328 ms). |
| RESET_2_MAX_EXPIRED_RESET_TIME | 45 & 46 | In units of main loop cycles (approximately 328 ms). |
| CHECKSUM | 47 & 48 | 16-bit CRC checksum of array values from 0-46. |

SWITCHOUTPUT Structure

The SWITCHOUTPUT structure, listed below, is a 14-byte data structure that is used to keep track of the status of the UTS switch output. There is one SWITCHOUTPUT structure variable for each UTS output.

struct SWITCHOUTPUT
{
BYTE bFlags;
BYTE bCurrentTempState;
BYTE bCurrentOutputState;
WORD wCurrentOutputStateTimer;
WORD wCurrentTempStateTimer;
WORD wMaxResetTimer;
BYTE bSwitchFunctionPtr;
WORD wSet;
WORD wReset;
};

The bFlags element of the structure is used to keep track of the current state of three different timers. If bit zero is high, then the startup state timer is currently active for this output. If bit one is high, then the max-expired reset-timer is currently active for this output. If bit two is high, then the output state has a maximum timer for the current output (although it has not yet expired). These bit-flags allow the state logic to quickly determine whether or not a particular timer is active and needs to be checked.

The bCurrentTempState element of the structure is used to keep track of what state the current temperature measurement is. If the temperature measurement is above the SET point, the bCurrentTempState value will be one. Similarly, if the temperature measurement is below the RESET point, bCurrentTempState will be zero. In the hysteresis region, bCurrentTempState will retain its previous value. Keeping track of the temperature measurement state separately from the output state simplifies the algorithm for holdoff timers.

Similarly, the bCurrentOutputState element of the array keeps track of the current output state of the switch. The output state of the switch may not reflect the current temperature measurement because of startup delays, holdoffs, minimum timers, or maximum timers. A value of one indicates that the current output state is in the SET state and a value of zero indicates that the switch output is in the RESET state.

The wCurrentOutputStateTimer timer is used to keep track of how long the temperature measurement has been running above the SET or below the RESET temperature. This timer is required to satisfy holdoff-timer requirements in the UTS switch program. The timer increments every temperature measurement loop (approximately 328 ms) up to the maximum value of the timer. Note that the timer continues to increment when the temperature is in the hysteresis region; i.e., it will only reset when the output actually changes state.

Similarly, the wCurrentOutputStateTimer timer is used to keep track of how long the output has been in the current state. This timer is required for holdoff times, minimum times, maximum times, or max-expired reset-times that have been programmed into the switch's EEPROM.

The wMaxResetTimer timer is only active when the switch output is in a max-expired/reset condition. It counts down the time required by the switch's max-expired reset-time parameter before returning to the correct state. Note that the wMaxResetTimer timer may operate for either the SET or RESET state (or both) depending on the parameters that have been programmed into the switch.

The bSwitchFunctionPtr element of the structure is a numerical index into the bData array that allows the software to use the same code for both functions and both SET and RESET states. The bSwitchFunctionPtr value will either be 3 (which points to elements of the SET state for function one), 14 (RESET for function one), 25 (SET for function two), or 36 (RESET for function two). The bData array is organized so that all of the different stored elements for a given state all have the same sequence. For example, the minimum timer is five bytes past the SET or RESET point for either function one or two. This allows the program to check on the minimum time (independent of what state the output is in or which output is being checked) by looking at bData[SwitchFunctionPtr+5]. This technique allows significant code reuse and saves considerable code space in the microcontroller's flash memory.

The one item that can't easily be decoded using the bSwitchFunctionPtr value is the SET and RESET temperatures, as the correct offsets for these values change depending on the state. In order to minimize bData array access and save code space, these values are copied from the bData array into the wSet and wReset elements of the SWITCHOUTPUT structure.

Figure 19:
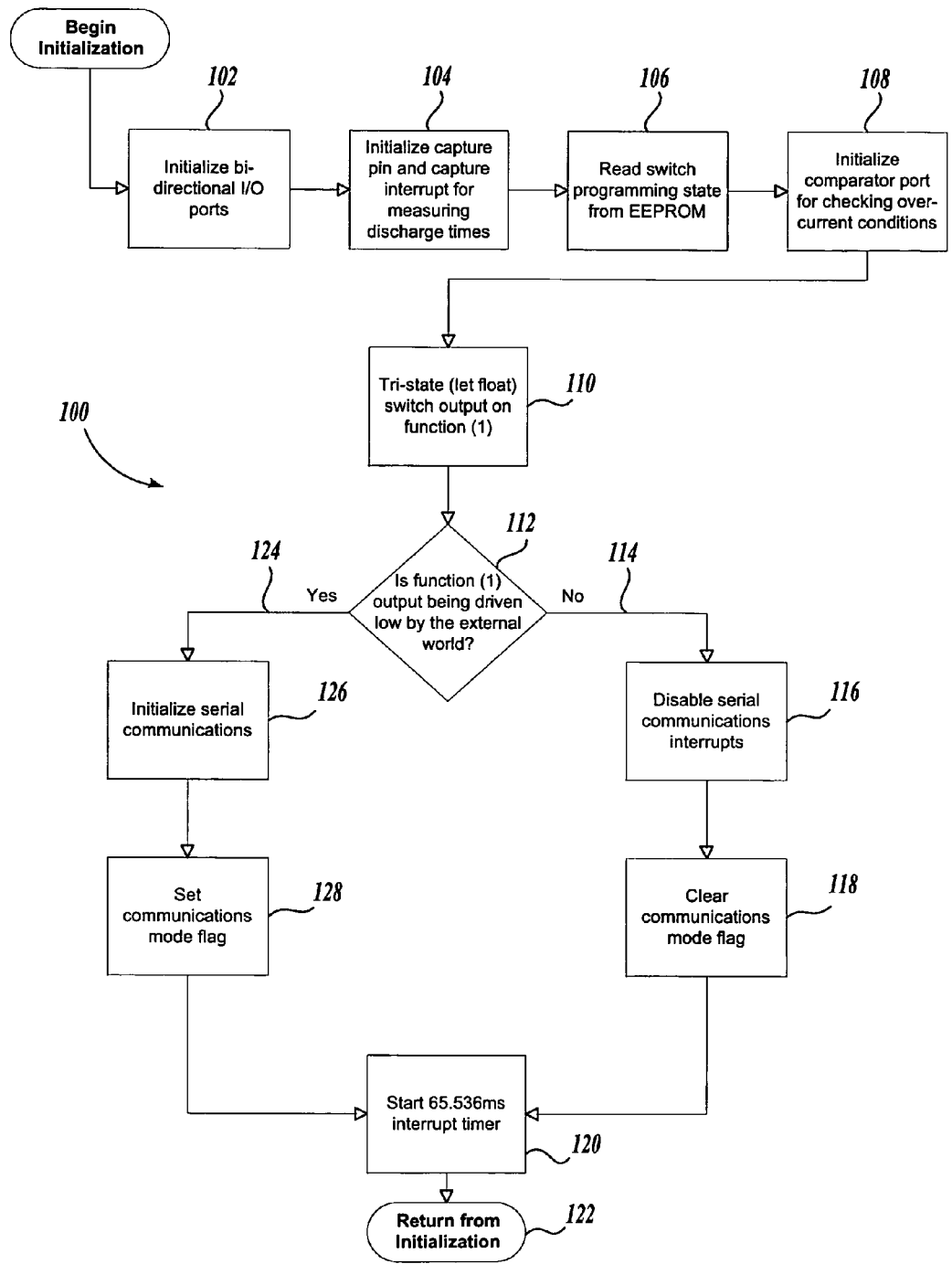
FIG. 19 is a flow chart showing the initialization subroutine for the software algorithm of FIG. 18.

Initialization (FIG. 18, box 100; FIG. 19)

When power is first applied to the UTS, the software performs a series of steps to initialize program interrupts and variables; retrieve its operational parameters stored in the EEPROM onboard the PIC16F648A; and determine its startup state (either as a normal switch or in communications mode).

With reference to FIG. 19, upon booting up, the software immediately sets the I/O state of the pins of the microcontroller to their input or output states except for the output drive pins (represented by boxes 102, 104, 106, 108). The output drive pin(s) are set to a high-Z state in order to determine whether or not the switch is supposed to operate in normal switch mode or communications mode. Most program variables are set to zero, and all flags are set to an off (or FALSE) state with one exception. The bit that signifies that the next temperature measurement will be the initial measurement is set to TRUE. This allows the software to bypass the averaging processing routine with the initial temperature measurement and determine the initial temperature much quicker.

Figure 20:
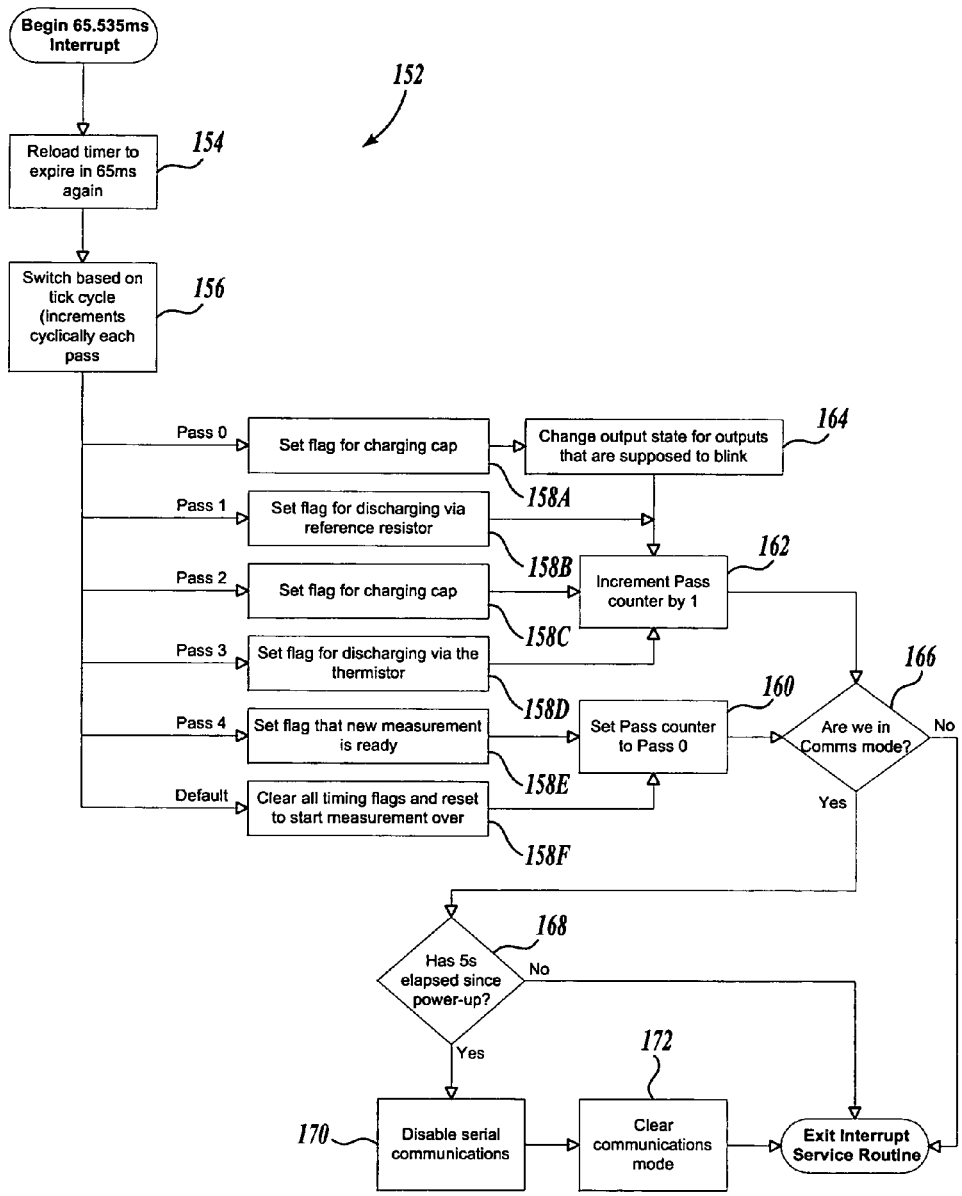
FIG. 20 is a flow chart of the timer interrupt routine of the software algorithm of FIG. 18.

The initialization process also disables all interrupts except for three. The TMR2 interrupt (TMR21F), described below with reference to FIG. 20, is enabled to allow interrupts every time the timer overflows. The interrupt service routine for the timer interrupt automatically reloads the timer. The TMR1 interrupt (TMR11F) is also enabled. This timer is used to time capture events during thermistor discharge measurements.

Figure 21:
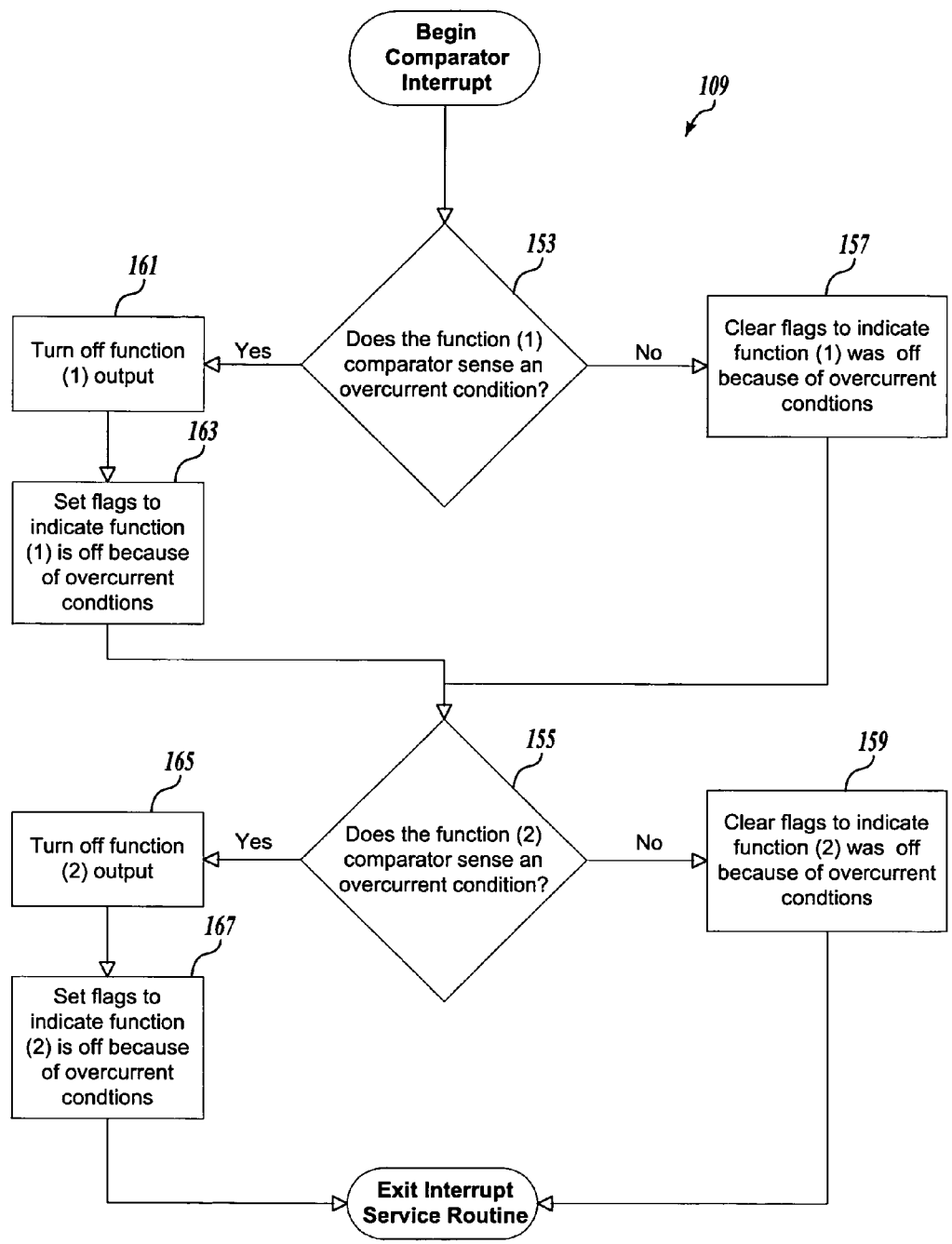
FIG. 21 is a flow chart of the comparator (over current) interrupt routine for the software algorithm of FIG. 18.

In addition to the timer interrupts, the software also enables the comparator interrupt (CMIF—box 109, FIG. 18; FIG. 21). The PIC16F648A comparator is used to detect over-current conditions upon the outputs so that the PIC can quickly shut off the drive FET to protect both the UTS and any equipment it is connected to from excessive current draw. With reference to FIG. 21, the comparator or over-current interrupt routine 109 includes determining whether or not the onboard comparators sense an over-current condition (decision boxes 153 and 155). If not, appropriate flags are cleared (157, 159). If an over-current condition is sensed, the corresponding function output is turned off and an appropriate flag set (161, 163 for function 1 and 165, 167 for function 2).

While these interrupts are active in both normal switch mode and communications mode, a third interrupt may also be enabled during startup—the serial-receive (RCIF) interrupt ("communication" interrupt—box 111, FIG. 18; described below with reference to FIG. 22). If the UTS software detects that the UTS should be operating in communications mode, the serial receive interrupt is also enabled.

The EEPROM memory area stores two copies of the operational parameters: one in bytes 0x00-0x30, and a second in bytes 0x40-0x70. The final two bytes of each EEPROM memory area (0x2F-0-30 and 0x6F-0x70) are used to store a CRC checksum. Additionally, a bank select pointer is stored in byte 0x7F. This byte is used to store a pointer to the most recently updated EEPROM bank.

The EEPROM writing algorithm always writes data to one bank, updates the CRC and writes it to the same bank, and then writes the bank pointer. Only after all of these steps have been accomplished will the algorithm write the same data to the second bank and then update the bank register pointer again.

When reading data from the EEPROM, the algorithm reads the bank select register and then reads data from that bank only. The algorithm independently calculates the checksum of data from that bank and compares it to the checksum stored for that bank. If the two numbers match, the data is deemed valid. If not, the algorithm reads the other data bank to retrieve the operational data.

If the bank select register does not point to either bank, then the first data bank is read and the CRC is computed and compared to the checksum stored for bank one. If they match, then bank one data is used for operational parameters. If not, then the program uses data from bank two.

In order to correct any lingering data cell failure, the EEPROM algorithm re-writes data into the bank that was not used for the operational parameters if it does not have identical contents to the bank that was used to retrieve the operational parameters. This allows the EEPROM to automatically detect and correct any single cell EEPROM failure. This algorithm will not be able to recover from catastrophic EEPROM failure where many portions of the EEPROM are corrupted. This software algorithm will, however, be able to deal with most EEPROM failure events that are experienced in the field.

The UTS is designed to be able to be configured (or re-configured) via its output wires after the switch has been completely assembled. In order to configure the switch, the software has been designed to be able to use a serial communications protocol to exchange information with an external computer. Because this should be an extremely rare event in a normal switch's lifetime, the design of the switch is to make it difficult to communicate—in almost all instances the switch should operate as a normal switch.

The only time that the switch can enter communications mode is during power-up of the switch. During the initialization sequence (FIG. 19), the software changes the drive pin for the function 1 output to a tri-stated high-Z output to float the output of the switch (110). This is the normal configuration for the UTS when it is disconnected from power. A second pin is configured as an input to determine whether the floating switch output is in a high-voltage or low-voltage state.

Under normal conditions, the floating output will be high-voltage for a sinking UTS, as the voltage level of the switch is pulled up to battery voltage through the load. For a sourcing UTS, the normal condition of the floating output will be a low-voltage state. At decision box 112, if the input pin detects the "normal state" of the switch, then the software sets the switch to normal switch operational mode ("No" branch 114). In that case, serial communication interrupts are disabled (116) and a communications work flag is cleared (118), followed by starting the 65.536 ms interrupt timer (120) and returning from initialization to the main loop (FIG. 18).

If, however, the input pin measures the "wrong" voltage, the UTS will enter communications mode ("Yes" branch 124 including 126 and 128). The "wrong" voltage may be generated on the switch output wire by a completely normal circumstance, for example by a closed switch placed in parallel to the UTS. This situation can occur when the UTS is one of several independent devices which can turn on an output (e.g., multiple thermal switches installed in parallel that could activate an engine fan). Because of this possibility, communications mode is limited to the first five seconds following boot up of the switch software. After five seconds, the switch will enter normal operational mode whether or not any communications have been received.

Normal Switch Mode

When the UTS is running in normal switch mode, the software operates in an infinite run-time loop that takes approximately 0.328 seconds to run. During the loop, the software measures the resistance of the thermistor, compares this value to the pre-programmed SET and RESET points, and uses that information along with the history of previous measurements and output states to turn the switch outputs on or off according to the pre-programmed timing information stored in the EEPROM.

With reference to FIG. 18, the 0.328-second main loop execution sequence is composed of five discrete steps, each of which is given one full 65 ms time quantum to execute.

1. Charge the temperature measurement capacitor (132, 134).

2. Discharge the temperature measurement capacitor through the fixed resistor. Using the capture interrupt (113, FIG. 18; described below with reference to FIG. 23), measure the amount of time that it takes to discharge (136, 138).
3. Charge the temperature measurement capacitor (132, 134).
4. Discharge the temperature measurement capacitor through the thermistor. Using the capture interrupt, measure the amount of time that it takes to discharge (140, 142).
5. Calculate the current temperature based on the ratio of the two discharge times (144—described below with reference to FIG. 24). Determine what the output state(s) of the switch need(s) to be according to the pre-programmed parameters in the EEPROM and set the output state of the switch accordingly (146, 148, 150—described below with reference to FIGS. 25 to 27).

Figure 23:
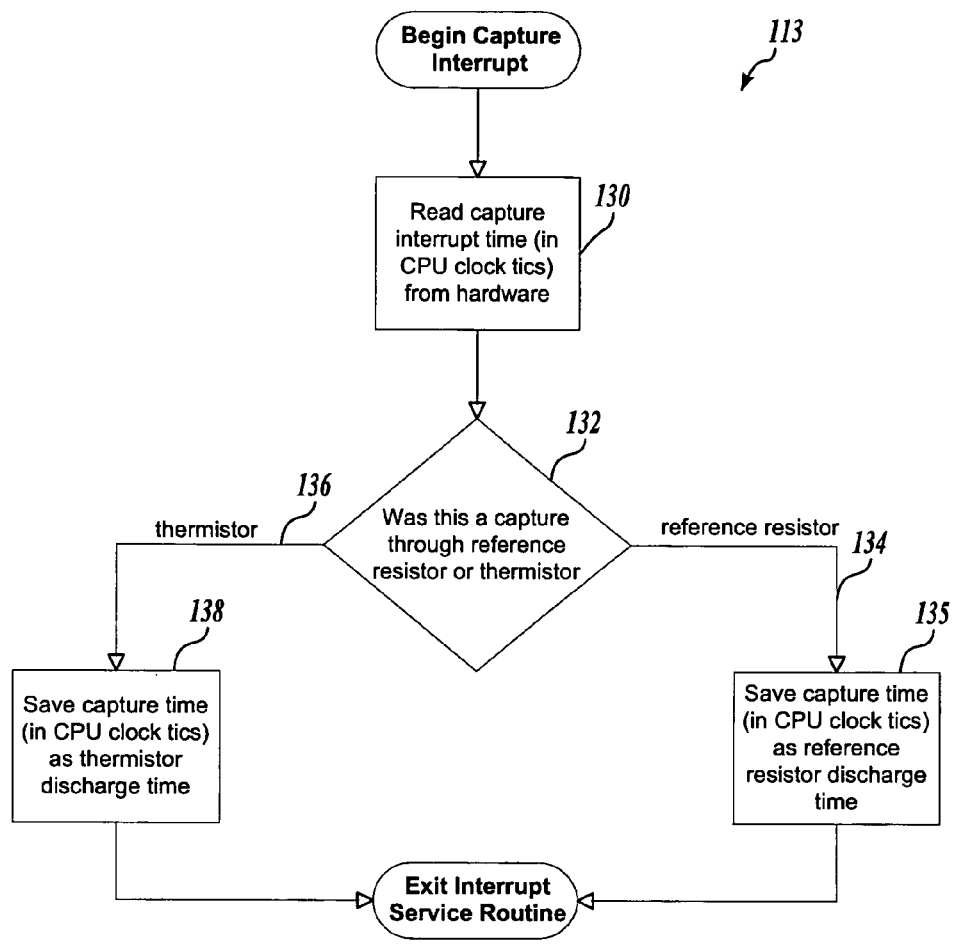
FIG. 23 is a flow chart of the capture interrupt routine for the software algorithm of FIG. 18.

With reference to FIG. 23, the capture interrupt routine 113 includes reading the appropriate time period from the CPU hardware (130) and determining whether the capture is through the reference resistor or thermistor (132). The first discharge is through the reference resistor (path 134) and the discharge time is saved (135). Thereafter, the capacitor is charged again, then branch 136 followed to determine the thermistor discharge time (138) used to calculate temperature as described below with reference to FIG. 24.

65 ms Timer Interrupts (152)

With reference to FIG. 20, the principal time keeping mechanism in the UTS is the 65.535 ms timer interrupt implemented using the TMR2 timer peripheral of the PIC16F648A microcontroller. The TMR2 timer/counter is updated at 154 every CPU clock cycle (approximately ~1.00 MHz rate when using the microcontroller's internal RC clock). During the 65 ms timer interrupt service routine (ISR), an internal tick counter (at 156) keeps track of which execution step in the main loop should be executed next. Upon expiration of the timer, the tick counter is incremented to the next value and a flag is set for the main loop to begin executing the next process step. Thus, on the first pass "0" the flag is set for charging the temperature measurement capacitor (158A); the next pass the flag is set for discharging by way of the reference resistor (158B); the next pass the flag is set for again charging the capacitor (158C); the next pass the flag is set for discharging via the thermistor (158D); the next pass the flag is set to indicate that a new measurement is ready (158E—see decision box 143 in FIG. 18) whereupon the pass counter is set to 0 (160) rather than being incremented forward (162) as occurs following the earlier passes described above.

In the case of a software glitch, a default path is provided to clear all timing flags and reset to start the temperature measurement process anew (158F).

In addition, the 65 ms timer ISR is also used to force the output of switches that are blinking to change state from on to off or vice versa during one of the tick counts (164). This means that switches that blink will be on for 328 ms, followed by an off period of 328 ms. The overall period of a blinking output is thus 655 ms, or 1.53 Hz.

All of the above assumes that communications mode has not been entered. If it has (decision box 166), the 65 ms timer ISR is tasked with keeping track of the initial startup time that the switch may be in communications mode. If the switch is initialized in communications mode, it will revert to normal operational mode after 77 65 ms-timer events (about 5.05 seconds—boxes 168, 170 and 172).

Charging/Discharging Time Measurement

The core of the firmware is the charging and discharging time measurement routine. The time measurement algorithm operates in the following sequence.
1. Charging the capacitor
RA4, RB0 and RB3 are set to high impedance inputs
RA3 is set to high output.
Wait for the remainder of the 65 ms time quantum to elapse. During this time, the capacitor will charge via RA3 to the supply voltage of the microcontroller.
2. Discharging via the 100 kΩ reference resistor
RA3 is set to high impedance in order to stop charging the capacitor.
RB0 is set to a low output, which starts the capacitor discharging through the reference resistor. Immediately after setting RB0 low, TMR1 is started to measure the amount of time it takes to discharge.
When the voltage falls low enough, the RB3 pin (CCP1) will capture a falling edge with the input capture interrupt. The time that it took to fall is saved from the TMR1 register.
Wait the remainder of the 65 ms time quantum. If the time quantum expires without a capture occurring, the discharge time is fixed as being 65 ms.
3. Recharge the capacitor
RA4, RB0 and RB3 are set to high impedance inputs
RA3 is set to high output.
Wait for the remainder of the 65 ms time quantum to elapse. During this time, the capacitor will charge via RA3 to the supply voltage of the microcontroller.
4. Discharging via the thermistor
RA3 is set to high impedance in order to stop charging the capacitor.
RA4 is set to a low output, which starts the capacitor discharging through the thermistor. Immediately after setting RA4 low, TMR1 is started to measure the amount of time it takes to discharge.
When the voltage falls low enough, the RB3 pin (CCP1) will capture a falling edge with the input capture interrupt. The time that it took to fall is saved from the TMR1 register.

Figure 24:
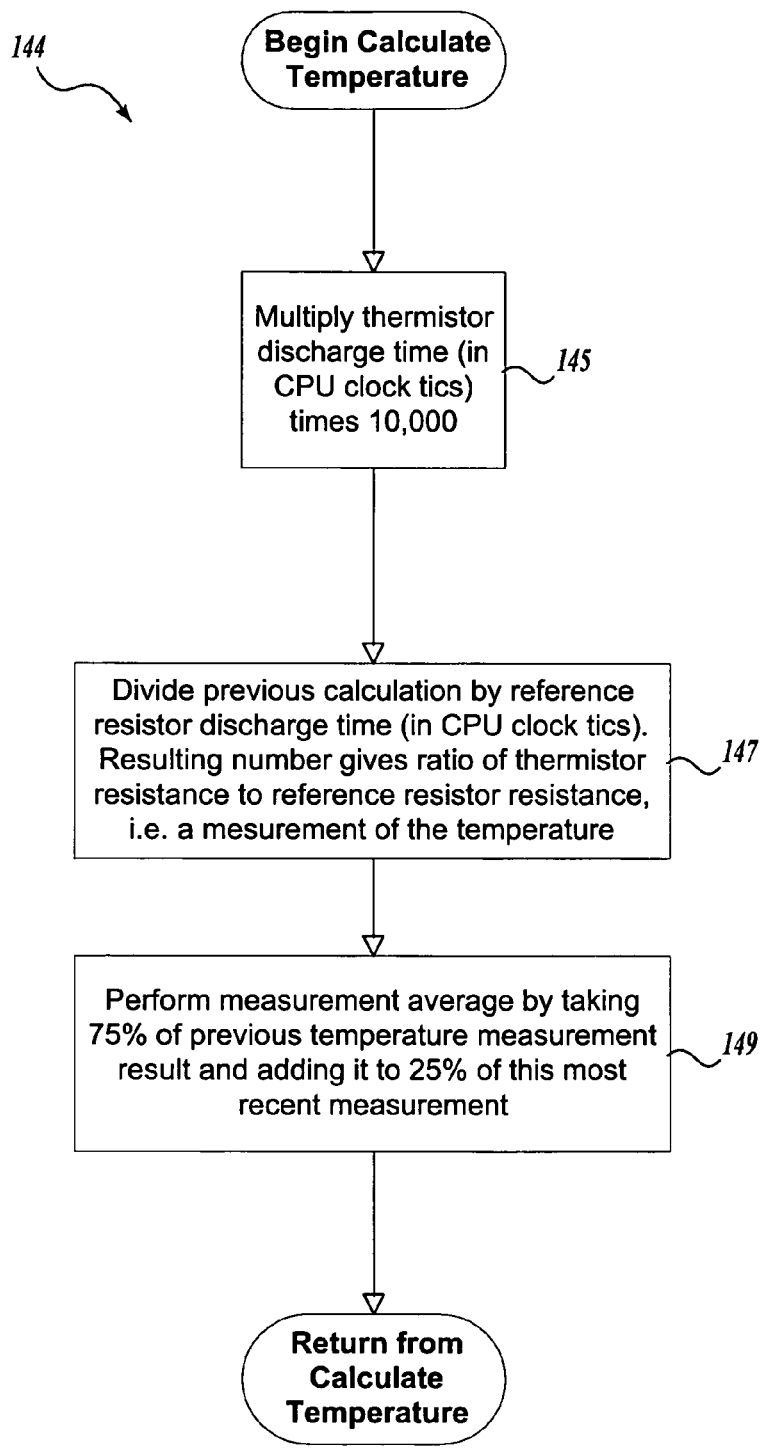
FIG. 24 is a flow chart of the temperature calculation subroutine for the software algorithm of FIG. 18.

Calculation of the Temperature (FIG. 24)

The overall tolerance of the temperature measurement depends on several factors. The main factor is the tolerance of the thermistor resistance to the theoretical temperature versus resistance chart or formula. The second main factor is the ability of the UTS to accurately measure the resistance. In order to make the UTS as inexpensive as possible, the UTS uses a 10% tolerance thermistor. In order to compensate for this poor tolerance, the UTS must be calibrated at each temperature set point. The tolerance of measuring the resistance depends on the tolerance of the known resistor (1% tolerance used in this design), the stability of the capacitor and voltage supply while making the measurement (quite good), and the resolution of the timing measurement. The resolution of the timing measurement is based on divided down clock cycles, approximately 1 µS. The result of the measurement scheme is a very repeatable, but not highly accurate, temperature measurement.

The UTS overcomes the absolute tolerance issue by calibrating each set and reset point of the switch. The main tolerance question really comes down to how consistent the thermistor and the measurement is for any given temperature. Since the switch is calibrated at temperature, several temperature variables in the measurement scheme are eliminated. The design intent is to meet at least 0.5° C. tolerance at the time of manufacture. The largest source of error left after the calibration at SET and RESET points is the accuracy of the temperature measurement for the bath at the SET or RESET point. Combining the measurement circuit with the calibration routine results in a highly accurate, highly repeatable temperature switch at a reasonable cost.

Once the discharge timing measurements have been performed, the resistance of the thermistor can be calculated according to the formula $$R_{thermistor} = \left(\frac{T_{thermistor}}{T_{reference}}\right) R_{reference}, \quad (1)$$

with $R_{reference}=100$ k$\Omega$ and $T_{thermistor}$ and $T_{reference}$ discharge times measured as a function of CPU clock tic (times a scaling factor of 10,000—FIG. 21, box 145). In actual fact, the UTS software does not concern itself with the actual thermistor resistance, but is content to simply measure the ratio of the thermistor discharge time to reference resistor discharge time (box 147). The resulting number is proportional to the thermistor resistance. It is this ratio that is compared to numbers stored in the EEPROM for SET and RESET points.

In order to help smooth over any fluctuations in measurement errors, the temperature measurement calculation uses a rolling average calculation. The average is calculated as 25% of the new measurement plus 75% of the old average (box 149). This helps to filter out spikes due to random electromagnetic errors that might unduly affect temperature measurements while still providing a relatively quick response to real temperature changes.

Figure 25:
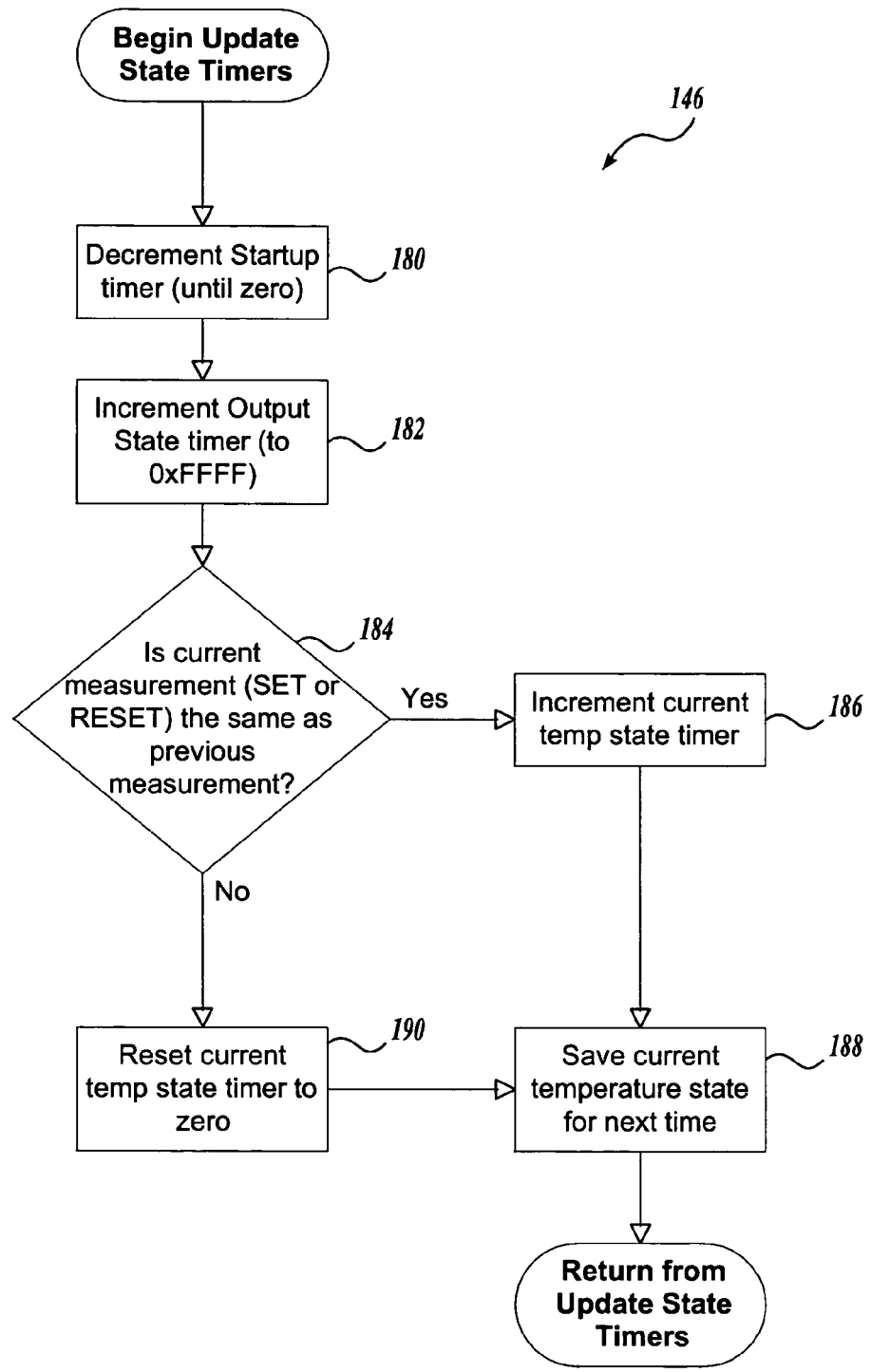
FIG. 25 is a flow chart of the "begin update state timers" routine for the software algorithm of FIG. 18.
Figure 26:
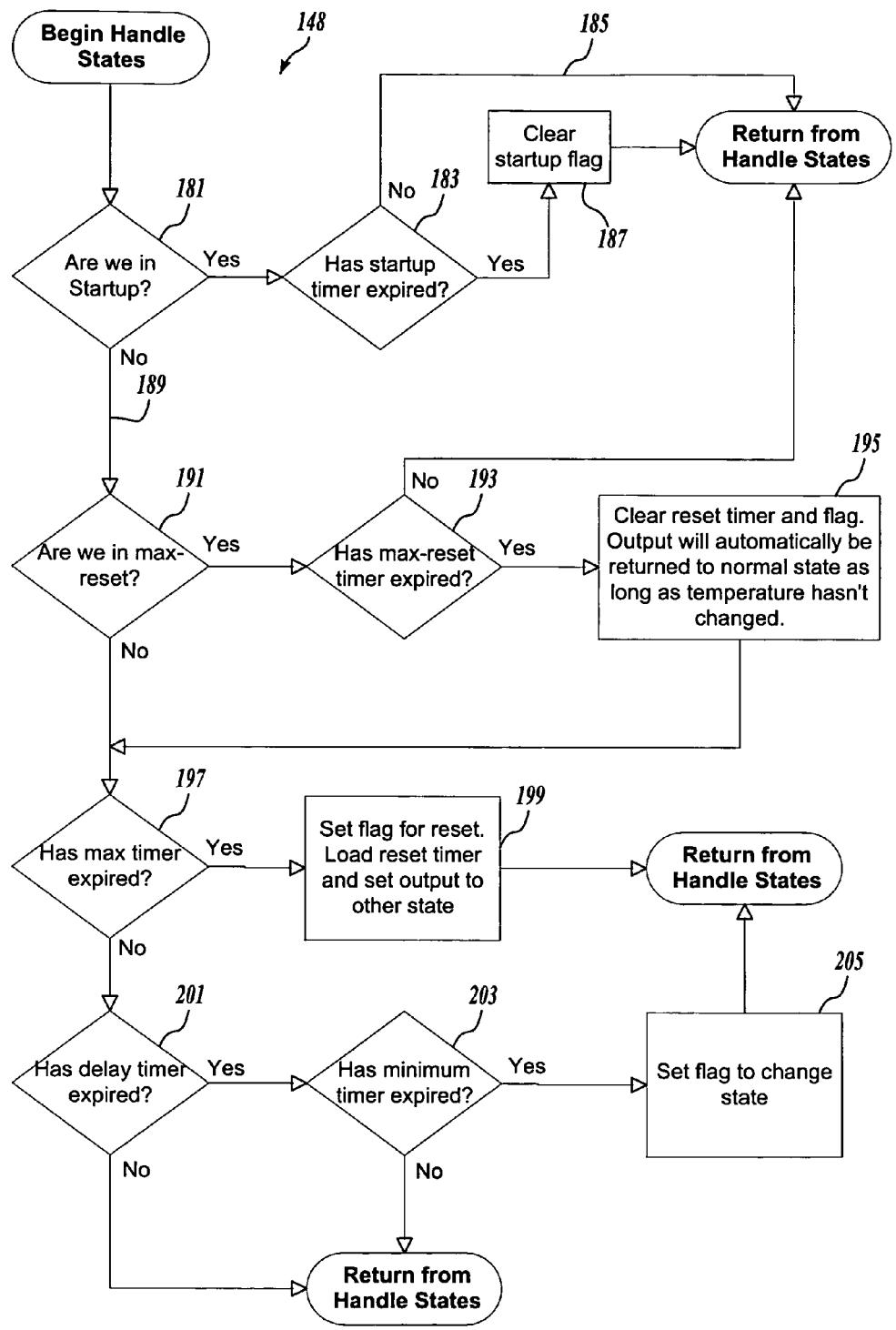
FIG. 26 is a flow chart of the "begin handle states" routine for the software algorithm of FIG. 18.
Figure 27:
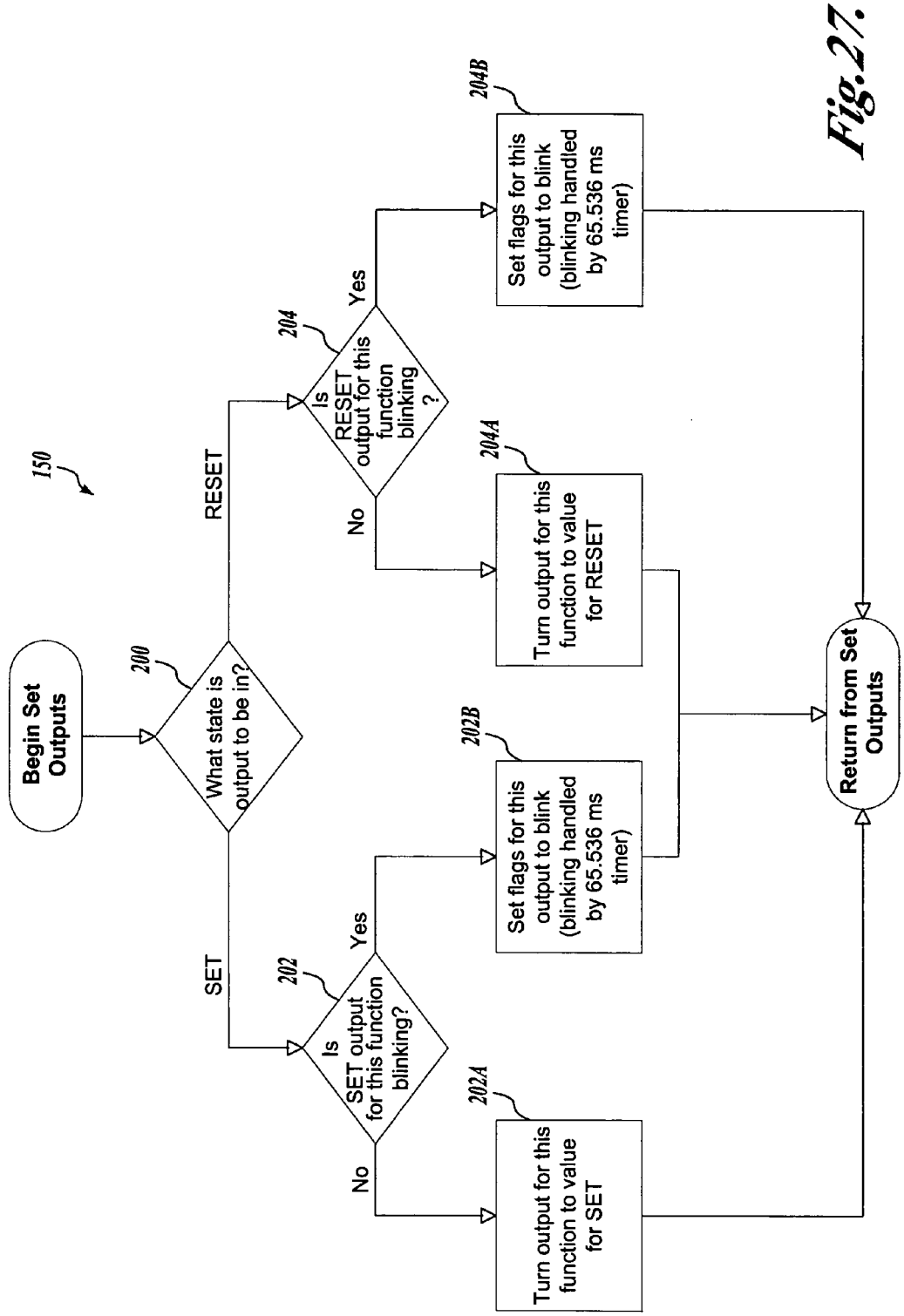
FIG. 27 is a flow chart of the "begin set outputs" routine for the software algorithm of FIG. 18.

Timing and Output State Changes (FIGS. 25-27)

With so many timers, holdoffs, and delays, the algorithm for changing the UTS output states could have been a potential nightmare of if-then-else cases that would have been very difficult to follow. After studying potential timer and temperature interactions for a long time, it became apparent that there is a hierarchy of timers within the UTS software architecture. With reference to FIG. 25, the "Update State Timers" routine 146 begins by decrementing the startup timer and incrementing the output state timer (boxes 180 and 182). At decision box 184, it is determined whether or not the current measurement (set or reset) is the same as the previous measurement. If so, the current temperature state timer is incremented (box 186), the current temperature state is retained (box 188), and the routine returns to the loop of FIG. 18. If the measurement at decision box 184 has changed, the current temperature state timer is reset to zero (box 190) before returning to the loop of FIG. 18.

Using the hierarchy of timers allows the UTS timing algorithm to be fairly simple (see FIG. 26).

The most important timer is the startup timer. Independent of what the temperature measurement might be and what the values of any other timers are, if an output is supposed to start in a certain state for a specified period of time, it will do that (181, 183, and branch 185). If the startup timer has expired, a startup flag is cleared (box 187), and the next pass through the next branch 189 of the hierarchy is followed.

After the startup timer, the next most important timer is the maximum-expired reset-timer (decision box 191). The concept of the max-expired reset-timer is that it does not matter what the current temperature state is, the recent history of this output was judged to be sufficient to force the output from the SET state into the RESET state (or vice versa). It will remain there for at least as long as the max-expired reset timer is active (193 and 195).

The third timer in the hierarchy is the maximum timer itself (197 and 199). The thought process here is a bit complicated. This timer must follow after the max-expired reset timer in importance. Ordering it this way prevents the logic trap of having a max-expired reset-timer be overridden by the maximum expired timer from the other state. For example, suppose that the temperature was above the SET point for long enough that the maximum timer for SET expired, forcing the output into the RESET state. It should stay there for at least as long as the max-expired reset-time for the SET state, even if the maximum timer for the RESET state is less than the max-expired RESET time for the SET state.

The fourth timer in the hierarchy is the minimum or "delay" timer (201, 203 and 205). If we aren't in startup timing mode and we haven't reached the maximum timer value, the output should be in that state for at least the minimum timer value. If the minimum output time requirement hasn't been satisfied, then the output should remain in this state, even if the temperature changes.

The last timer in the hierarchy of these timers is the holdoff timer. If we are passed the minimum time for a state, then we should only change outputs if the holdoff timer has expired.

This hierarchy of timers allows the UTS timing algorithm to quickly determine what state (SET or RESET) that the output should be in. The algorithm examines each timer in the hierarchy in sequence and determines if that timer will force the output to remain in one state or another. If it does, then the output is set accordingly. If it does not, then the next timer in the hierarchy is examined.

FIG. 27 shows the logic for setting the outputs based on whether or not the SET, RESET or "blinking" state is indicated. From decision box 200, an indication of SET or RESET leads to a decision box 202 or 204. If not blinking, the state is maintained (boxes 202A and 204A). If blinking, the blink output is maintained and the state (SET or RESET) is indicated (boxes 202B and 204B).

Generating Outputs

The UTS outputs are driven by logic-level field effect transistors (FETs). N-channel FETs are used in sinking versions of the UTS and P-channel FETs are used in sourcing versions of the UTS. The outputs are engaged on (pass current) by the microcontroller outputting logic level one to the gate of the FET for sinking switches or a logic level zero to the gate of the FET for sourcing switches. When the opposite value is sent to the input of the FET, the FET will not pass current.

Note that the output is generated every time through the main processing loop. This has the effect of allowing the software to automatically try and re-engage any outputs that have been disabled by over-current conditions. In applications where this tries to re-engage a short-circuited output, it will effectively cause the output to "blip" for a few tens of microseconds every 328 ms.

Communications Mode

The UTS must be able to determine whether or not it should enter into communications mode or normal operating mode. In order to do this, the UTS looks at the FN1 output line at startup to determine if it is being artificially being held low (high) for a sinking (sourcing) UTS. If it is, then the UTS will "listen" for a communications packet from an external computer to be transmitted on the Function 1 output line to the UTS.

FIG. 15 shows a timing diagram for a sinking UTS that is entering communications mode. At time A in the diagram power is applied to the switch. From that point until time until point B, the software performs its initialization sequence. At point B, the microcontroller has determined that the FN1 output line is in the "wrong" state, with the voltage being driven low by the external system and enters communications mode.

When entering communications mode, the software initializes the microcontroller's USART module, which raises the TX pin on the microcontroller to the bus-idle state, which is logic level one. After a brief period of time (<5 seconds), the external computer that is trying to talk to the UTS sends a communications packet to the switch down the FN1 output line. The UTS electronics converts this 12 VDC signal into a logic level signal of the proper polarity and the packet is received on the RX line of the microcontroller by point C.

At point C, the external computer releases the FN1 output line and allows it to float to its normal 12 VDC (for sinking switches, 0 VDC for sourcing switches) state. From time C to time D, the microcontroller processes the packet instruction. If the packet was valid, it will respond with a response packet, shown in the diagram as happening from point D to point E on the microcontroller's TX pin and FN1 output. Because this is a single-wire communications scheme, the packet on the TX pin is echoed back to the microcontroller on the RX pin. The software simply ignores this packet.

Figure 22:
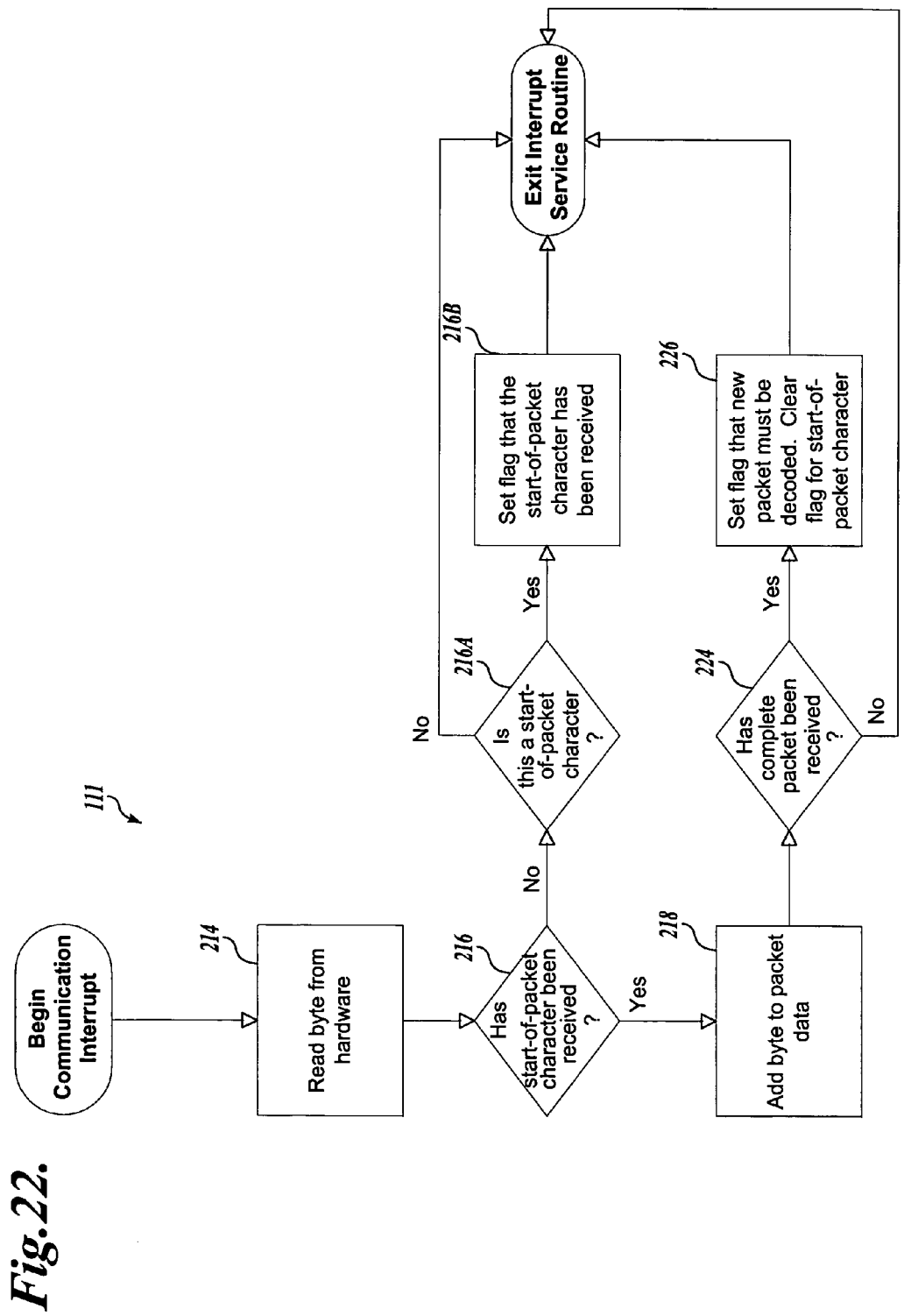
FIG. 22 is a flow chart of the communication (serial I/O) interrupt routine for the software algorithm of FIG. 18.
Figure 28:
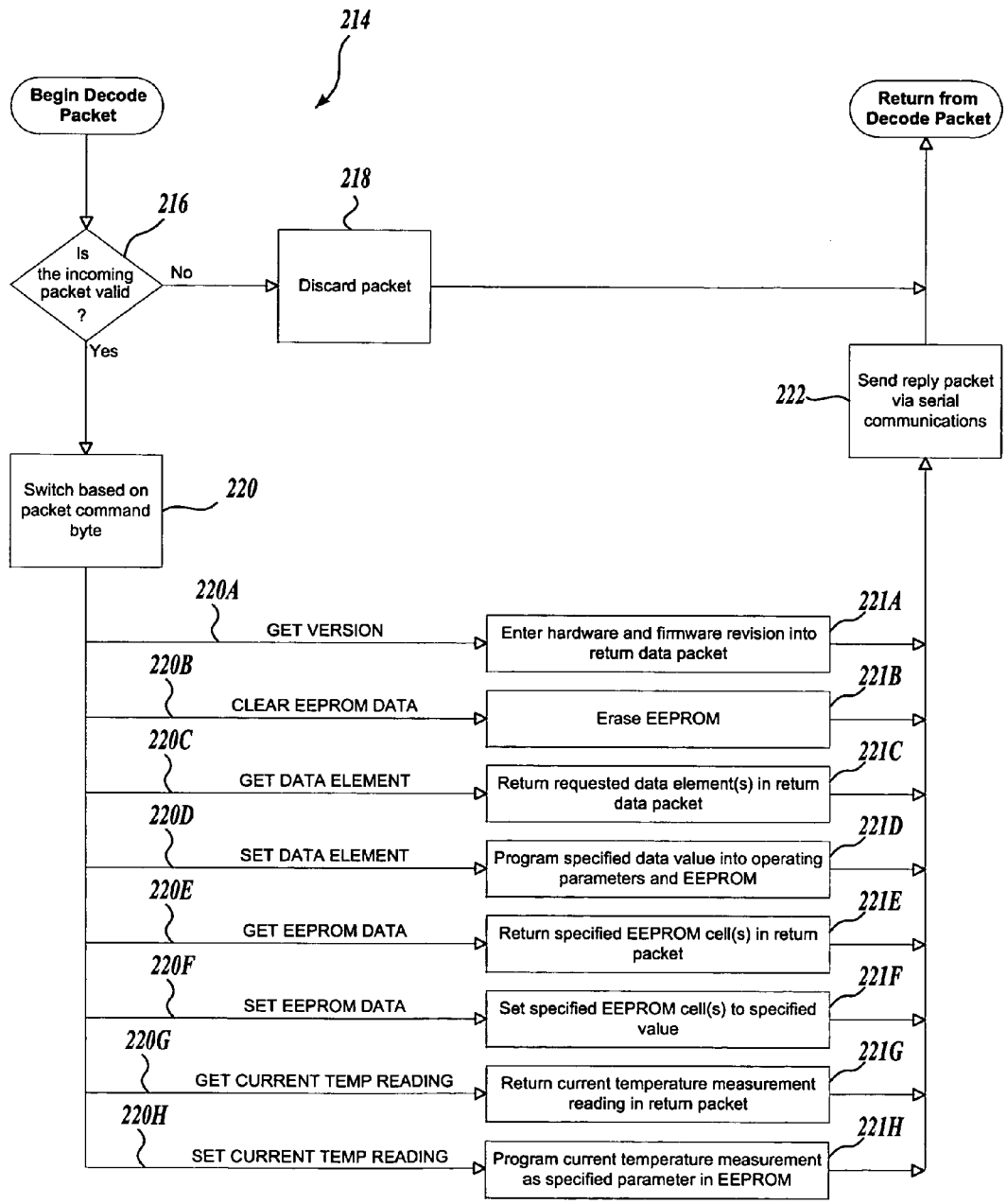
FIG. 28 is a flow chart of the "decode packet" routine for the software algorithm of FIG. 18.

Serial I/O (Communication) Interrupts and Processing (FIGS. 22 and 28)

Serial interrupts are enabled only for incoming data bytes from the USART, and even then only while in communications mode. The microcontroller initialization routine only enables the RCIF interrupt if it detects communication mode (box 210, FIG. 18) and if a data packet is detected (box 212, FIG. 18), and the RCIF interrupt is disabled when communications mode is turned off after five seconds.

Data packets are constructed of an ASCII STX character (0x02), followed by eight data bytes. The data bytes are described in TABLE E.

TABLE E

INDEX STANDARD COMMUNICATIONS PACKET FORMAT.

| Byte | Byte Name | Packets TO the controller | Packets FROM the controller |
|---|---|---|---|
| 0 | ADDR | Address of the controller this packet is being sent to (can be a broadcast message as well) | Address of the controller issuing response |
| 1 | CMD | Command to perform | Command that was performed |
| 2 | DB0 | Data for command | Data for command |
| 3 | DB1 | Data for command | Data for command |
| 4 | DB2 | Data for command | Data for command |
| 5 | DB3 | Data for command | Data for command |
| 6 | CRC0 | Checksum, low byte | Checksum, low byte |
| 7 | CRC1 | Checksum, high byte | Checksum, high byte |

With regard to FIG. 22, during a serial interrupt, the ISR servicing the routine 111 reads the byte from hardware (214) and determines whether or not a start of packet character has been received (216, 216A), whereupon a flag is set (216B). Once the start of packet character has been received, packet formation begins and bytes are added to the packet (218) until a complete packet has been received (224). At that point, a flag is set that a new packet must be decoded, and the flag for the "start of packet character" is cleared (226). Detection of a new packet results in starting the "decode new packet" subroutine (box 214 of FIG. 18), the details of which are shown in FIG. 28. The data byte is processed to form a packet according to the following algorithm All packets must start with an ASCII STX character. Any data bytes received before the ASCII STX character is received are discarded.

Once the start-of-packet character has been received, the next eight data bytes are grouped together to form a data packet.

When a complete data packet has been received, the serial I/O ISR sets a flag that signals the main processing loop that there is a new data packet to be processed.

The data packet is processed in the main loop (214, FIG. 18). This processing can take place at any point during the main processing loop, but will typically take place during the "excess" time left over from one of the 65 ms time quanta allotted the main processing tasks.

With reference to FIG. 28, a CRC checksum is calculated on the first six bytes of the data packet. The CRC is compared to bytes CRC1 and CRC2. If they match, the packet is valid. If they do not match, the packet is discarded (216 and 218).

The ADDR byte for the UTS data packet is ignored. It is assumed that any packet received by the microcontroller is to be processed by this microcontroller.

Valid commands are processed (220A to 220H). This processing may or may not change the four-byte array of data from the packet.

A response packet is constructed from the address byte, command byte, and four data bytes, along with a new CRC checksum on these six bytes (221A to 221H).

The response packet is transmitted out the transmit buffer (222). During this transmission time, the TX INHIBIT line on the microcontroller is set to high-Z to allow the packet to be transmitted.

As the transmitted packet is sent, the electronics of the UTS will put this signal onto the function one output line. Because signals on this line are connected to the USART's receive line, the serial I/O response packet is also "echoed back" to the receive buffer. The software discards this extra packet.

Serial I/O Command Processing

TABLE F lists the valid serial communications commands for the UTS. The software discards packets that have valid CRC bytes but do not use one of these commands.

TABLE F

SERIAL COMMUNICATIONS COMMANDS

| Serial Command | Command Number | Data Bytes (to UTS) | Data Bytes (from UTS) | Notes |
|---|---|---|---|---|
| GET_VERSION | 1 | None | DB0 - Hardware version DB1 - Software version | Used to determine which version of the hardware and software the switch was built with |

TABLE F-continued

SERIAL COMMUNICATIONS COMMANDS

| Serial Command | Command Number | Data Bytes (to UTS) | Data Bytes (from UTS) | Notes |
|---|---|---|---|---|
| CLEAR_EEPROM_DATA | 2 | None | None | Used to clear the entire EEPROM memory to zero (useful during switch initialization and EEPROM programming) |
| GET_DATA_ELEMENT | 3 | DB0 - Data element to return DB1 - Number of bytes to return (1 or 2) | DB0 - Value of data stored in data array location specified by DB0 DB1 - (optional) Value of next byte if requested by DB1 | Operational parameters from the EEPROM are stored in this data array. This is useful to see what operational values are being used. |
| SET_DATA_ELEMENT | 4 | DB0 - Data element to set DB1 - Number of bytes to set (1 or 2) DB2 - Value of byte that is to be set DB3 (optional) - Value of second byte to be set (if DB1 = 2) | None | Used to set operational parameters in the EEPROM. Note that this function will update both EEPROM banks and the checksum. |
| GET_EEPROM_DATA | 5 | DB0 - Address of the first byte in EEPROM memory to return | DB0 - 3 Value of the data byte specified by DB0 and the next three data bytes | This function returns data directly from the EEPROM |
| SET_EEPROM_DATA | 6 | DB0 - Address of the byte in the EEPROM memory to set DB1 - Value to set it to | None | This function sets individual EEPROM memory cells |
| GET_CURRENT_READING | 7 | None | DB0 - Low byte of the current ratio of thermistor resistance divided by the reference resistor resistance DB1 - High byte of the current ratio of thermistor resistance divided by the reference resistor resistance | The ratio is scaled by 10000. For example, if the ratio is actually 0.1234, then the reported number will be 1234, or DB0 = 0xD2 and DB1 = 0x04. |
| SET_CURRENT_READING | 8 | DB0 - Location to store current reading | None | 1 - Store as set point for function 1 2 - Store as set point for function 2 3 - Store as reset point for function 1 4 - Store as reset point for function 2 |

The GET_EEPROM_DATA function is intended for use in validating the EEPROM I/O routines. Operational parameters should be read using the GET DATA_ELEMENT function.

The SET_EEPROM_DATA function does not update the checksum or bank select cells used to recognize and correct single cell EEPROM failures. This function is intended to be used to validate the routines used to recognize and correct single cell EEPROM failures. Operational parameters should be written using the SET_DATA_ELEMENT function.

While the preferred embodiment of the invention has been illustrated and described, it will be appreciated that various changes can be made therein without departing from the spirit and scope of the invention.

The embodiment of the invention in which an exclusive property or privilege is claimed are defined as follows:

1. An electronic switch comprising:
   a housing;
   a sensor circuit mounted in the housing, said sensor circuit providing a variable signal based on an environmental condition to which the sensor circuit is exposed; and
   a microcontroller mounted in the housing and receiving the variable signal from the sensor circuit, the microcontroller having:
      a power input port for selectively receiving electrical power to power the microcontroller;
      a ground port for connection to ground; and
      at least one output port for indicating an on state or an off state to indicate the condition of the switch;
   the microcontroller being programmed to operate in at least two modes including:
      a switch mode in which the microcontroller provides an on/off output at the output port based on predetermined parameters of the signal from the sensor circuit; and
      a communications mode in which the predetermined parameters can be changed by an external communication signal supplied to the output port during a predetermined period following power being supplied to the input power port.

2. The switch defined in claim 1, in which the environmental condition is temperature, the predetermined parameters including a SET temperature and a RESET temperature for controlling the on/off state of the output port when the microcontroller is in switch mode, the SET and RESET temperatures being changeable by an external communications signal applied to the output port when the microcontroller is in communications mode.

3. The switch defined in claim 2, in which the microcontroller is programmed to determine whether or not a communications signal is applied to the output port at the time of supply of power to the power port, and if such a signal is supplied, to operate in communications mode for a predetermined period and not enter switch mode during such predetermined period.

4. The switch defined in claim 1, in which the microcontroller is programmed to determine whether or not a communications signal is applied to the output port at the time of supply of power to the power port, and if such a signal is supplied, to operate in communications mode for a predetermined period and not enter switch mode during such predetermined period.

5. The switch defined in claim 4, in which the microcontroller is programmed to automatically operate in switch mode a predetermined time after beginning to operate in communication mode.

6. An adjustable electronic temperature switch comprising:
   a power port for receiving electrical power;
   a ground port for connection to ground;
   an output port for indicating an on/off state;
   a microprocessor connected to each of the ports, for receiving power by way of the power port, for connection to ground by way of the ground port, and for supplying a binary signal at the output port to indicate the on/off state;
   a sensor circuit connected to the microprocessor and providing a variable signal thereto based on a temperature to which the sensor circuit is exposed, the microprocessor being programmed to operate in at least two modes, including:
      a switch mode in which the microcontroller provides the binary signal at the output port based on predetermined parameters of the signal from the sensor circuit including SET and RESET temperatures stored in the microprocessor; and
      a communications mode in which the predetermined SET and RESET temperatures can be changed by an external communications signal supplied to the output port.

7. The switch defined in claim 6, in which the microcontroller is programmed to automatically operate in communications mode upon receipt of an external signal supplied at the output port when power is applied at the power port and for remaining in communications mode for a predetermined period thereafter.

8. The switch defined in claim 7, in which the microprocessor is programmed to return to switch mode from communications mode a predetermined period after entering communications mode.

* * * * *